United States Patent
Su et al.

(10) Patent No.: US 11,785,624 B2
(45) Date of Patent: Oct. 10, 2023

(54) METHOD FOR TRANSMITTING PHYSICAL CHANNELS, USER EQUIPMENT THEREFOR, METHOD AND USER EQUIPMENT FOR RELAY TRANSMISSION

(71) Applicant: Samsung Electronics Co., Ltd., Suwon-si (KR)

(72) Inventors: Di Su, Beijing (CN); Feifei Sun, Beijing (CN); Miao Zhou, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,481

(22) PCT Filed: Feb. 8, 2019

(86) PCT No.: PCT/KR2019/001573
§ 371 (c)(1),
(2) Date: Aug. 6, 2020

(87) PCT Pub. No.: WO2019/156505
PCT Pub. Date: Aug. 15, 2019

(65) Prior Publication Data
US 2021/0127396 A1 Apr. 29, 2021

(30) Foreign Application Priority Data

Feb. 8, 2018 (CN) .......................... 201810129523.4
Mar. 19, 2018 (CN) .......................... 201810226865.8

(51) Int. Cl.
*H04W 72/53* (2023.01)
*H04W 76/11* (2018.01)
(Continued)

(52) U.S. Cl.
CPC ........... *H04W 72/53* (2023.01); *H04L 5/0012* (2013.01); *H04W 72/0453* (2013.01);
(Continued)

(58) Field of Classification Search
None
See application file for complete search history.

(56) References Cited

U.S. PATENT DOCUMENTS 8,897,202 B2   11/2014 Chen et al.
2012/0069793 A1   3/2012 Chung et al.
(Continued)

FOREIGN PATENT DOCUMENTS

CN   102149205 A   8/2011
CN   106664517 A   5/2017
(Continued)

OTHER PUBLICATIONS

3GPP TSG RAN WG1 Meeting 91 ("Discussion on sub-PRB allocation for eFeMTC", R1-1720263, dated Nov. 2017, all pages) (Year: 2017).*
(Continued)

*Primary Examiner* — Srinivasa R Reddivalam

(57) ABSTRACT

The present invention discloses a physical channel transmission method, which includes: determining transmission subcarrier resources according to a configuration of a base station; and sending or receiving physical channels on the transmission subcarrier resources. Compared with the prior art, the present invention subdivides resource allocation units for transmitting physical channels from PRBs to subcarriers, which significantly improves the power spectral density of the uplink transmission and effectively achieves coverage enhancement.

12 Claims, 34 Drawing Sheets

(51) Int. Cl.
*H04L 5/00* (2006.01)
*H04W 72/0453* (2023.01)
*H04W 72/1263* (2023.01)
*H04W 72/23* (2023.01)

(52) U.S. Cl.
CPC ....... *H04W 72/1263* (2013.01); *H04W 72/23* (2023.01); *H04W 76/11* (2018.02)

(56) References Cited

U.S. PATENT DOCUMENTS

| | | | |
|---|---|---|---|
| 2012/0281614 A1 | 11/2012 | Deng et al. | |
| 2015/0326307 A1 | 11/2015 | Sawai | |
| 2016/0088594 A1 | 3/2016 | Xiong et al. | |
| 2016/0295345 A1 | 10/2016 | Oh | |
| 2017/0078830 A1 | 3/2017 | Wu et al. | |
| 2017/0171841 A1 | 6/2017 | Chen et al. | |
| 2018/0035242 A1 | 2/2018 | Yi | |
| 2019/0014561 A1 | 1/2019 | Takeda et al. | |
| 2019/0037555 A1* | 1/2019 | Kim | H04W 72/1268 |
| 2019/0059057 A1* | 2/2019 | Peng | H04W 52/262 |
| 2019/0182855 A1* | 6/2019 | Babaei | H04W 74/002 |
| 2019/0207737 A1* | 7/2019 | Babaei | H04W 76/11 |
| 2019/0222385 A1* | 7/2019 | Hessler | H04L 27/2613 |
| 2019/0223199 A1* | 7/2019 | Park | H04W 72/1289 |
| 2020/0359364 A1* | 11/2020 | Zhu | H04W 72/042 |
| 2021/0127409 A1* | 4/2021 | Park | H04W 72/0446 |

FOREIGN PATENT DOCUMENTS

| | | |
|---|---|---|
| CN | 107078990 A | 8/2017 |
| EP | 3731582 A1 | 10/2020 |
| WO | 2016159680 A1 | 10/2016 |
| WO | 2017119460 A1 | 7/2017 |
| WO | 2019150185 A1 | 8/2019 |

OTHER PUBLICATIONS

International Search Report and Written Opinion of the International Searching Authority in connection with International Application No. PCT/KR2019/001573 dated May 20, 2019, 9 pages.
Huawei et al., "Discussion on narrow band feD2D communication," R1-1712129, 3GPP TSG RAN WG1 Meeting #90, Prague, Czech Republic, Aug. 21-25, 2017, 4 pages.
Zte et al., "Detailed sub-PRB allocation design for MTC," R1-1717199, 3GPP TSG RAN WG1 Meeting #90bis, Prague, Czechia, Sep. 9-13, 2017, 6 pages.
European Patent Office "Supplementary European Search Report" dated Sep. 29, 2021, in connection with counterpart European Patent Application No. 19752038.0, 10 pages.
Ericsson: "Even further enhanced MTC for LTE", 3GPP TSG RAN meeting #78, Lisbon, Portugal, Dec. 18-21, 2017, RP-172660, 14 pages.
Communication pursuant to Article 94(3) EPC dated Mar. 4, 2022, in connection with European Application No. 19752038.0, 8 pages.
China National Intellectual Property Administration, "Office Action," dated Mar. 29, 2023, in connection with Chinese Patent Application No. 201810226865.8, 12 pages.
China National Intellectual Property Administration, "Office Action," dated Apr. 28, 2023, in connection with Chinese Patent Application No. 201810129523.4, 13 pages.
European Patent Office, "Communication pursuant to Article 94(3) EPC," dated Mar. 17, 2023, in connection with European Patent Application No. 19752038.0, 11 pages.
MCC Support, "Final Report of 3GPP TSG RAN WG1 #90bis v1.0.0," R1-1719301, 3GPP TSG RAN WG1 Meeting #91, Reno, USA, Nov. 27-Dec. 1, 2017, 206 pages.
3GPP TS 36.212 V14.5.1; Technical Report; 3rd Generation Partnership Project; Technical Specification Group Radio Access Network; Evolved Universal Terrestrial Radio Access (E-UTRA); Multiplexing and channel coding (Release 14); 199 pages.
Intel Corporation, "UCI and DL HARQ-ACK feedback for NB-IoT," 3GPP TSG RAN WG1 NB-IoT Ad-Hoc Meeting #2 R1-161902, Sophia Antipolis, France, Mar. 22-24, 2016, 7 pages.

* cited by examiner

METHOD FOR TRANSMITTING PHYSICAL CHANNELS, USER EQUIPMENT THEREFOR, METHOD AND USER EQUIPMENT FOR RELAY TRANSMISSION

CROSS-REFERENCE TO RELATED APPLICATIONS

This application is a 371 National Stage of International Application No. PCT/KR2019/001573, filed Feb. 8, 2019, which claims priority to Chinese Patent Application No. 201810129523.4, filed Feb. 8, 2018, and Chinese Patent Application No. 201810226865.8, filed Mar. 19, 2018, the disclosures of which are herein incorporated by reference in their entirety.

BACKGROUND

1. Field

The present invention relates to the field of wireless communication technologies, and more particularly, to a method for transmitting physical channels and a user equipment therefor, a method and user equipment for relay transmission.

2. Description of Related Art eMTC (Enhanced Machine Type Communication) is a type of IoT-application-oriented technology. Compared with LTE terminals, eMTC terminals are more likely to be in deep coverage scenarios such as basement or underground tube wells. Therefore, eMTC achieves enhanced coverage by reducing transmission bandwidth to increase the power spectral density. After the bandwidth is reduced, the transmission bandwidth of the eMTC is only 1080 kHz. 6 consecutive Physical Resource Blocks (PRBs) in the LTE system forms one eMTC narrowband. All the physical channel scheduling of the eMTC takes the eMTC narrowband as a unit. Depending on the different bandwidth configurations of the LTE system, the number and location of eMTC narrowbands that may be deployed in the intra-band are different.

In the current eMTC system, the base station first indicates a narrowband index, which is used for enabling the terminal to determine the narrowband at which the PRB used for Physical Uplink Share Channel (PUSCH) transmission is located, and further indicating a PRB index within the narrowband used for PUSCH transmission. For terminals in a CE Mode B, the PRB used for PUSCH transmission allocated by a base station may be one PRB or two consecutive PRBs within one narrowband. For terminals in a CE Mode A, the base station may allocate different numbers of PRBs for PUSCH transmission by the terminals according to the bandwidth capability of the terminals.

Resource allocation for physical channel transmission in units of PRBs increases the power spectral density of the uplink transmission to a certain extent, but still fails to meet the further requirement of the machine communication system for coverage enhancement. In view of this, it is necessary to provide a method and user equipment for transmitting physical channels, which is capable of solving the above technical problem.

Furthermore, in the LTE (Long Term Evolution) technology, information exchange is performed between the base station and the terminal equipments (UEs). Since some of the UEs may be far away from the base station, these terminals cannot access to the base station, or their signals are poor. In order to meet the requirements of communication rate and communication quality, the relay technology is needed to conduct transmission between the terminals and the base station, so as to ensure information exchange between the terminals and the base station, and improve coverage extension of the cells, the capacities thereof and the uniformization of their throughputs. Thus, how to conduct the relay transmission is a key problem of the related art.

The relay transmission methods in the prior art all belong to layer 3 based relay forwarding. As to these methods, when remote nodes switch relay paths (for example, switching from relay transmission to direct transmission with base station, or switching relay nodes) and conduct handover, service continuity cannot be guaranteed.

In view of the above, it is necessary to provide a relay transmission method and apparatus capable of solving the above technical problems.

SUMMARY

The present application is intended to overcome the defects in the prior art and provides a method and apparatus for transmitting physical channels, which may significantly increase the power spectral density.

In order to achieve the above purpose, provided is a method for transmitting physical channels, including the following steps:

determining, according to a configuration of a base station, transmission subcarrier resources;

transmitting or receiving, on the transmission subcarrier resources, the physical channels.

Preferably, the step of determining, according to a configuration of a base station, transmission subcarrier resources, includes:

determining, according to the configuration of the base station, a narrowband index;

determining, according to the narrowband index/indices, allocated subcarrier resources within the configured narrowband;

determining the transmission subcarrier resources in the allocated subcarrier resources.

Preferably, the step of determining the transmission subcarrier resources in the allocated subcarrier resources, includes:

determining the number and the index of the transmission subcarriers in the allocated subcarrier resources.

Preferably, the step of determining the number of the transmission subcarriers in the allocated subcarrier resources, includes:

determining, according to any indication of the number of the transmission subcarriers, a position of the allocated subcarrier or Modulation and coding scheme (MCS) of the allocated subcarriers, the number of the transmission subcarriers in the allocated subcarrier resources.

Preferably, the step of determining the index of the transmission subcarrier in the allocated subcarrier resources, includes:

determining, according to the index of the allocated subcarriers and a cell identify, an index of the transmission subcarriers in the allocated subcarrier resources; or determining, according to the index of the allocated subcarriers and a radio network temporary identify (RNTI), the index of the transmission subcarriers in the allocated subcarrier resources.

Preferably, before the step of transmitting or receiving the physical channels on the transmission subcarrier resources, the followings are included: determining, according to an MCS index or a transport block (TB) size index configured by the base station, the MCS, the TB size and the number of resource units corresponding to the MCS index or the TB size index, wherein, the correspondence between the MCS index or the TB size index and the MCS, the TB size and the number of the resource units are predetermined by system or determined according to the number of the transmission subcarriers or the modulation scheme;

the step of transmitting or receiving the physical channels on the transmission subcarrier resources, includes: transmitting or receiving the physical channels on the transmission subcarrier resources according to the determined MCS, the TB size and the number of the resource units.

Preferably, before the step of transmitting the physical channels on the transmission subcarrier resources, the followings are included: determining, according to the configuration of the base station, frequency-domain resources for frequency hopping transmission;

the step of transmitting the physical channels on the transmission subcarrier resources, includes: transmitting, on the frequency-domain resources for frequency hopping transmission, the physical channels, wherein the frequency-domain resources for frequency hopping transmission includes the transmission subcarrier resources.

Preferably, the step of transmitting, on the frequency-domain resources for frequency hopping transmission, the physical channels, includes:

transmitting, on the frequency-domain resources for frequency hopping transmission, the physical channels in a frequency hopping manner, the frequency hopping manner includes: using N subframes as a hopping interval, wherein N is a positive integer, using a same transmission subcarrier resource within each hopping interval, and using different transmission subcarrier resources on two continuous hopping intervals;

the step of using different transmission subcarrier resources on the two continuous hopping intervals, includes: the transmission subcarrier resources on the two continuous hopping intervals are on different physical resources blocks (PRB) of the narrowband with same index, wherein PRBs have different relative indices; or the transmission subcarrier resources on the two continuous hopping intervals are on the PRBs of different narrowbands, wherein PRBs have the same relative index within the narrowbands; or the transmission subcarrier resources on the two continuous hopping intervals are on the PRBs of different narrowbands, wherein PRBs have different relative indices within the narrowbands; or the transmission subcarrier resources on the two continuous hopping intervals are on the subcarriers of the same PRB, which have different relative index within the PRB.

Preferably, the step of determining frequency-domain resources for frequency hopping transmission according to the configuration of the base station, includes:

determining, according to the configuration of the base station, narrowband index/indices for frequency hopping transmission, PRB index/indices for frequency hopping transmission and subcarrier index/indices for frequency hopping transmission;

determining, according to the narrowband index/indices for frequency hopping transmission, the PRB index/indices for frequency hopping transmission and the subcarrier index/indices for frequency hopping transmission, the frequency-domain resources for frequency hopping transmission.

Preferably, the step of determining, according to the configuration of the base station, the narrowband index/indices for frequency hopping transmission, includes:

determining, according to parameters configured by the base station, the narrowband index/indices for frequency hopping transmission, the parameters comprises the allocated narrowband index, the subframe number, a frequency hopping direction indication, a hopping interval and a hopping offset, or the parameters comprises the allocated narrowband index, the subframe number, a hopping interval and a frequency narrowband group;

the frequency hopping direction indication is used for a relative position relation between other narrowband used in frequency hopping transmission and the allocated narrowband, the frequency hopping narrowband group is used for determining narrowband resources used in frequency hopping transmission.

Preferably, the step of determining, according to the configuration of the base station, the subcarrier index/indices for frequency hopping transmission, includes:

determining the subcarrier index/indices for frequency hopping transmission according to the parameters configured by the base station, the parameters comprises a subframe index, a hopping interval, an index of an initial transmission subcarrier.

Preferably, the step of determining the transmission subcarrier resources according to the configuration of the base station, includes: determining the shifted transmission subcarrier resources according to the configuration of the base station;

the step of transmitting or receiving the physical channels on the transmission subcarrier resources, includes: transmitting or receiving the physical channels on the shifted transmission subcarrier resources.

Preferably, the step of determining the shifted transmission subcarrier resources according to the configuration of the base station, comprising one of the followings:

determining, according to the narrowband shift indication configured by the base station, shifted transmission subcarrier resources;

acquiring the shift manner of starting PRB index for each narrowband according to a correspondence between system bandwidth and a narrowband shift manner or according to bit mapping, and determining the shifted transmission subcarrier resources;

performing frequency-domain shifting on the allocated physical resources according to a frequency-domain starting position shift indication of the allocated physical resources configured by the base station, and determining the shifted transmission subcarrier resources, the frequency-domain starting position shift indication of the allocated physical resources is used for indicating the shifting offset on the starting PRB index or the shifting offset on the starting subcarrier index in the physical resources allocated for physical channel transmission.

Preferably, transmitting or receiving the physical channels on the shifted transmission subcarrier resources, comprising transmitting or receiving the physical channels on the shifted transmission subcarrier resources in one of the following scenarios:

in the coverage enhancement (CE) mode supporting partial PRB transmission, the CE mode A and the CE mode B.

In order to achieve the above purpose, the present application further provides a user equipment, including:
  module for determining transmission subcarrier, configured to determine transmission subcarrier resources according to a configuration of a base station;
  module for transmitting/receiving physical channel, configured to transmit or receive physical channels on the transmission subcarrier resources.

Preferably, determining, according to a configuration of a base station, transmission subcarrier resources, includes:
  determining, according to the configuration of the base station, a narrowband index;
  determining, according to the narrowband index/indices, allocated subcarrier resources within the configured;
  determining the transmission subcarrier resources in the allocated subcarrier resources.

Preferably, determining the transmission subcarrier resources in the allocated subcarrier resources, includes:
  determining the number and the index of the transmission subcarriers in the allocated subcarrier resources.

Preferably, determining the number of the transmission subcarriers in the allocated subcarrier resources, includes:
  determining, according to any indication of the number of the transmission subcarriers, a position of the allocated subcarrier or Modulation and coding scheme (MCS) of the allocated subcarriers, the number of the transmission subcarriers in the allocated subcarrier resources.

Preferably, determining the index of the transmission subcarrier in the allocated subcarrier resources, includes:
  determining, according to the index of the allocated subcarriers and a cell identify, an index of the transmission subcarriers in the allocated subcarrier resources; or
  determining, according to the index of the allocated subcarriers and a radio network temporary identify (RNTI), the index of the transmission subcarriers in the allocated subcarrier resources.

Preferably,
  before transmitting or receiving the physical channels on the transmission subcarrier resources, the followings are comprised: determining, according to an MCS index or a transport block (TB) size index configured by the base station, the MCS, the TB size and the number of resource units corresponding to the MCS index or the TB size index, wherein, a correspondence between the MCS index or the TB size index and the MCS, the TB size and the number of the resource units are predetermined by a system or determined according to the number of the transmission subcarriers or the modulation scheme;
  transmitting or receiving the physical channels on the transmission subcarrier resources, includes: transmitting or receiving the physical channels on the transmission subcarrier resources according to the determined MCS, the TB size and the number of the resource units.

Preferably,
  before transmitting the physical channels on the transmission subcarrier resources, the followings are included:
  determining, according to the configuration of the base station, frequency-domain resources for frequency hopping transmission;
  transmitting the physical channels on the transmission subcarrier resources, includes: transmitting, on the frequency-domain resources for frequency hopping transmission, the physical channels, wherein the frequency-domain resources for frequency hopping transmission includes the transmission subcarrier resources.

Preferably, transmitting, on the frequency-domain resources for frequency hopping transmission, the physical channels, includes:
  transmitting, on the frequency-domain resources for frequency hopping transmission, the physical channels in a frequency hopping manner, the frequency hopping manner includes: using N subframes as a hopping interval, wherein N is a positive integer, using a same transmission subcarrier resource within each hopping interval, and using different transmission subcarrier resources on two continuous hopping intervals;
  using different transmission subcarrier resources on the two continuous hopping intervals, includes: the transmission subcarrier resources on the two continuous hopping intervals are on different physical resources blocks (PRB) of the narrowband with same index, wherein PRBs have different relative indices; or the transmission subcarrier resources on the two continuous hopping intervals are on the PRBs of different narrowbands, wherein PRBs have the same relative index within the narrowbands; or the transmission subcarrier resources on the two continuous hopping intervals are on the PRBs of different narrowbands, wherein PRBs have different relative indices within the narrowbands; or the transmission subcarrier resources on the two continuous hopping intervals are on the subcarriers of the same PRB, which have different relative index within the PRB.

Preferably, determining frequency-domain resources for frequency hopping transmission according to the configuration of the base station, includes:
  determining, according to the configuration of the base station, narrowband index/indices for frequency hopping transmission, PRB index/indices for frequency hopping transmission and subcarrier index/indices for frequency hopping transmission;
  determining, according to the narrowband index/indices for frequency hopping transmission, the PRB index/indices for frequency hopping transmission and the subcarrier index/indices for frequency hopping transmission, the frequency-domain resources for frequency hopping transmission.

Preferably, determining, according to the configuration of the base station, of the narrowband index/indices for frequency hopping transmission, includes:
  determining, according to parameters configured by the base station, the narrowband index/indices for frequency hopping transmission, the parameters comprises the allocated narrowband index, the subframe number, a frequency hopping direction indication, a hopping interval and a hopping offset, or the parameters comprises the allocated narrowband index, the subframe number, a hopping interval and a frequency narrowband group;
  the frequency hopping direction indication is used for a relative position relation between other narrowband used in frequency hopping transmission and the allocated narrowband, the frequency hopping narrowband group is used for determining narrowband resources used in frequency hopping transmission.

Preferably, determining, according to the configuration of the base station, of the subcarrier index/indices for frequency hopping transmission, includes:

determining the subcarrier index/indices for frequency hopping transmission according to the parameters configured by the base station, the parameters comprises the subframe index, the hopping interval, the index/indicies of initial transmission subcarrier(s).

Preferably, determining the transmission subcarrier resources according to the configuration of the base station, includes: determining the shifted transmission subcarrier resources according to the configuration of the base station;

transmitting or receiving the physical channels on the transmission subcarrier resources, includes: transmitting or receiving the physical channels on the shifted transmission subcarrier resources.

Preferably, determining the shifted transmission subcarrier resources according to the configuration of the base station, includes one of the followings:

determining, according to the narrowband shift indication configured by the base station, shifted transmission subcarrier resources;

acquiring the shift manner of starting PRB index for each narrowband according to a correspondence between system bandwidth and narrowband shift manner or according to bit mapping, and determining the shifted transmission subcarrier resources;

performing frequency-domain shifting on the allocated physical resources according to a frequency-domain starting position shift indication of the allocated physical resources configured by the base station, and determining the shifted transmission subcarrier resources, the frequency-domain starting position shift indication of the allocated physical resources is used for indicating the shifting offset on the starting PRB index or the shifting offset on the starting subcarrier index in the physical resources allocated for physical channel transmission.

Preferably, transmitting or receiving the physical channels on the shifted transmission subcarrier resources, includes transmitting or receiving the physical channels on the shifted transmission subcarrier resources in one of the following scenarios:

in the coverage enhancement (CE) mode supporting partial PRB transmission, the CE mode A and the CE mode B.

Compared with the prior art, the technical effects of the present invention include, but not limited to, significantly reducing the power spectral density of the uplink transmission and effectively achieving the coverage enhancement by subdividing the resource allocation unit of the transmission physical channel from PRBs to subcarriers.

The present invention aims to overcome the defects of the prior art and to provide a relay transmission method and apparatus with better service continuity.

In order to achieve the above object, the present invention provides a method for relay transmission, comprising the following steps:

a first UE receives a physical downlink control channel (PDCCH);

the first UE acquires scheduling information of a first data channel and scheduling information of a second data channel according to the PDCCH, the first data channel is a physical channel that is received by the first UE and carries data of a second UE, and the second data channel is a physical channel that is forwarded by the first UE and carries data of the second UE;

the first UE forwards data between a base station and the second UE, according to scheduling information of the first data channel and scheduling information of the second data channel.

Preferably, the first data channel is a first physical uplink data channel (PUSCH), and the second data channel is a second PUSCH; or the first data channel is a first physical downlink data channel (PDSCH), and the second data channel is a second PDSCH.

Preferably, the first UE acquiring the scheduling information of the first data channel and the scheduling information of the second data channel according to the PDCCH comprises:

the first UE receives the first PDCCH, the first PDCCH is a PDCCH that is transmitted by the base station to the first UE, and the first UE acquires scheduling information of the first data channel and scheduling information of the second data channel according to the first PDCCH, and signals the scheduling information of the second data channel to the second UE via the second PDCCH; or the first data channel is a first PDSCH, the second data channel is a second PDSCH, and the first UE receives the first PDCCH, the first PDCCH is a PDCCH that is transmitted by the base station to the second UE, and the first UE acquires the scheduling information of the second PDSCH according to the first PDCCH, and acquires the scheduling information of the first PDSCH according to a predefined relationship between scheduling information of the second PDSCH and scheduling information of the first PDSCH; or the first data channel is a first PUSCH, the second data channel is a second PUSCH, and the first UE receives the first PDCCH, the first PDCCH is a PDCCH that is transmitted by the base station to the second UE, and the first UE acquires the scheduling information of the first PUSCH according to the first PDCCH, and acquires the scheduling information of the second PUSCH according to a predefined relationship between scheduling information of a second PUSCH and scheduling information of a first PUSCH; or the first data channel is the first PDSCH, and the second data channel is the second PDSCH, and the first UE receives the first PDCCH and the second PDCCH, the first PDCCH is a PDCCH that is transmitted by the base station to the first UE, and the second PDCCH is a PDCCH that is transmitted by the base station to the second UE, and the first UE acquires the scheduling information of the second PUSCH according to the second PDCCH, and acquires the scheduling information of the first PUSCH according to the first PDCCH or the combination of the first PDCCH and the second PDCCH; or the first data channel is the first PUSCH, and the second data channel is the second PUSCH, and the first UE receives the first PDCCH and the second PDCCH, the first PDCCH is a PDCCH that is transmitted by the base station to the first UE, and the second PDCCH is a PDCCH that is transmitted by the base station to the second UE; the first UE acquires the scheduling information of the first PUSCH according to the second PDCCH, and acquires the scheduling information the second PUSCH according to the first PDCCH or the combination of the first PDCCH and the second PDCCH.

Preferably, the first UE acquiring scheduling information of the first data channel and scheduling information of the second data channel according to the first PDCCH comprises:
the first UE acquires scheduling information of the first data channel carried in the first PDCCH, and acquires scheduling information of the second data channel according to a predefined relationship between scheduling information of the first data channel and scheduling information of the second data channel; or
the first UE acquires scheduling information of the second data channel carried in the first PDCCH, and acquires scheduling information of the first data channel according to a predefined relationship between scheduling information of the first data channel and scheduling information of the second data channel; or
the first UE acquires scheduling information of the first data channel and scheduling information of the second data channel carried in the first PDCCH.

Optionally, the signaling the scheduling information of the second data channel to the second UE via the second PDCCH comprises:
the first UE acquires transmitting time and/or scheduling information of the second PDCCH carried in the first PDCCH, and transmits the second PDCCH carrying the scheduling information of the second data channel to the second UE, according to the acquired transmitting time and/or scheduling information of the second PDCCH; or
the first UE acquires the scheduling information of the second PDCCH, according to the scheduling information of the first PDCCH and a predefined relationship between transmitting time and/or scheduling information of the first PDCCH and transmitting time and/or scheduling information of the second PDCCH, and transmits the second PDCCH carrying the scheduling information of the second data channel to the second UE, according to the acquired scheduling information of the second PDCCH.

Preferably, the method further comprises:
the first UE receives the first physical uplink control channel (PUCCH) from the second UE, the first PUCCH carries the uplink control information (UCI) of the second UE, the first UE transmits the second PUCCH to the base station, and the UCI of the second UE is forwarded via the second PUCCH.

Preferably, the UCI of the second UE comprises at least one of the following:
HARQ-ACK information of a PDSCH between the base station and the second UE;
channel state information (CSI) of the downlink between the base station and the second UE;
scheduling request (SR) of the second UE.

Preferably, the second PUCCH further comprises: information of decoding, by the first UE, of the received physical channel carrying downlink data of the second UE.

Preferably, there is a predefined relationship between the transmitting time and/or scheduling information of the first PUCCH and the transmitting time and/or scheduling information of the second PUCCH; or the transmitting time and/or scheduling information of the first PUCCH and transmitting time and/or scheduling information of the second PUCCH are separately signaled by the base station to the first UE.

Preferably, the first UE monitors the DCI transmitted by the base station to the second UE to acquire the transmitting time and/or scheduling information of the first PUCCH.

Preferably, the transmitting time and/or scheduling information of the second PUCCH is obtained in the DCI transmitted by the base station to the first UE.

Preferably, the second PUCCH uses the PUCCH configuration of the first UE or the second UE.

Preferably, the forwarding data between the base station and the second UE comprises:
a. the first UE decodes the first data channel;
b. the first UE transmits a first PUCCH to the base station, the first PUCCH carries the HARQ-ACK information that whether the first UE successfully decodes the first data channel;
c. when the first UE successfully decodes the first data channel, the first UE receives the scheduling information of the second data channel, and forwards the first data channel according to the scheduling information of the second data channel; when the first UE unsuccessfully decodes the first data channel, the first UE receives the retransmission of the first data channel and performs the steps a-c.

Preferably, when the first data channel is a PUSCH, the scheduling information of the physical channel used by the retransmitted uplink data is the same as the scheduling information of the physical channel used by the initially-transmitted uplink data; or
the scheduling information of the physical channel used by the retransmitted uplink data is semi-statically configured by the base station.

Preferably, further comprises:
d. after the second UE decodes the received downlink data, the first UE receives the second PUCCH transmitted by the second UE, and the second PUCCH carries the HARQ-ACK information that whether the second UE successfully decodes the received downlink data;
e. when the second PUCCH carries the ACK information that the second UE successfully decodes the received downlink data, the first UE transmits a third PUCCH to the base station, the third PUCCH carries the ACK information that the second UE successfully decodes the received downlink data; when the second PUCCH carries the NACK information that the second UE unsuccessfully decodes the received downlink data, the steps d-e are performed after the second UE receives the retransmitted downlink data.

Preferably, the scheduling information of the physical channel used by the retransmitted downlink data is the same as the scheduling information of the physical channel used by the initially-transmitted downlink data; or
the scheduling information of the physical channel used by the retransmitted downlink data is semi-statically configured by the base station.

Preferably, the first data channel is a first PUSCH, and the second data channel is a second PUSCH;
the second PUSCH further piggybacks the information of decoding the first PUSCH by the first UE.

Preferably, the forwarding data between the base station and the second UE comprises:
performing equalization processing on the first data channel and then forwarding; or
performing decoding processing on the first data channel and then forwarding; or
performing decoding processing and HARQ combine on the first data channel and then forwarding.

In order to achieve the above object, the invention also provides a first user equipment UE, comprises:

a receiving module, configured to receive a physical downlink control channel (PDCCH);

an acquiring module, configured to acquire, according to the PDCCH, scheduling information of a first data channel and scheduling information of a second data channel, the first data channel is a physical channel that is received by the first UE and carries data of the second UE, and the second data channel is a physical channel that is forwarded by the first UE and carries data of the second UE;

a forwarding module, configured to forward data between the base station and the second UE according to the scheduling information of the first data channel and the scheduling information of the second data channel.

In order to achieve the above object, the invention also provides a first user equipment (UE), comprises:

a processor; and a memory configured to store machine readable instructions that, when executed by the processor, cause the processor to perform the above-mentioned method for relay transmission according to any one of claims 1-18.

Compared with the prior art, the technical effects of the present invention include, but are not limited to, providing relay transmission service for a remote node of a mobile communication network at the layer 1/layer 2 through the relay node, thereby ensuring service continuity of the remote node when it switches the relay path or performs handover and providing good compatibility with existing network deployments, which greatly improve success rate of data transmissions of a remote node.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, for those skilled in the art, other drawings may be obtained based on these drawings without creative efforts.

DETAILED DESCRIPTION

Figure 1:
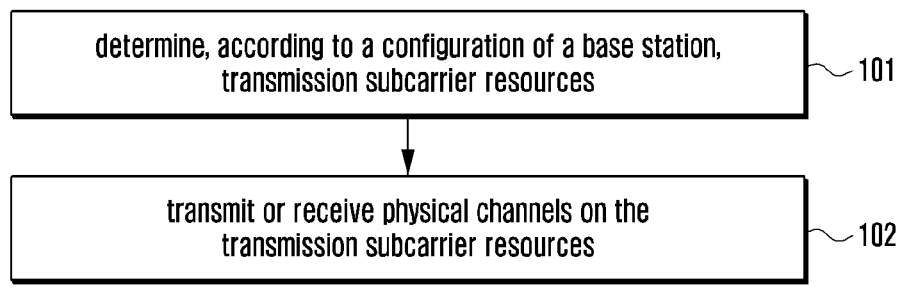
FIG. 1 is a flowchart of a method for transmitting physical channels according to the present invention.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skilled in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skilled in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

Referring to FIG. 1, a method of transmitting physical channels disclosed in the present disclosure includes the following steps:

Step 101: determining transmission subcarrier resources according to a configuration of a base station;

Step 102: transmitting or receiving physical channels on the transmission subcarrier resources.

I. Method for Configuring Subcarrier Allocation and Transmission Subcarrier.

The following describes the partial PRB transmission via PUSCH channel as an example, and the method may be used for other uplink and downlink physical channels.

When the terminal is configured to the coverage enhancement (CE) mode supporting the subcarrier level transmission, the terminal receives the downlink control information (DCI) corresponding to the CE mode and acquires the configuration information of the uplink subcarrier allocation and transmission subcarriers. The terminal first acquires a narrowband index, which indicates the narrowband at which the subcarriers allocated for the PUSCH transmission are located, and may be acquired through DCI indication or high-layer signaling indication. After acquiring the narrowband index/indices, the terminal further acquires subcarrier configuration information used for actually transmitting the PUSCH and subcarrier allocation information. The allocated subcarriers are subcarrier resources acquired by the terminal according to the subcarrier allocation information in the DCI and/or the higher layer signaling configuration; a subcarrier used for actually transmitting the PUSCH (hereinafter referred to as a transmission subcarrier) is the subcarrier resources used for transmitting PUSCH by the terminal, the transmission subcarrier may be identical to the allocated subcarrier, or may be a subset of the allocated subcarriers.

Configuration information of transmission subcarrier includes: configuration information of allocated subcarriers and configuration information of a position of the transmission subcarrier in the allocated subcarrier. The configuration information of the allocated subcarrier at least includes one of: a PRB index of the allocated subcarrier and an index of the allocated subcarrier in PRB, wherein the PRB index/indices and the index of the allocated subcarrier in PRB may be configured through the DCI indication and the higher-layer signaling, so as to indicate separately or in a jointly coding manner. The method for acquiring transmission subcarrier configuration by the terminal may be that: the terminal acquires a configuration of the allocated subcarrier, and determines the configuration of the transmission subcarrier according to a system rule, wherein the system rule at least contains one of the following contents:

(1) The transmission subcarrier may be different from the allocated subcarrier if and only if the number of allocated subcarriers is a specific value; otherwise, the transmission subcarrier is the same as the allocated subcarrier. For example, the number of subcarriers that the base station may allocate to the terminal is 12 (a single PRB), 6 and 3. If and only if the number of allocated subcarriers is 3, the terminal shall determine, according to the indication, that the transmission subcarrier is the two consecutive subcarriers in the allocated three subcarriers or is the allocated three subcarriers. When the number of the allocated subcarriers is 12 and 6, the transmission subcarrier is the allocated subcarrier.

(2) The terminal determines the number of transmission subcarriers according to certain system rules. The number of transmission subcarriers may not be the same as the number of allocated subcarriers. Preferably, the method for determining the number of transmission subcarriers may be that the terminal determines the number of subcarriers according to the indication about the number of subcarriers. For example, when the number of allocated subcarriers is 3, the terminal reads the indication information and determines that the transmission subcarrier is the two consecutive subcarriers in the allocated three subcarriers or the allocated three subcarriers, wherein, the indication information may indicate that the number of the transmission subcarriers is 2 or 3 using one bit in the DCI. Preferably, the method for determining the number of the transmission subcarriers may be that: the terminal determines the number of the transmission subcarriers according to the position of the allocated subcarriers. One example is that, when the number of the allocated subcarriers is 3, the terminal determines the number of the transmission subcarriers according to the position of the allocated subcarriers, for example, if the index of the initial subcarrier in the allocated subcarriers may be divisible by 3, then the number of the transmission subcarriers is 3, which is the same as the number of the allocated subcarriers; otherwise, the number of the transmission subcarriers is 2. Preferably, the method for determining the number of the transmission subcarriers may be that: the terminal determines the number of the transmission subcarriers according to the MCS index. One example is that, when the number of the allocated subcarriers is 3, the terminal determines the number of the transmission subcarriers according to the indication of the modulation scheme in the DCI. When the modulation scheme is BPSK, the number of the transmission subcarrier is 2, and when the modulation scheme is QPSK, the number of the transmission subcarrier is 3. One implementation of the MCS index information is 1-bit indication information within an MCS index field which indicating the modulation scheme for PUSCH transmission is BPSK or QPSK.

(3) The terminal acquires the subcarrier position actually used by PUSCH transmission, that is, the index of the transmission subcarrier. When the number of transmission subcarriers is the same as the number of allocated subcarriers, the index of the transmission subcarrier is the same as the index of the allocated subcarrier. When the number of transmission subcarriers is different from the number of allocated subcarriers, one or more of the allocated subcarriers is used as the transmission subcarrier.

Figure 2:
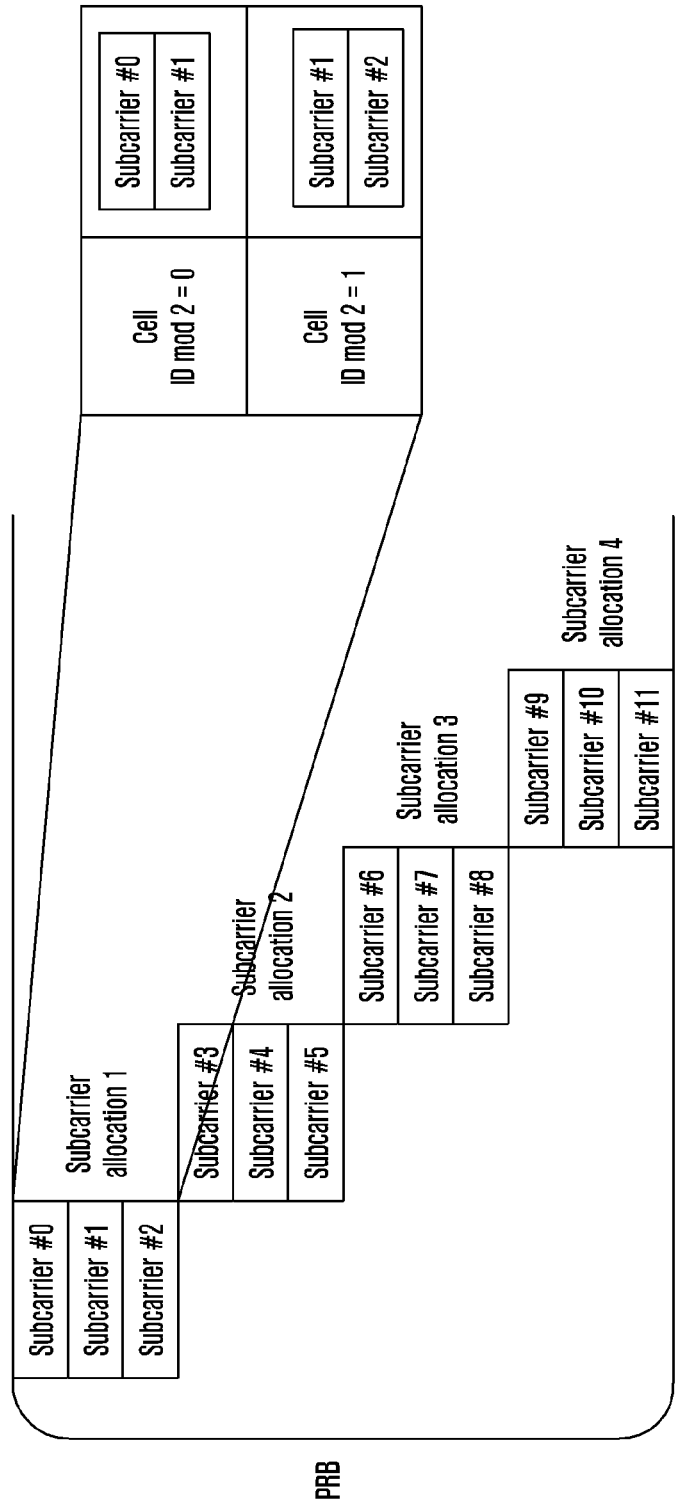
FIG. 2 is a schematic diagram of a first transmission subcarrier allocation scheme according to the present invention.
Figure 3:
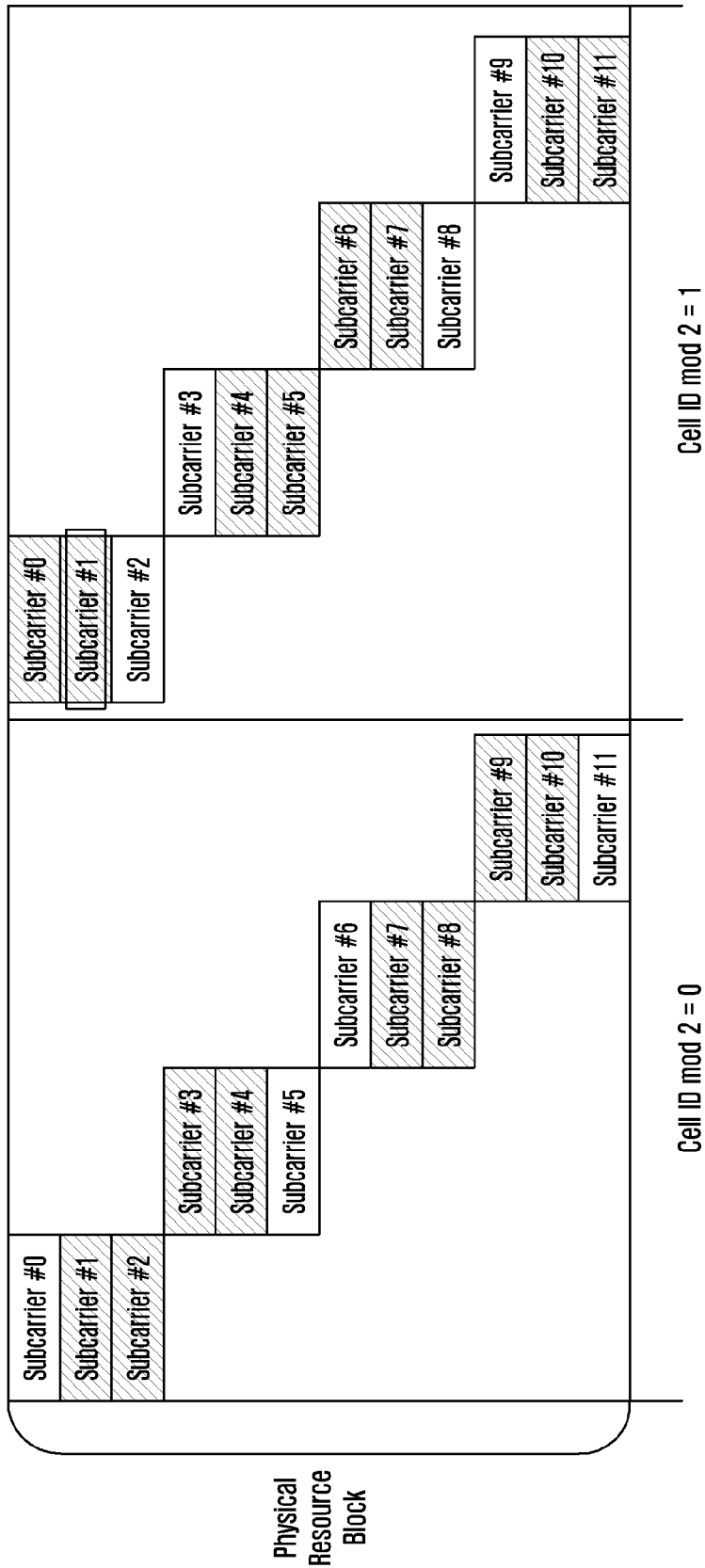
FIG. 3 is a schematic diagram of a second transmission subcarrier allocation scheme according to the present invention.

Preferably, the method for acquiring the transmission subcarriers by the terminal may be: determining a subcarrier index in the allocated subcarriers used for PUSCH transmission according to a system parameter or a user parameter, wherein the system parameter may be a cell identity (cell ID), the user parameter may be a Radio Network Temporary Identity (RNTI), such as a cell radio network temporary identifier (C-RNTI), a random-access radio network temporary identifier (RA-RNTI) and the like. An example of a specific method for determining, by the terminal, transmission subcarriers according to a cell ID is that, when the terminal acquires that the number of allocated subcarriers is greater than 3 or the number of allocated subcarriers is 3 and the number of transmission subcarriers is 3 either, the index of the transmission subcarrier is the same as the index of the allocated subcarrier. When the terminal acquires that the number of the allocated subcarriers is 3 and the number of the transmission subcarriers is 2, as shown in FIG. 2, the terminal determines the subcarriers in the allocated subcarriers used for PUSCH transmission according to the value of cell ID mod 2: when cell ID mod 2=0, the transmission subcarriers of PUSCH are the first two (or the last two) consecutive subcarriers in the allocated three subcarriers; otherwise, the transmission subcarriers of PUSCH are the last two (or the first two) consecutive subcarriers in the allocated three subcarriers. This method may enable that the resource positions are not completely overlapped while users in different cells perform 2-subcarrier PUSCH transmission, which is beneficial for reducing inter-cell interference. In this example, when the terminal determines the positions of the two subcarriers used for PUSCH transmission among the three allocated subcarriers according to the cell ID, the relative position of the transmission subcarriers in the allocated subcarriers may be the same or different according to the positions of the allocated subcarriers. An example with different relative positions is shown in FIG. 3. When the allocated subcarriers are {#0, #1, #2}, cell ID mod 2=0 indicates that the last two of the allocated subcarriers are used for PUSCH transmission, when the allocated subcarriers are {#9, #10, #11}, cell ID mod 2=0 indicates that the first two of the allocated subcarriers are used for PUSCH transmission.

Figure 4:
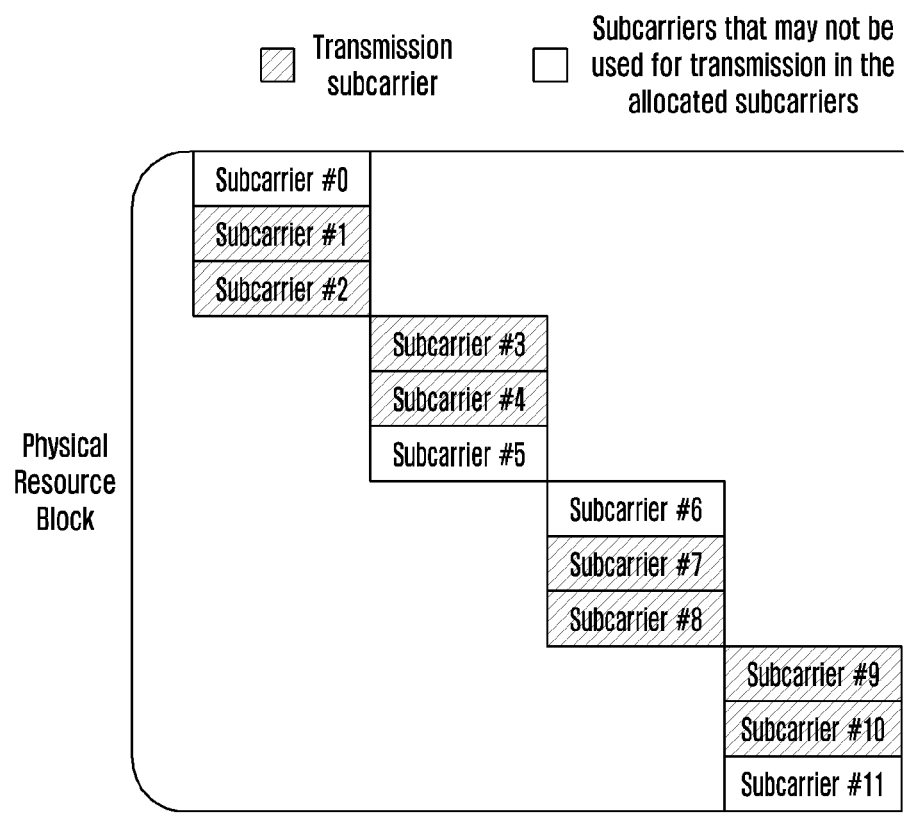
FIG. 4 is a schematic diagram of a third transmission subcarrier allocation scheme according to the present invention.
Figure 5:
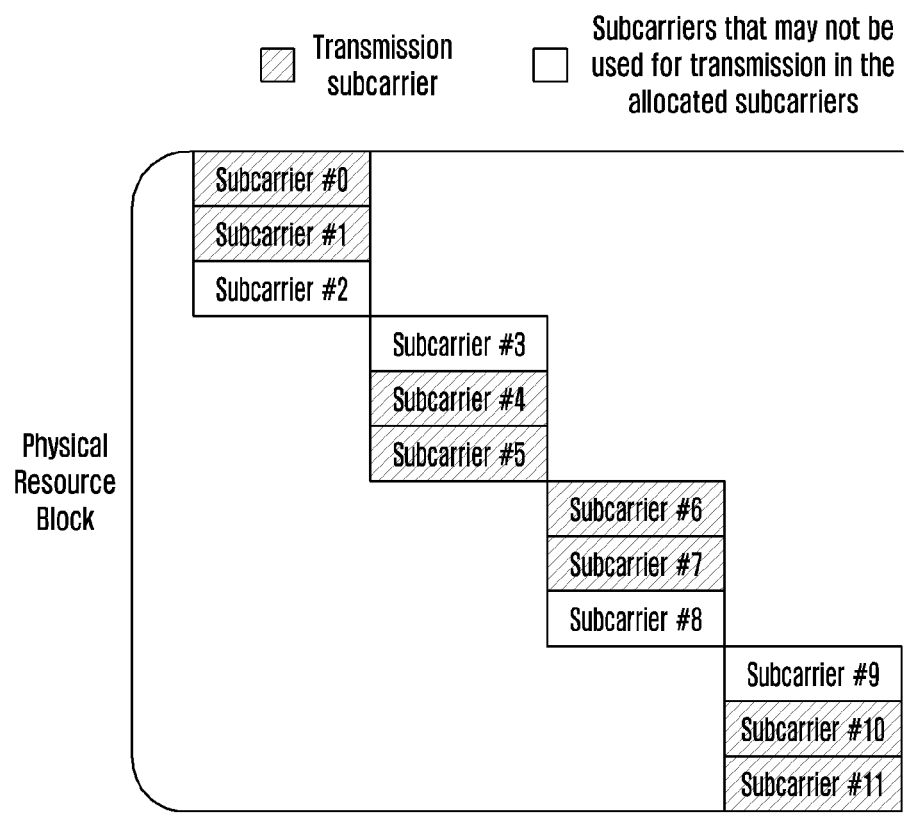
FIG. 5 is a schematic diagram of a fourth transmission subcarrier allocation scheme according to the present invention.

Preferably, the method for acquiring transmission subcarriers by the terminal may be determined according to the position of the allocated subcarriers. A specific example is that when the terminal acquires that the number of allocated subcarriers is greater than 3 or the terminal acquires that the number of allocated carriers is 3 and the number of the transmission subcarrier is 3 either, the index of the transmission subcarrier is the same as the index of the allocated subcarrier; when the terminal acquires that the number of the allocated subcarriers is 3 and acquires that the number of the transmission subcarriers is 2, the terminal determines the index of the transmission subcarrier according to the index of the allocated subcarrier (or resource allocation indication index). FIG. 4 and FIG. 5 respectively provides two examples determining the index of the transmission subcarrier according to the index of the allocated subcarrier, wherein, there may be overlapped in different subcarrier allocations. As shown in FIG. 3, the allocated subcarriers index may be {#3, #4, #5} or may be {#5, #6, #7}. There are overlapping subcarriers in the two types of subcarrier allocations. When the number of the transmission subcarriers is 2, indexes of transmission subcarriers are {#3, #4} and {#5, #6} respectively for the two subcarrier allocations, and transmission subcarriers corresponding to different subcarrier allocation do not overlap. Similarly, FIG. 4 shows an example of determining the index of the transmission subcarrier in another different scenario of subcarrier allocation. Compared with FIG. 3, there is an additional scenario of 3-subcarrier allocation to ensure the transmission subcarriers with different subcarrier allocation can cover all the subcarriers within the PRB and improve the efficiency of resource utilization.

II. Method for Configuring Frequency-Domain Resources for Frequency Hopping Transmission in Partial PRB Resource Allocation The frequency-domain resources for frequency hopping transmission include a narrowband index, a PRB index and a subcarrier index used by the physical channel for transmission in each subframe. The following method describes the transmission of the PUSCH channel only as an example, and the method for configuring the resource for frequency hopping transmission may be used for other uplink and downlink physical channels.

When the PUSCH frequency hopping transmission is enabled, the PUSCH is transmitted on the subframe i, the consecutive $N_{abs}^{PUSCH}$ uplink subframes use the same number of consecutive subcarriers and use the same initial subcarrier, and each $N_{abs}^{PUSCH}$ uplink subcframe transmission subcarrier resources may be on the different PRBs of the same narrowband, or on the same PRB of different narrowbands, or on different PRBs of different narrowbands, or on the same PRB of the same narrowband (using different subcarriers). The meaning of the same or different PRB is that, the relative index of the PRB within the narrowband is the same or different. The terminal acquires the frequency-domain resources used by PUSCH for transmission in each subframe. The frequency-domain resources in the frequency hopping transmission (frequency-domain resources for frequency hopping transmission are the transmission subcarriers used by the physical channel for frequency hopping transmission in each subframe) may be different from the allocated frequency resource. That is, the terminal performs frequency hopping transmission on the frequency-domain resources for frequency-hopping transmission, and the transmission subcarrier resources are a subset of the frequency-domain resources for frequency-hopping transmission. The following describes the methods for configuring the narrowband index/indices, the PRB index/indices and the subcarrier index/indices for frequency hopping transmission respectively.

1. Configuring Narrowband Index/Indices for Frequency Hopping Transmission

The PUSCH frequency hopping transmission of a single terminal may use one or more narrowbands. If only one narrowband is used, the narrowband may be a narrowband allocated to the terminal for PUSCH transmission through DCI or higher-layer signaling. If multiple narrowbands are used, other narrowbands for frequency hopping transmission, in addition to the allocated narrowbands, are further required. Preferably, the terminal acquires the narrowband index/indices for frequency hopping transmission according to the following system parameters, the parameters includes at least one of the following: the allocated narrowband index, the subframe number, a frequency hopping direction indication, a hopping interval and a hopping offset. Wherein, the hopping interval and the hopping offset are the existing higher layer configuration parameters in the prior art. The frequency hopping direction indication is used for indicating the relative position relation between other narrowbands used for frequency hopping transmission and the allocated narrowband. Specifically, it may be carried in DCI. Taking two narrowbands used for frequency hopping transmission as an example, the frequency hopping direction indication may indicate another narrowband index used for the frequency hopping transmission being greater or smaller than the allocated narrowband index in addition to the allocated narrowband by using one bit in PUSCH uplink grant information. In this case, the method for calculating the narrowband used by the frequency hopping transmission is that, when the frequency hopping direction indication indicates to be downward, that is, another narrowband for frequency hopping transmission is greater than the allocated narrowband index, the narrowband index/indices used for PUSCH transmission on a subframe i is calculated according to the following formula:

$$n_{NB}^{(i)} = \begin{cases} n_{NB}^{(i_0)} & \text{if } \lfloor i/N_{NB}^{ch,UL}h, j_0 \rfloor \mod 2 = 0 \\ \left(n_{NB}^{(i_0)} + f_{NB,hop}^{PUSCH}\right) \mod N_{NB}^{UL} & \text{if } \lfloor i/N_{NB}^{ch,UL}h, j_0 \rfloor \mod 2 = 1 \end{cases}$$

$$j_0 = \lfloor i_0/N_{NB}^{ch,UL} \rfloor$$

$$i_0 \leq i \leq i_0 + N_{ans}^{PUSCH} - 1$$

Figure 6:
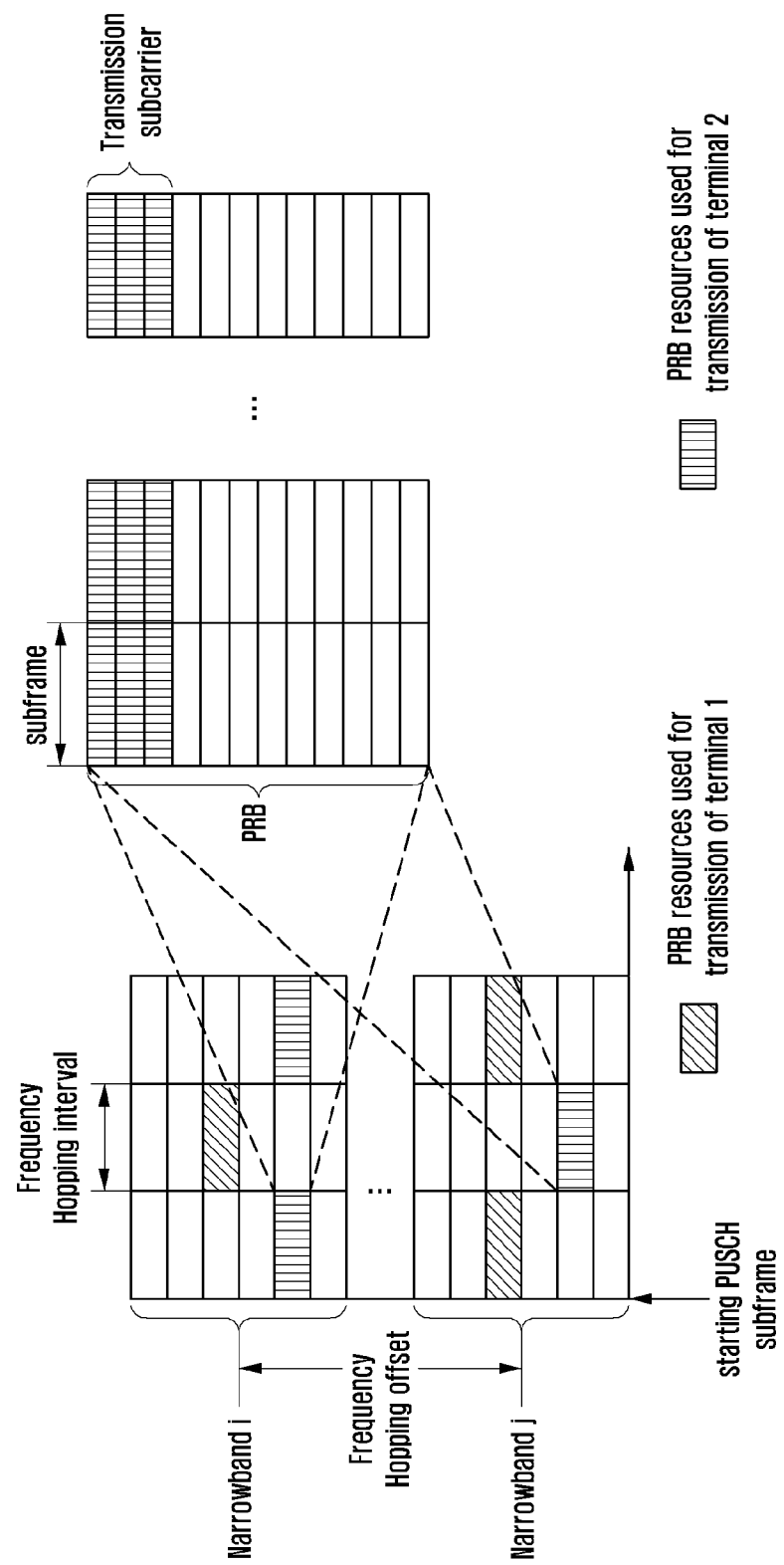
FIG. 6 is a schematic diagram of a first configuration scheme of frequency-domain resources for frequency hopping transmission according to the present invention.

Otherwise, when the frequency hopping direction indication indicate to be upward, that is, when another narrowband index for frequency hopping transmission is smaller than the allocated narrowband index, the narrowband index/indices used by PUSCH for transmission on the subframe i is calculated according to the following formula:

$$n_{NB}^{(i)} = \begin{cases} n_{NB}^{(i_0)} & \text{if } \lfloor i/N_{NB}^{ch,UL}h, j_0 \rfloor \mod 2 = 0 \\ \left(n_{NB}^{(i_0)} - f_{NB,hop}^{PUSCH}\right) - N_{NB}^{UL} \cdot \max\left(0, \frac{n_{NB}^{(i_0)} - f_{NB,hop}^{PUSCH}}{\left|n_{NB}^{(i_0)} - f_{NB,hop}^{PUSCH}\right|}\right) & \text{if } \lfloor i/N_{NB}^{ch,UL}h, j_0 \rfloor \mod 2 = 1 \end{cases}$$

$$j_0 = \lfloor i_0/N_{NB}^{ch,UL} \rfloor$$

$$i_0 \leq i \leq i_0 + N_{ans}^{PUSCH} - 1$$

Wherein $N_{NB}^{UL}$ is the total number of narrowbands contained in the system bandwidth; $i_0$ is the absolute subframe number of the initial uplink subframe carrying PUSCH and $n_{NB}^{(i_0)}$ is the index of the allocated narrowband; and $N_{NB}^{ch,UL}$ is the hopping interval, $f_{NB,hop}^{PUSCH}$ is the hopping offset, which are all belonging to higher layer configuration parameters. Wherein the hopping interval indicates that the same frequency-domain resource used for physical channel transmission within consecutive $N_{NB}^{ch,UL}$ subframes; and the hopping offset indicates a difference between the allocated narrowband index and other narrowband index used for frequency hopping transmission. Taking an example of frequency hopping transmission between two narrowbands, FIG. 6 shows an example of inter-narrowband frequency hopping according to the above method. In this example, terminal 1 and terminal 2 respectively indicates two cases that the frequency hopping direction indicates upward and downward.

Preferably, the terminal acquires the narrowband index/indices for frequency hopping transmission according to the following system parameters, and the parameters include at least one of the following: the allocated narrowband index, the subframe number, a hopping interval and a frequency hopping narrowband group. Wherein, the frequency hopping narrowband group is used for determining the narrowband resource used in the frequency hopping transmission of the user, and the narrowband group may be system fixed or may be obtained through a look-up table of hopping offset of the system parameter. Specifically, when the terminal acquires that the frequency-domain resource of PUSCH transmission is a partial PRB and the frequency hopping transmission function is enabled, the terminal determines the narrowband index/indices used for the PUSCH frequency hopping transmission in each subframe according to the frequency hopping narrowband group, the allocated narrowband and the hopping interval. Taking the frequency hopping narrowband group containing two narrowbands as an example, the narrowband index/indices used by the PUSCH for transmission on the subframe i may be calculated according to the following formula:

$$n_{NB}^{(i)} = \begin{cases} n_{NB}^{(i_0)} & \text{if } \lfloor i/N_{NB}^{ch,UL} - j_0 \rfloor \mod 2 = 0 \\ n_{NB}^{(\Phi)} & \text{if } \lfloor i/N_{NB}^{ch,UL} - j_0 \rfloor \mod 2 = 1 \end{cases}$$

$$j_0 = \lfloor i_0/N_{NB}^{ch,UL} \rfloor$$

$$i_0 \leq i \leq i_0 + N_{abs}^{PUSCH} - 1$$

$$n_{NB}^{(i_0)}, n_{NB}^{(\Phi)} \in \Phi$$

Wherein, $i_0$ is the absolute subframe number of the initial uplink subframe carrying the PUSCH and $n_{NB}^{(i_0)}$ is the index of the allocated narrowbands; $N_{NB}^{ch,UL}$ is the hopping interval, $f_{NB,hop}^{PUSCH}$ is the hopping offset, which are all belonging to the higher layer configuration parameters; and Φ is the frequency hopping narrowband group containing the allocated narrowbands, and $\Phi=\{n_{NB}^{(i_0)}, n_{NB}^{(\Phi)}\}$. FIG. 6 shows an example of inter-narrowband frequency hopping according to the method described above. In this example, terminal 1 and terminal 2 respectively indicates the cases where the allocated narrowband index is two different narrowbands in a narrowband group. The frequency hopping narrowband group may be system fixed or may be obtained through a look-up table of hopping offset of the system parameter. Still taking an example that the frequency hopping narrowband group includes two narrowbands, an example of obtaining the frequency hopping narrowband group according to a look-up table of hopping offset of the system parameter is provided. If the bandwidth of the LTE system is 10 MHz, the number of narrowbands in the system is 8, and if the hopping offset is 2, all the narrowbands in the system may be divided into four non-overlapping groups with an absolute shift value of 2, wherein the narrowband index/indices contained in each group may be $\Phi=\{i, i+2|i=0, 1, 4, 5\}$; if the hopping offset is 3, then the partial narrowbands in the system may be divided into three non-overlapping groups with an absolute shift value of 3, wherein, the narrowband index/indices contained in each group may be $\Phi=\{i, i+3|i=0, 1, 2\}$. In this case, narrow bands with indexes 6 and 7 do not belong to the above group. If the narrowband allocated for the initial transmission of the terminal is 6 or 7, the PUSCH does not support frequency hopping transmission or uses the narrowbands of indexes 6 and 7 as a group of frequency hopping narrowband for frequency hopping transmission.

2. Configuring PRB Index for Frequency Hopping Transmission and Subcarrier Index A single terminal may use the same or different narrowbands for frequency hopping transmission while the position of the used frequency resource within the narrowband may be the same or different, the frequency-domain resources within the narrowband includes PRB index within narrowband and subcarrier index within PRB. Specifically, when the PUSCH performs frequency hopping transmission on multiple narrowbands, the PRB of the same index and the subcarrier of the same index may be used on different narrowbands, as shown in FIG. 6; or when The PUSCH performs frequency hopping transmission on one or more narrowbands, the PRB of different indexes and the subcarrier of the same index may be used, wherein, the determination of the PRB index/indices may be fixed by the system or indicated by the higher layer signaling, for example, the shift value between the PRB used by the frequency hopping and the allocated PRB index may be fixed or indicated; or the PRB of the same index or different indexes and the subcarriers of different indexes may be used, wherein, the method for determining the PRB index/indices is described as above.

Figure 7:
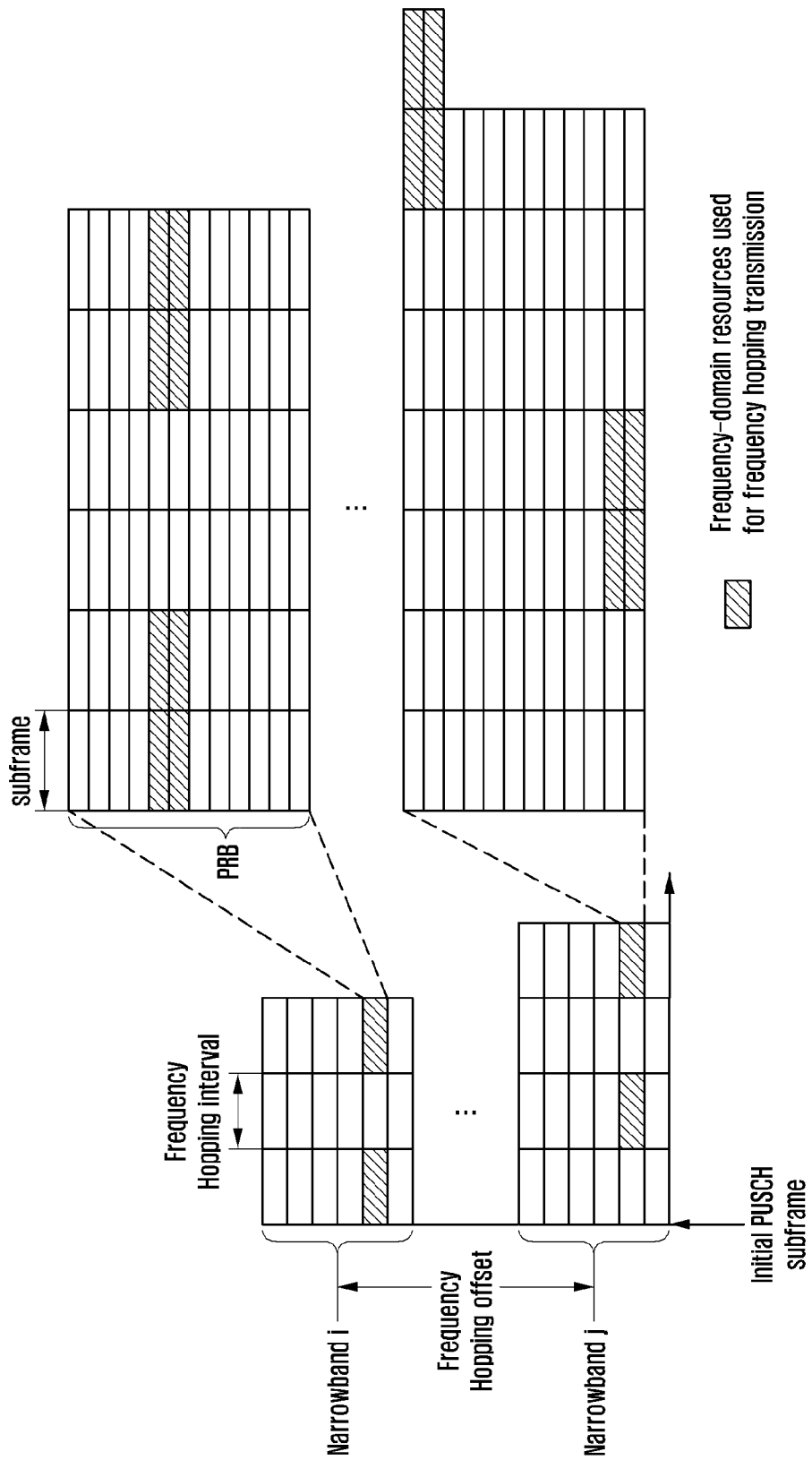
FIG. 7 is a schematic diagram of a second configuration scheme of frequency-domain resources for frequency hopping transmission according to the present invention.

The terminal may determine, according to the following system parameters, a subcarrier index used by PUSCH for transmission of each subframe, wherein the parameter includes at least one of the following: a subframe index, a hopping interval, and a configured subcarrier index of the initial transmission. Preferably, when the subcarriers of different indexes are used by different subframes of frequency hopping transmission, the manner for determining the subcarrier index/indices for frequency hopping transmission is fixed by the system or indicated by the higher layer signaling, for example, fixing or indicating the shift value between the subcarrier index/indices used for the frequency hopping and the configured subcarrier index of the initial transmission. Preferably, the terminal determines whether there is intra-subcarrier frequency hopping according to the configured subcarrier index of the initial transmission, when there is intra-subcarrier frequency hopping, the terminal determines an index of the frequency hopping subcarrier according to the configured subcarrier index, the intra-subcarrier frequency hopping means that the frequency hopping transmission on different subframes use subcarriers of different indexes. Taking the configuration of the index of the transmission subcarrier of the initial transmission in FIG. 4 as an example, an example of the present method is provided. When the subcarrier index/indices of the initial transmission is $\{1,2\}$, $\{3,4\}$, $\{7,8\}$ or $\{9,10\}$, no subcarrier frequency hopping is performed; when the subcarrier index/indices of the initial transmission is $\{5, 6\}$, subcarrier frequency hopping is performed, and the index of the frequency hopping subcarrier is determined according to the subframe index and the hopping interval. Assuming that the hopping interval is 2 subframes and the frequency hopping transmission uses different narrowbands, FIG. 7 shows an example of a method for determining a frequency hopping subcarrier index. Within the first hopping interval of the initial transmission, the PUSCH transmission uses a subcarrier having the index $\{5, 6\}$; within the second hopping interval, the PUSCH performs downward frequency hopping, and use the subcarrier having the index $\{10,11\}$; within the third hopping interval, the PUSCH performs upward frequency hopping, and uses the subcarrier having the index $\{0,1\}$; within the following hopping interval, the PUSCH continues using the allocated transmission subcarrier $\{5, 6\}$ to continue this cycle. This design allows subcarriers having indexes 3 to 8 on the narrowband (the narrowband j in FIG. 7) to be allocated to 3-subcarrier transmissions, and the frequency hopping directions alternately upward and downward may lower the interference to the subcarrier in the same position of the neighboring cell.

III. Scheme for Acquiring MCS, TB Size, Number of Resource Units in a Scenario of Partial PRB Resource Allocation After acquiring the configuration of the frequency-domain resource for transmission, the terminal needs to further acquire the parameters such as the number of resource units, the MCS and the TB size for transmission. The following method is described by taking PUSCH channel transmission as an example, and the method is applicable to other uplink and downlink physical channels.

Preferably, the terminal may acquire the MCS, the TB size and the number of the resource units according to the MCS index/TB size index, determine the number of transmission subcarriers according to the MCS index/TB size index and the number of allocated subcarriers. Specifically, the terminal acquires the modulation scheme through the MCS index, and the modulation scheme corresponds to the number of transmission subcarriers. For example, when the modulation scheme is BPSK, the number of subcarriers used by PUSCH transmission is 2; when the modulation scheme is QPSK, the number of subcarriers used by PUSCH transmission is 3 or 6. Then, the terminal determines the number of transmission subcarriers according to the number of allocated subcarriers, and the method is as described above. The table shown in [Table 1] is a form of a correspondence between the TB size index, MCS, the TB size, the number of transmission subcarriers, and the number of resource units. Such correspondence may be predetermined, wherein the MCS index and the TB size index are in a one-to-one correspondence, and the terminal may acquire the MCS, the TB size and the number of resource units according to the MCS index bits configured by the base station, and then the number of transmission subcarriers may be determined in combination with the number of allocated subcarriers.

TABLE 1

| MCS index/ TB size index | MCS | TB Size | The number of transmission subcarriers | The number of resources units |
|---|---|---|---|---|
| 0 | BPSK | 56 | 2 | 1 |
| 1 | BPSK | 88 | | |
| 2 | BPSK | 144 | | 2 |
| 3 | BPSK | 176 | | |
| 4 | BPSK | 208 | | 4 |
| 5 | BPSK | 224 | | |
| 6 | BPSK | 256 | | |
| 7 | BPSK | 328 | | |
| 8 | QPSK | 392 | 3 or 6 | 2 |
| 9 | QPSK | 456 | | |
| 10 | QPSK | 504 | | |
| 11 | QPSK | 600 | | 4 |

Preferably, the terminal may acquire the modulation scheme according to the number of the transmission subcarriers or acquire the modulation scheme and the length of resource unit block according to the number of the transmission subcarriers, and acquire the correspondence between the MCS index (or TB size index), the TB size and the number of the resource units according to the number of the transmission subcarrier. When the number of transmission subcarriers is different, the correspondence may be different. Wherein, the number of the transmission subcarriers may be acquired through indication about the number of the transmission subcarriers carried in the DCI. For example, 1-bit indication carried in DCI indicates that the number of the transmission subcarriers is 2 in partial PRB resource allocation, or the number of the transmission subcarriers is greater than 2. Specifically, an example of this method is shown in [Table 2] and [Table 3], when the terminal acquires that the number of the transmission subcarriers is 2, then the terminal acquires the TB size and the number of the resource units according to the MCS index/TB size index through table look-up in [Table 2]; when the terminal acquires that the number of the transmission subcarriers is greater than 2, then the terminal acquires the TB size and the number of the resource units according to information about the MCS index/TB size index through table look-up in [Table 3].

Preferably, the terminal may acquire the number of transmission subcarriers according to the modulation scheme and acquire the correspondence between the MCS index (or TB size index) and the TB size and the number of resource units according to the modulation scheme. When the modulation schemes are different, the correspondence may be different. Wherein, the modulation scheme may be acquired through indication bits carried in the DCI. For example, the DCI carries the 1-bit indication to indicate that the modulation scheme is BPSK or QPSK in the partial PRB resource allocation. When the modulation scheme is BPSK, the number of the transmission subcarriers is 2; when the modulation scheme is QPSK, the number of the transmission subcarriers is greater than 2, and the specific value may be acquired according to the number of the allocated subcarriers, and the specific method is as described above. Specifically, an example of the method is that: when the terminal acquires that the modulation scheme is BPSK, the terminal acquires the TB size and the number of resource units through table look-up in [Table 2] according to the information about MCS index/TB size index. When the terminal acquires that the modulation scheme is QPSK, and then the terminal acquires the TB size and the number of resource units through table look-up in [Table 3] according to the information about MCS index/TB size index. Wherein, the TB size indicator bit in [Table 2] may be increased or decreased, for example, one or more of the TB size index 8 to index 15 in [Table 3] may be supported, and the corresponding number of resource units may be 4. Or, another example of this method is that, the terminal acquires the TB size and the number of resource units through table look-up in [Table 3] according to the information about MCS index/TB size index, and corrects the result of the acquired TB size multiplying the correction factor β according to the number of the transmission subcarriers, for example, when the number of the transmission subcarriers is greater than 2, the correction factor is taken as β=1, and when the number of the transmission subcarriers is 2, the correction factor is taken as β=⅓.

TABLE 2

| MCS index/ TB size index | Modulation scheme | TB Size | The number of resources units |
|---|---|---|---|
| 0 | BPSK | 56 | 1 |
| 1 | BPSK | 88 | |
| 2 | BPSK | 144 | 2 |
| 3 | BPSK | 176 | |
| 4 | BPSK | 208 | 4 |
| 5 | BPSK | 224 | |
| 6 | BPSK | 256 | |
| 7 | BPSK | 328 | |

TABLE 3

| MCS index/ TB size index | Modulation mode | TB Size | The number of resources units |
|---|---|---|---|
| 0 | QPSK | 56 | 1 |
| 1 | QPSK | 88 | |
| 2 | QPSK | 144 | |
| 3 | QPSK | 176 | |
| 4 | QPSK | 208 | |
| 5 | QPSK | 224 | |
| 6 | QPSK | 256 | 2 |
| 7 | QPSK | 328 | |
| 8 | QPSK | 392 | |
| 9 | QPSK | 456 | |
| 10 | QPSK | 504 | |
| 11 | QPSK | 600 | 4 |
| 12 | QPSK | 712 | |
| 13 | QPSK | 808 | |
| 14 | QPSK | 936 | |
| 15 | QPSK | 1000 | |

IV. Method for Configuring Shifting on Physical Channel Resource

In order to achieve more flexible resource allocation and reduce the number of LTE resource block groups (RBGs) overlapped with or partially overlapped with the frequency-domain resources allocated by the eMTC physical channel transmission, several flexible methods for configuring shifting on physical channel resource are described below. The following methods may be used in any combination.

Figure 8:
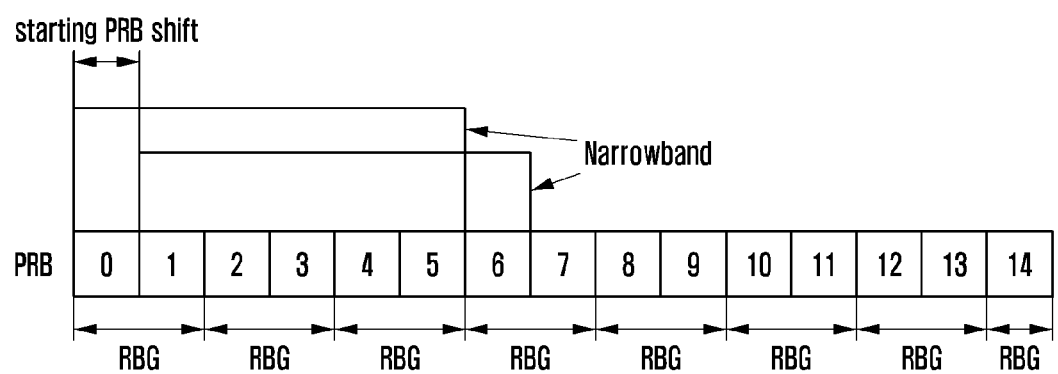
FIG. 8 is a schematic diagram of a first physical channel resource shifting configuration scheme according to the present invention.

Method 1: Configuring the offset of the narrowband initial PRB can reduce the number of LTE RBGs overlapping with the eMTC narrowband PRB, so as to improve the efficiency of resource allocation of the LTE system. The basic principle is shown in FIG. 8. Assuming that the scenario in which the bandwidth of the LTE system is 3 MHz including 15 PRBs in total, each two PRBs are divided into one RBG, which is the minimum granularity in several commonly used resource allocations of the LTE. One narrowband contains 6 consecutive PRBs. As shown in FIG. 8, when the LTE bandwidth is 3 MHz, the index of the initial PRB of one narrowband is 1, which makes the PRB included by one narrowband occupy 4 PRBs. At this time, the initial PRB of this narrowband is configured to shift forward by 1, that is, the starting PRB index is 0, which makes one narrowband occupy 3 RBGs and release one RBG for LTE resource allocation. The steps of this method are as follows.

Step 1: The eMTC terminal acquires configuration information of narrowband shift, wherein the configuration information of narrowband shift may be used for uplink and/or downlink, and the signaling for the uplink and downlink narrowband shift configurations may be the same or different;

Step 2: When a specific transmission is performed, the terminal in a specific scenario acquires the frequency-domain resources of the physical channel according to the shifted narrowband to perform uplink transmission or downlink reception, wherein the shifted narrowband means that indexes of all the PRBs are contained within the narrowband acquired by the terminal after performing shifting on the narrowband initial PRB according to the configuration information of the narrowband shift. Preferably, the specific transmission includes at least one of the following: PUSCH transmission, PDSCH reception, MPDCCH user-specific search space, and MPDCCH common search space (for example, MPDCCH search space for paging). Preferably, the specific scenario includes at least one of the following: a scenario where the terminal is in a the coverage enhancement (CE) mode supporting partial PRB transmission, a scenario where the terminal is in the CE mode A and a scenario where the terminal is in the CE mode B, that is, any one of multiple terminals within a cell may be in one of the above modes. Preferably, the shifted narrowband includes the configuration where the starting PRB index is not shifted.

The following describes a method for configuring narrowband shift. Preferably, the method for acquiring the narrowband shift configuration may be: the terminal determines the shift mode of each narrowband within the system bandwidth according to the higher-layer parameters, the configuration contents of the higher-layer parameters of the terminal used for determining the narrowband shift manner includes one of the followings: system bandwidth, narrowband shift switch, the shift value and shift direction of this initial PRB of the narrowband. One implementation is that: the terminal determines the shift mode of each narrowband within the system bandwidth according to the system bandwidth, wherein the shift mode includes: whether the narrowband is shifted, the shift direction and index shift of this initial PRB of this narrowband. One example of this method is that: the terminal acquires the higher layer parameters such as the system bandwidth and the narrowband shift switch. When the narrowband shift switch of the initial PRB is off, all the narrowband positions do not change in the system, that is, the PRB index/indices contained in the narrowband do not change; otherwise, the terminal determines the shift mode of each narrowband according to the system bandwidth as follow:

When the system bandwidth is 20 MHz, the starting PRB index shift of all narrowbands within the bandwidth is 0, that is, no offset;

When the system bandwidth is 15 MHz, the starting PRB index shift of the narrowband having index {0,1,2,3,4,5} is +1 (or −1), that is, the starting PRB index of the narrowband is shifted backward (or forward) by one PRB, and the initial PRB offset of the remaining narrowband is 0;

When the system bandwidth is 10 MHz, the starting PRB index shift of all the narrowbands within the system bandwidth is −1, that is, the starting PRB index of the narrowband is shifted forward by one PRB;

When the system bandwidth is 5 MHz, the starting PRB index shift of the narrowband having index {2,3} is −1, that is, the starting PRB index of the narrowband is shifted forward by one PRB, and the initial PRB offset of the remaining narrowband is 0;

When the system bandwidth is 3 MHz, the starting PRB index shift of the narrowband having an index 0 is −1, that is, the starting PRB index of the narrowband is shifted forward by one PRB, and the initial PRB offset of the remaining narrowband is 0.

Another implementation is that, the terminal determines the shift mode of the initial PRB of the specific narrowband through higher layer parameters "narrowband shift switch", "shift direction and/or index shift of initial PRB of the narrowband", for example, the terminal acquires shifting configuration parameter of each narrowband within the system bandwidth, wherein the parameters may be: shifting switch separately configured for each narrowband, and/or initial PRB shift direction separately configured for each narrowband, and/or starting PRB index shift separately configured for each narrowband. The terminal acquires the PRB index/indices contained in the shifted narrowband according to the shifting configuration of each narrowband. The specific signaling indication mode for narrowband shift configuration parameter may be indicating the shifting configurations of all the narrowbands within the system bandwidth in a bit-mapping manner.

Preferably, the method for acquiring the narrowband shift by the terminal may be: the terminal determines the narrowband shift manner according to the narrowband shift indication in the DCI, wherein the contents of the narrowband shift indication in DCI at least include one of the followings: narrowband shift switch, narrowband index shift of initial PRB of the narrowband and shift direction of initial PRB of the narrowband. Specifically, after acquiring the narrowband allocated by the physical channel transmission, the terminal determines the shift mode of the allocated narrowband according to the narrowband shift indication in the DCI, wherein the physical channel may be a PUSCH or a PDSCH. A specific implementation of the narrowband shift indication in the DCI may be a 1-bit narrowband shift switch indication, for example, when the shifting switch is indicated as ON, the terminal performs shifting forward or backward on the starting PRB index of the allocated narrowband by N, wherein shift direction of the PRB index/indices and the value of N may be fixed by the system, or explicitly informed in DCI, or configured by the higher layer signaling, or the terminal determines whether it is necessary to perform shifting on the starting position of the allocated narrowband as well as the shift direction and the shift value according to the system bandwidth and/or narrowband index. The allocated narrowband refers to one or more narrowbands to which several PRBs allocated to a physical channel in the DCI belongs. When the shifting switch indication is indicated as OFF, the terminal does not perform shifting on the allocated narrowband. Preferably, the specific implementation of the narrowband shift indication in DCI may also be indicating the starting PRB index shift direction and shift value of the allocated narrowband. For example, 1-bit indication information indicates two states: the initial index of the allocated narrowband minus 1, or the initial index of the allocated narrowband plus 1, wherein, when the number of the allocated narrowbands is N, the DCI may contain N indicator bits to separately indicate offset information for each narrowband, or several narrowband uses same indication information. Or, 2-bit indication information indicates three states: a state that the starting PRB index of the allocated narrowband remains unchanged (no offset), a state that the starting PRB index of the allocated narrowband minus 1 and a state that the initial index of the allocated narrowband plus 1, wherein, when the number of the allocated narrowband is N, the DCI may contain 2×N indication bits to separately indicate the offset information for each narrowband, or the several narrowbands use the same indication information. The above examples of different indication modes may be used in combination with each other.

Method 2: Configuring the frequency-domain starting position shift of the physical channel resource allocation can reduce the number of LTE RBGs overlapping with the eMTC physical channel allocation PRB, so as to improve the efficiency of resource allocation of the LTE system. The method steps are as follows:

Step 1: The terminal acquires the resource allocation information carried in the DCI for scheduling the codeword transmission of the physical channel, and acquires frequency-domain starting position shift information of the allocated physical resources, wherein the physical channel includes uplink or downlink channel, such as PUSCH or PDSCH, the frequency-domain starting position shift information of the allocated physical resources may be indicated by the DCI scheduling the same codeword of the physical channel transmission, or may be indicated by the higher layer signaling.

Step 2: The terminal performs frequency-domain shift on the allocated physical resources according to the frequency-domain starting position shift indication of the allocated physical resources and performs uplink transmission or downlink reception according to the shifted physical resources. The frequency-domain starting position of the allocated PRB being shifted means that the starting PRB index/subcarrier index of the physical resources allocated for physical channel transmission are shifted. Preferably, the frequency-domain starting position of the allocated PRB being shifted includes the configuration that the starting PRB index/subcarrier index is not shifted.

The following describes the method for the configuration of the frequency-domain starting position shift of the allocated physical resources. Preferably, the method for acquiring by the terminal the configuration of the frequency-domain starting position shift of the allocated physical resources may be: the terminal acquires the DCI and/or higher layer signaling for scheduling the codeword transmission of the physical channel and acquires the information about the shift mode of the frequency domain starting position of the allocated physical resources, wherein the contents of the shift mode of the frequency domain starting position of the allocated physical resources includes at least one of the following: whether to perform shifting, the shift direction of the starting PRB index/subcarrier index of the allocated physical resources and the shift value of the starting PRB index/subcarrier index of the allocated physical resources. Preferably, when the information about the shift mode of the frequency-domain starting position of the allocated physical resources is indicated through higher layer signaling, the signaling may be a user-specific signaling, that is, the different users separately configure the shift mode, or a cell common signaling, that is, the same shift mode is configured on a group of users satisfying certain conditions which may refer to the same the CE mode. Preferably, the indication information about the shift mode of the frequency-domain starting position used for determining the allocated physical resources acquired by the terminal at least includes one of the following: the frequency-domain starting position shift switch of the allocated physical resources, system bandwidth, the allocated narrowband index, the narrowband shift indication information, the allocated PRB index, the terminal CE mode, the shift direction and shift value of the starting PRB index/subcarrier index of the allocated physical resources. For example, when the frequency-domain starting position shift switch indication of the allocated physical resources is "ON", the terminal determines the shift mode of the frequency-domain starting position of the allocated physical resources according to other configuration parameters, the configuration parameters at least includes one of the following: the system bandwidth, the allocated narrowband index, the narrowband shift indication information, the allocated resource block index, the terminal CE mode, the shift direction and shift value of the starting PRB index/subcarrier index of the allocated physical resources; when the frequency-domain starting position shift switch indication of the allocated physical resources is "OFF", the terminal does not perform shifting on the frequency-domain starting position of the allocated physical resources. Wherein, one example is that, when the system bandwidth is 15 MHz, assuming the terminal acquires that the PUSCH allocated the narrowband index/indices as 0 in the CE mode B, and the allocated PRB indexes are {2,3}. If the starting PRB index of the allocated narrowband is not shifted, the PRB allocated by the PUSCH transmission occupies 2 RBGs, at this time if the terminal acquires that the frequency-domain starting position shift switch of the allocated physical resources is "ON", the allocated PRB index is shifted forward by one PRB, that is, the PRB index/indices used by the PUSCH transmission is {3, 4}, such that the allocated physical resources are within one RBG; if the initial PRB of the allocated narrowband has already shifted and the PRB having the index {2,3} within the allocated narrowband, are within one RBG even if the terminal acquires that the starting position shift switch of the allocated resource blocks is ON, it is unnecessary to perform shifting on the allocated resource block starting position. In this example, the terminal determines the shift mode of the frequency-domain starting position of the allocated physical resources according to the shifting switch, the system bandwidth, the CE mode, the allocated narrowband shift manner and the allocated resource block index in DCI. Preferably, the indication information about the frequency-domain starting position shift of the allocated physical resources acquired by the terminal may also be the shift value and the shift direction of the starting PRB index/subcarrier index of the allocated physical resources, for example, the terminal shifts the starting PRB index of the allocated physical resources forward or backward by N, the allocated physical resources is shifted integrally as the shifting offset on the starting PRB. Wherein, the PRB index/indices shift direction and the value of N may be fixed by the system, or may be explicitly informed in the DCI, or may be configured by the higher layer signaling.

Method 3: The LTE terminal acquires the usage of eMTC physical resources, changes the LTE RBG according to the physical resources used by the eMTC transmission, and uses the changed RBG to allocate uplink or downlink resources. The steps of the method are provided as follows:

Step 1: The LTE terminal acquires the usage information of the eMTC system physical resources and changes the LTE RBG according to the usage of the eMTC system physical resources. The change to the LTE RBG includes at least one of the following: changing the number of PRBs included in the LTE RBG, changing a PRB index included in the LTE RBG, and changing a starting PRB index of the LTE RBG;

Step 2: The LTE terminal allocates the resources of the uplink or downlink physical channel according to the changed RBG. Preferably, the resource mapping of the physical channel on the changed RBG is rate matching.

Preferably, the manner for the LTE terminal to acquire the usage information of the eMTC system physical resources includes at least one of the following: reading, by the LTE terminal, eMTC system information, and reading, by the LTE terminal, higher layer signaling. The eMTC system information read by the LTE terminal includes at least one of the following: scheduling information of System Information Block Type1-BR (SIB1-BR) in the main message block, scheduling information, physical resource configuration parameters such as window length, repetition pattern, narrowband, frequency hopping parameter of other SIB in SIB1-BR, physical resource configuration parameter of MPDCCH common search space, physical resource configuration parameter and frequency hopping configuration parameter and the like of PRACH. The higher layer signaling of the LTE terminal used for acquiring the usage information about physical resources of the eMTC system may be the higher layer signaling indicating the time-domain and/or frequency-domain physical resources used by the eMTC system. Preferably, the method for indicating the frequency-domain physical resources used by the eMTC system may be: indicating the narrowband index/indices used by the eMTC system; preferably, the method for indicating the time-domain physical resources used by eMTC system may be: indicating the time length occupied by the physical resources used by the eMTC system for a period.

Figure 9:
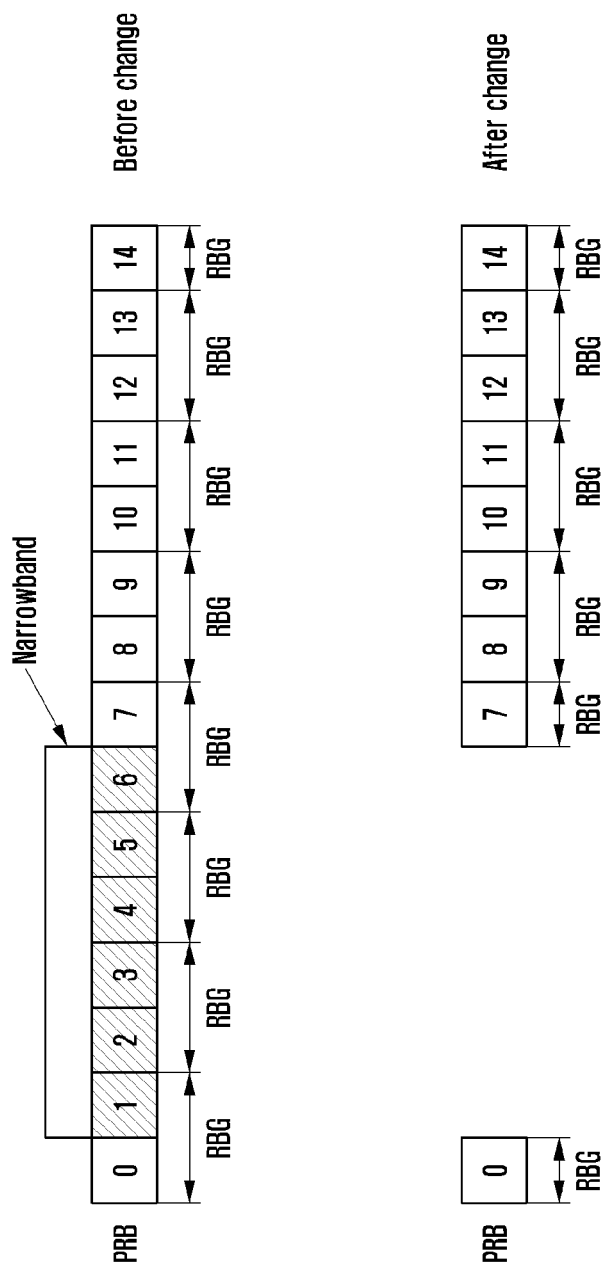
FIG. 9 is a schematic diagram of a second physical channel resource shifting configuration scheme according to the present invention.

Preferably, the method for changing the LTE RBG according to the usage information of the eMTC system physical resource by the LTE terminal is that: when the partial PRBs in the RBG is already used by the eMTC system, the PRBs which have been used by the eMTC are removed from this RBG, thereby a new LTE RBG is formed. FIG. 9 shows an example. Preferably, the method for changing the LTE RBG according to the usage information of the eMTC system physical resource further includes that, if all the PRBs in the original LTE RBG are used by the eMTC system (that is, the LTE system is not able to use RBG), then this RBG index may be retained; or, this RBG index is removed and the remaining RBG indexes are re-sequenced. Taking the scenario in FIG. 9 as an example, the number of the available RBGs in LTE system is 6 after changed, the 6 RBGs are sequenced in accordance with the ascending order of the PRB index/indices, and the index from left to the right is {0, 1, 2, 3, 4, 5}.

Figure 10:
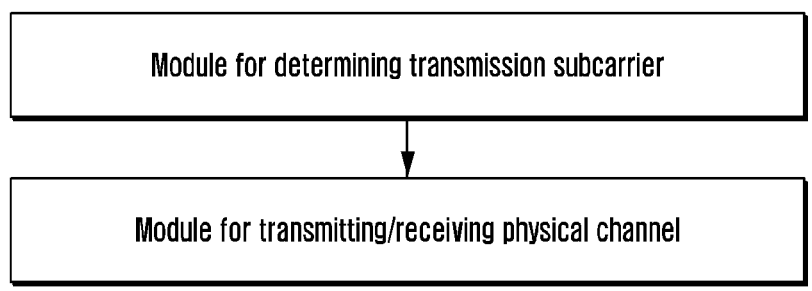
FIG. 10 is a block diagram of a user equipment for physical channel transmission according to the present invention.

Referring to FIG. 10, a user equipment for physical channel transmission according to the present disclosure includes:

module for determining transmission subcarrier, configured to determine transmission subcarrier resources according to a configuration of a base station;

module for transmitting/receiving physical channel, configured to transmit or receive physical channels on the transmission subcarrier resources.

The working process of the module for determining/receiving transmission subcarrier and the module for transmitting/receiving physical channel respectively corresponds to steps 101 and 102 of the random-access method of the present disclosure, and details will not be described herein again.

As may be seen from the above detailed description of the present disclosure, compared with the prior art, the present disclosure has at least the following beneficial technical effects:

First, by subdividing the resource allocation unit of the transmission physical channel from the PRB into subcarriers, the power spectral density of the uplink transmission is significantly improved, and the coverage enhancement is effectively achieved.

Second, to provide different schemes to separately configure the number and positions of the transmission subcarriers so that the system has better flexibility and scalability. At the same time, resources in different cells may not be overlapped when the users transmit the physical channels, and inter-cell interference is effectively reduced.

Thirdly, a resource allocation unit at a subcarrier level is used to implement a flexible physical channel resource shift mode, so as to reduce the number of LTE RBGs overlapping with the frequency domain resources allocated by the eMTC physical channel transmission and reduce the waste of resources that cannot be used by eMTC users nor the LTE users, thereby greatly improving the efficiency of resource utilization.

Fourthly, providing a variety of frequency hopping transmission schemes increases the efficiency and reliability of data transmission. Meanwhile, the schemes of alternating upward and downward frequency hopping directions are beneficial to reduce the interference to the subcarriers in the same position in the neighboring cells and improve the overall system performance.

There are two kinds of relay forwarding methods in the prior art.

The first one is a layer 3 based relay forwarding method in which a relay node has the function of a base station. In this method, from the perspective of the relayed node (remote node), the identity of a relay node is a base station having its own physical layer cell identity (Physical Cell Identity, PCID), and is capable of implementing all functions of a base station; from the perspective of the base station, the identity of a relay node is a node, and the base station will schedule the requests of the relay node and the remote node for communication resources as the transmission requests of the relay node on its own for uplink and downlink services, and then the relay node further schedules, on its own, the communication resources between it and the remote node.

The second one is a layer 3 based relay forwarding method designed in a device to device (D2D) communication system in a Proximity Service (ProSe). In this method, the relay node does not perform resource scheduling for the remote node, and the relay node selects, on its own, the transmission resources on an end link (Sidelink, SL) to the remote node, or the base station schedules the transmission resources on the sidelink for the relay node (which include transmission resources for sidelink control messages and resources for sidelink data messages, separately located in a control resource pool and a data resource pool which are specifically owned by sidelink). The control message transmitted by the relay node indicates the transmission location of the data message in the data resource pool. Within the coverage area of the relay node, the remote node and other non-remote nodes all monitor and blindly detect the complete control resource pool (except for the resource locations that cannot be monitored due to the half-duplex restriction), and according to contents in the received control message, the location of the corresponding data message transmission resource is determined, and the data message is received at the corresponding resource location, and then is submitted to the higher layer of the node. The higher layer of the remote node gets the destination node information carried in the data message, and determines that it is itself to be the destination node of the data message; the higher layers of other non-remote nodes that receives the data message get the destination node information carried in the data message, and then determine that they are not the destination node of the data message and thus discard the message.

However, the above two kinds of relay transmission methods both belong to layer 3 based relay forwarding, when remote nodes switch relay paths (for example, switching from relay transmission to direct transmission with base station, or switching relay nodes) and conduct handover, service continuity cannot be guaranteed; they are incompatible with the physical layer design of the existing version of the IoT UE. Therefore, when the existing version of the IoT UE is used as the remote node, neither of the above two methods can be implemented as a remote IoT node for relay transmission, so it is necessary to deploy a new version of IoT UE as a remote node, which greatly affects the system cost. In addition, since the repetition-based design in the IoT system is not supported, the reliability of the link from the relay node to the remote IOT node cannot be guaranteed when the performance of the link between the relay node and the remote IOT node is poor, especially in the case where the remote IoT node with limited transmission capability conducts uplink transmission.

In addition, with respect to the first kind of relay transmission method in the prior art, the main disadvantage thereof is that, the relay node needs to implement the functions of the base station, including the resource scheduling and higher layer processing mechanism, and thus its complexity is too high which affects the cost; moreover, the relay nodes of base station type generally provide poor support for the mobility of relay nodes, and thus difficulty for deployment and the cost thereof are higher than relay nodes of UE type.

As for the second kind of relay transmission method in the prior art, the main disadvantage thereof is that, the remote node needs to blindly detect the complete sidelink control resource pool, the UE-specific search space of which may be larger than that of a node, resulting in the increased power consumption of the remote nodes for monitoring and blind detection, and thus affecting the life span of the batteries in the remote nodes and negatively impacting core requirements of the IoT system.

In order to solve the technical problem of relay transmission in the prior art, the present disclosure provides a method for relay transmission, comprising: a method for relay transmitting a data message and a control message, which is used to configure an appropriate relay node for such a remote node that is within the coverage area of a cell while the uplink and/or downlink quality thereof is poor, thus it has to be used with a high repetition number, so as to make the quality of the link between the remote node and the relay node to be good, and thereby it is possible to reduce the number of repetitions required for transmitting and/or receiving by the remote node, which greatly saves the power consumption of the remote node; further, by using a relay node with stronger UE capability, transmission success rate is improved, and/or the number of repetitions is reduced, thereby improving the utilization efficiency of the air interface resources. For a remote node outside the coverage area of a cell, it is possible to configure an appropriate relay node to establish a multi-hop link between it and the base station for uplink and downlink transmission, thereby expanding the coverage range of the cell.

Figure 11:
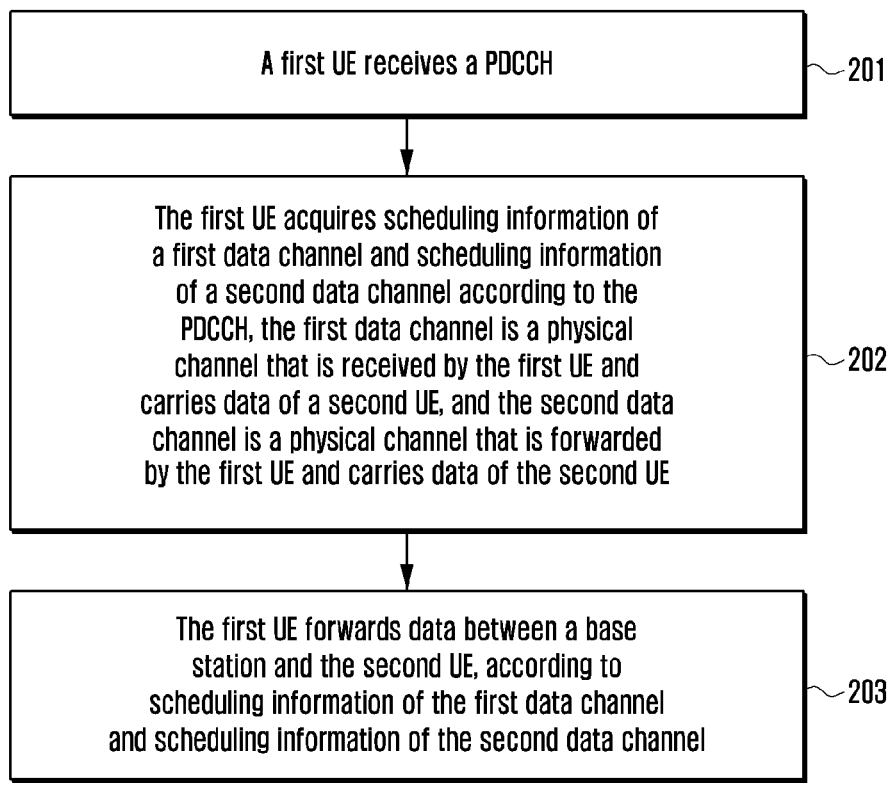
FIG. 11 is a flowchart of a relay transmission method according to the present invention.

Referring to FIG. 11, a method for relay transmission as disclosed in the present disclosure comprises the following steps:

at step 201, a first UE receives a physical downlink control channel (PDCCH);

at step 202, the first UE acquires scheduling information of a first data channel and scheduling information of a second data channel according to the PDCCH, the first data channel is a physical channel that is received by the first UE and carries data of a second UE, and the second data channel is a physical channel that is forwarded by the first UE and carries data of the second UE;

at step 203, the first UE forwards data between the base station and the second UE according to the scheduling information of the first data channel and the scheduling information of the second data channel.

Wherein, the data channel may be a physical downlink shared channel (PDSCH) or a physical uplink shared channel (PUSCH).

The present invention provides a layer 1/layer 2 based relay forwarding method. The contents of an embodiment of the present invention comprise relay forwarding of a physical layer data channel and a physical layer control channel.

In an embodiment of the present invention, the first UE may be a relay node with relay capability within the coverage area of the cell, and the second UE may be a remote node that is within the coverage area of the cell or outside the coverage area of the cell. The relay node monitors the PDCCH transmitted by the base station, and directly or indirectly acquires scheduling information of the PUSCH and scheduling information of the PDSCH of the remote node, scheduling information of the PUSCH of the remote node forwarded by the relay node, and scheduling information of the PDSCH of the remote node forwarded by the relay node, and performing uplink transmission and/or downlink reception between the relay node and the base station and transmission and/or reception between the relay node and the remote node, according to contents of these scheduling information. The remote node monitors the PDCCH transmitted by the base station and/or forwarded by the relay node, and directly acquires the scheduling information of the PUSCH and/or the scheduling information of the PDSCH of the remote node, and performs uplink transmission and/or downlink reception according to contents of the scheduling information. The base station schedules transmission/reception between the remote node and the relay node and the uplink transmission/downlink reception between the relay node and the base station, via the PDCCH directly transmitted to the remote node and/or the PDCCH forwarded to the remote node via the relay node, and performs uplink reception or downlink transmission according to contents of the scheduling information of the relay node and/or contents of the scheduling information of the remote node.

In an embodiment of the present invention, each remote node uses one relay node for relay forwarding; the relay nodes used by multiple remote nodes may be the same, that is, one relay node may provide relay functions for multiple remote nodes.

The embodiments of the present invention are applicable to three application scenarios: in scenario 1, the relay node only forwards the PUCCH/PUSCH of the remote node, and does not forward the PDSCH/PDSCH of the remote node; in scenario 2, the relay node not only forwards the PUCCH/PUSCH of the remote node, but also forwards the PDSCH/PDSCH transmission of the remote node; in scenario 3, the relay node forwards the PDSCH and the PUCCH/PUSCH of the remote node, but does not forward the PDCCH of the remote node.

The above scenario classification method is independent of whether the uplink/downlink transmission of other signal channels is relay forwarded. For example, in the above several scenarios, it is supported that a relay node does not forward the synchronization signal/channel and the downlink broadcast signal/channel of the base station, and then the remote node, from the base station, acquires the downlink broadcast message and the synchronization signal on its own.

In the following, the relay transmission of the control/data channel is described in detail with reference to several specific embodiments, based on the application scenario type.

Overall Process Introduction

In the above embodiments, the first UE is a relay UE, and the second UE is a remote UE, and the relay UE has forwarding capability for the data/control information of the remote UE, and in order to accomplish the forwarding function by the relay UE, it is necessary that the base station configures, necessary information for it to ensure that the relay UE completes the reception of the data/control information of the remote UE, and also ensure that the relay UE completes the forwarding of the data/control information of the remote UE.

In an example, the data/control information of the remote UE received by the relay UE and the data/control information of the remote UE forwarded by the relay UE use the same scheduling information, that is, physical resources and physical transmission schemes used by both of them are completely the same. Then, after receiving the data/control information of the remote UE, the relay UE can directly forward the data/control information of the remote UE without any additional information.

In another example, the data/control information of the remote UE received by the relay UE and the data/control information of the remote UE forwarded by the relay UE use different scheduling information, that is, physical resources and physical transmission schemes used by them are separately scheduled by the base station, and may be the same or not the same. So, after receiving the data/control information of the remote UE, the relay UE needs additional information for forwarding the data/control information of the remote UE, such as the scheduling information of a forwarding link.

In the foregoing embodiments, in order to accomplish the forwarding function of the downlink control information (DCI) of the remote UE by the relay UE, the base station needs to configure at least one of the following information for the relay UE by using an RRC message:

identity of the remote UE, such as UE ID; the wireless network temporary identifier (RNTI) of the remote UE, such as C-RNTI, SPS-C-RNTI, etc.; information of PDCCH configuration for the remote UE; information of PDCCH configuration for the relay UE itself. The information of PDCCH configuration herein includes the search space configuration of the PDCCH, the maximum repetition number of the PDCCH, the physical resource configuration of the PDCCH, and other necessary parameters of the PDCCH.

In the foregoing embodiments, in order to accomplish the forwarding function of the uplink control information (UCI) of the remote UE by the relay UE, the base station needs to configure at least one or more of the following information for the relay UE by using an RRC message:

identity of the remote UE, such as UE ID; the wireless network temporary identifier (RNTI) of the remote UE, such as C-RNTI, SPS-C-RNTI, etc.; information of physical uplink control channel (PUCCH) configuration for the remote UE; information of PUCCH configuration for the relay UE itself. The information of PUCCH configuration herein includes the transmission format of the PUCCH, the repetition number of the PUCCH, the physical resource configuration of the PUCCH, and other necessary parameters of the PUCCH.

Relay Scenario Introduction

Scenario 1: The relay UE only forwards the PUCCH/PUSCH of the remote UE, while does not forward the PDCCH/PDSCH of the remote UE.

Figure 12:
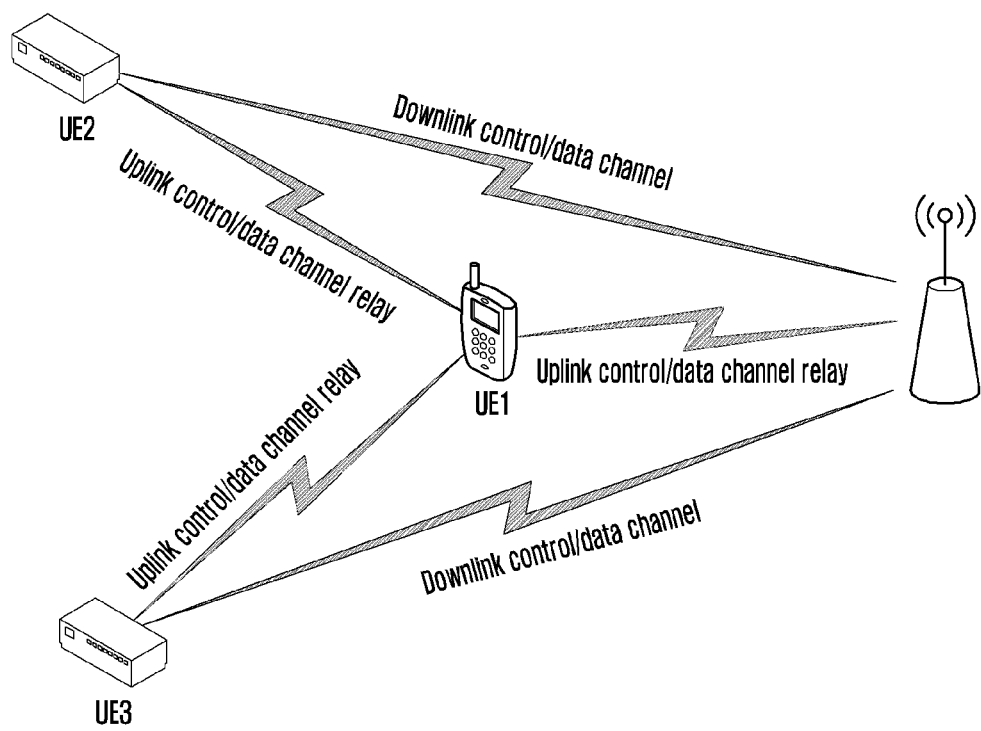
FIG. 12 is a schematic diagram of the first application scenario of the present invention.

Referring to FIG. 12, in the foregoing scenario, the remote UE (i.e., UE2 and UE3 in the figure) can receive the PDCCH/PDSCH of the base station within the downlink coverage area of the base station, but the remote UE is not within the uplink coverage area of the base station due to the limitation of maximum uplink transmission power, and the data service attribute of the remote UE is not sensitive to delay, and thus the PUCCH/PUSCH of the remote UE may be forwarded by the relay UE (i.e., UE1 in the figure).

Scenario 2: The relay UE not only forwards the PUCCH/PUSCH of the remote UE, but also forwards the PDCCH/PDSCH of the remote UE.

Figure 13:
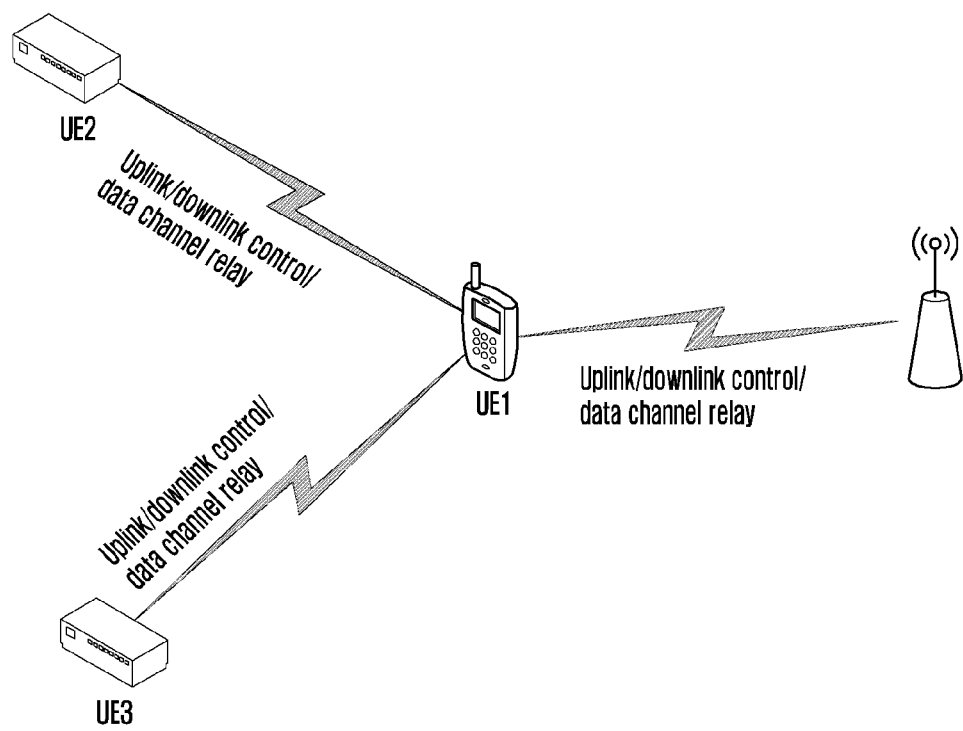
FIG. 13 is a schematic diagram of the second application scenario of the present invention.

Referring to FIG. 13, in the foregoing scenario, the remote UE (i.e., UE2 and UE3 in the figure) is not within the downlink coverage area of the base station, and the data service attribute of the remote UE is not sensitive to delay, and then its PDCCH/PDSCH can be forwarded by the relay UE (i.e., UE1 in the figure). In addition, the remote UE is not within the uplink coverage area of the base station, either, and thus its PUCCH/PUSCH needs to be forwarded by the relay UE.

Scenario 3: The relay UE forwards the PUCCH/PUSCH of the remote UE, and also forwards the PDSCH of the remote UE, but does not forward the PDCCH of the remote UE.

Figure 14:
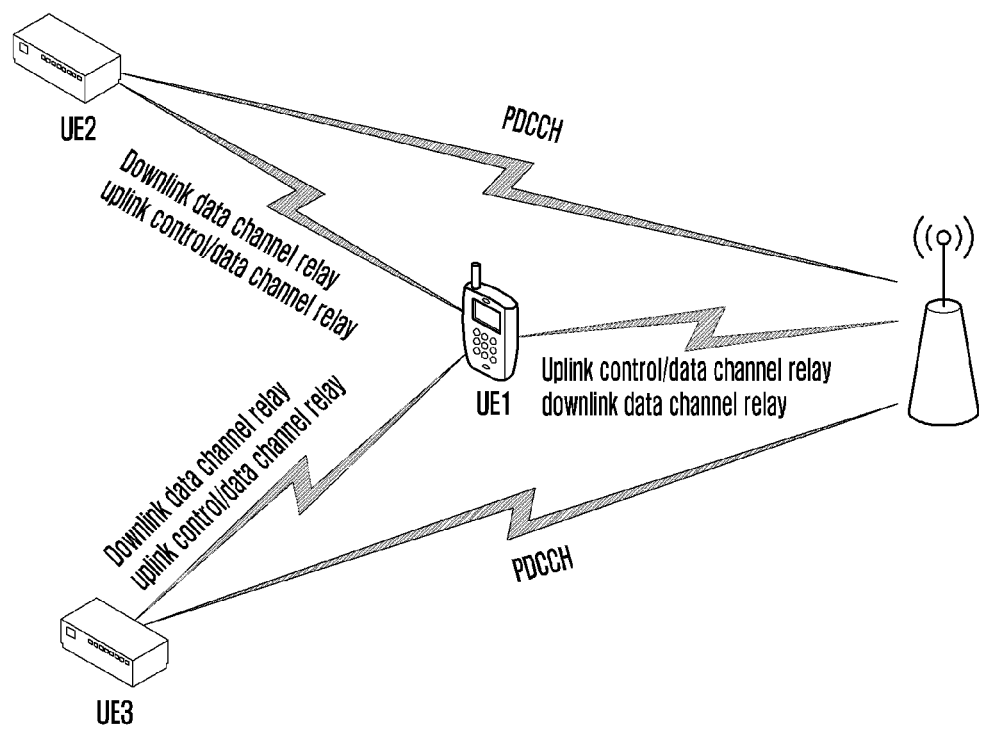
FIG. 14 is a schematic diagram of the third application scenario of the present invention.

Referring to FIG. 14, in the foregoing scenario, the remote UE (i.e., UE2 and UE3 in the figure) is within the downlink coverage range of the base station, and it can receive the PDCCH/PDSCH of the base station, but it requires a large amount of physical resources of the system and a large number of power consumption of the remote UE. In order to save physical resources of the system and power consumption of the remote UE, the remote UE only accepts the PDCCH of the base station, and the PDSCH of the remote UE is forwarded by the relay UE (i.e., UE1 in the figure). In addition, the remote UE is not within the uplink coverage range of the base station due to limitation of the maximum uplink transmission power, and the data service attribute of the remote UE is not sensitive to delay, and thus the PUCCH/PUSCH needs to be forwarded by the relay UE.

It should be noted that the embodiments of the present invention are not limited to these three scenarios.

Introduction of Forwarding Capabilities of Relay UEs

The first type: a relay UE has no decoding capability for the forwarded data (layer 1 forwarding)

The relay UE has no decoding capability of the received data channel of the remote UE, but performs equalization processing for the received data channel of the remote UE, that is to say, performs channel estimation based on the pilot signal of the data channel, and based on the estimated wireless channel response, compensates the data signal for the influence of the wireless channel fading experienced by the received data channel, and maps the compensated data signal to physical resources, and generates a new pilot signal, which is forwarded, together with the compensated data signal.

Since the relay UE forwards the received data channel of the remote UE without performing decoding processing, the relay UE does not need to know the modulation coding scheme of the data channel, but the relay UE must know the time-frequency domain resource location of the data channel and the relevant parameters required by generating the corresponding pilot signals. Here, it may be considered that the modulation coding scheme used by the data channel of the remote UE received by the relay UE and theses used by the data channel forwarded by the relay UE are exactly the same, and sizes of physical resource blocks used by the data channel of the remote UE received by the relay UE and these used by the data channel forwarded by the relay UE are exactly the same. In addition, the pilot signals used by the data channel of the remote UE received by the relay UE and the pilot signals used by the data channel forwarded by the relay UE are exactly the same.

In an example, the frequency domain resources used by the data channel of the remote UE received by the relay UE and these used by the data channel forwarded by the relay UE have a predefined relationship, for example, both of the frequency domain resources are the same, or they have a predefined value of offset, such that the base station does not require additional signaling to signal to the relay UE the frequency domain resources used by the forwarded data channel. In another example, the frequency domain resources used by the data channel of the remote UE received by the relay UE and these used by the forwarded data channel are separately scheduled by the base station, which may be the same or different, so that the base station needs additional signaling to signal to the relay UE the frequency domain resources used by the forwarded data channel, but its advantage lies in that the base station can flexibly allocate the location of the frequency domain resources to a forwarding link.

In practical applications, such a layer 1 based forwarding capability that does not need to perform decoding processing on the forwarded data has lower requirements to module implementation of the relay UE, and can reduce the implementation cost and complexity of the relay UE, and furthermore, since the relay UE does not need to perform decoding on the forwarded data, the relay UE does not need to know the modulation coding scheme of the forwarded data, which can reduce the large number of signaling overhead of the system.

The second type: a relay UE has decoding capability to the forwarded data (layer 1 forwarding)

Such a relay UE has decoding capability to the received data channel of the remote UE, that is to say, it is necessary to perform the entire conventional signal decoding process, including channel estimation, signal equalization, demodulation, descrambling, and decoding etc. If the relay UE successfully decodes the received data channel of the remote UE (i.e., the CRC verification is passed), it performs operations such as CRC addition, channel coding, scrambling, modulation, and physical resource mapping etc., on the transmission data blocks obtained by decoding the data channel, and then a data channel is reconstructed and forwarded.

Since a relay UE performs decoding processing on the received data channel of the remote UE and then forward it, the relay UE must know the modulation coding scheme of the data channel in addition to the time-frequency domain resource information and the pilot information of the data channel. Here, modulation coding schemes used by the data channel of the remote UE received by the relay UE and these used by the forwarded data channel may be the same or different. If different, modulation coding scheme used by the forwarded data channel must be configured by the base station to the relay UE.

In an example, modulation coding scheme used by the data channel of the remote UE received by the relay UE and these used by the data channel forwarded by the relay UE has a predefined relationship, for example, they are totally the same, so, the base station does not need signaling to signal the modulation coding scheme used by the forwarded data channel to the relay UE. In another example, the modulation coding schemes used by data channel of the remote UE received by the relay UE and data channel of the remote UE forwarded by the relay UE are separately flexibly configured by the base station, and then the base station needs additional signaling to signal the modulation coding scheme used by the forwarded data channel to the relay UE, but it has the advantage that the base station can flexibly schedule the forwarding link.

It is possible that the relay UE may successfully decode the received data channel of the remote UE, while it might be unsuccessful for the decoding. If successful, the decoded information bits will be reconstructed into a data channel and then the data channel is forwarded. If unsuccessful, there are different processing manners about whether the relay UE is to forward the data channel.

In an example, the relay UE forwards the data channel to the received data channel of the remote UE regardless of whether the decoding is successful. If the decoding is unsuccessful, the relay UE performs operations such as scrambling, modulation, and physical resource mapping etc., on the soft bit information, before channel decoding, of the received data channel of the remote UE, and reconstructs a data channel and then forwards it. Here, the base station schedules a corresponding forwarding link when scheduling the data channel of the remote UE, and forwards the received data channel on pre-scheduled physical resources regardless of whether the relay UE successfully decodes the received data channel of the remote UE, and the relay UE does not have to feed back the decoding information of the data channel of the remote UE to the base station.

In another example, a relay UE forwards the received data channel of the remote UE only after successfully decoding it. Here, the relay UE must feed back the decoding information of the data channel of the remote UE to the base station. If decoding of the relay UE is unsuccessful, the base station will schedule the retransmission of the data channel of the remote UE. The base station schedules the corresponding forwarding link only after confirming that the relay UE successfully decodes the received data channel of the remote UE, that is to say, allocates corresponding physical resources for data channel forwarded by the relay UE, so as to ensure the reliability of the forwarding link.

In this way, although a relay UE needs to perform decoding processing on the forwarded data, but does not need to perform HARQ combine on the forwarded data, that is to say, it does not need to perform soft bit information combine on the retransmission of the received data channel of the remote UE. Regardless of whether the relay UE successfully decodes the received data channel of the remote UE, soft bit information of the data channel will be cleared after it is forwarded.

In practical applications, in comparison with the above first kind of relay UE, the relay UE that performs decoding processing on the forwarded data has higher implementation cost and complexity, and also requires additional signaling overhead of the system to support the decoding operation, for example, signals to the relay UE the modulation coding scheme used by the received data channel of the remote UE.

Third: relay UE has capabilities of decoding and HARQ combine on the forwarded data (layer 1/layer 2 forwarding)

As the above-mentioned second relay UE, such a relay UE also needs to perform decoding processing on the forwarding data, and also needs to perform HARQ combine on the forwarding data, that is to say, it is necessary to perform soft bit information combine on the retransmission of the received data channel of the remote UE. The soft bit information of the data channel needs to be buffered in the internal memory if the relay UE does not successfully decode the received data channel of the remote UE, and then it waits to receive a retransmission belonging to the same transmission block, so as to combine and decode the soft bit information.

If the data channel of the remote UE received by the relay UE is downlink data, the corresponding soft bit data is cleared only when the corresponding HARQ-ACK information fed back by the remote UE is acknowledged as an ACK; if the data channel of the remote UE received by the relay UE is uplink data, the corresponding soft bit data is cleared only when the new data channel transmission of the remote UE that the base station schedules is received.

The relay UE may successfully decode the received data channel of the remote UE, and may also fail to decode it. If the decoding is successful, the decoded information bits are reconstructed into a data channel which is then forwarded out. If the decoding is unsuccessful, the processing of the relay UE is similar to as described above with respect to the second type of relay UE. In an example, regardless of whether decoding is successful, the relay UE forwards the received data channel of the remote UE. If the decoding is unsuccessful, the operations such as scrambling, modulation, and physical resource mapping etc. are performed on the soft bit information before channel decoding, and a data channel is reconstructed and then forwarded. In another example, only after the relay UE successfully decodes the received data channel of the remote UE, it is forwarded, and the base station schedules the corresponding forwarding link only after confirming that the relay UE successfully decodes the received data channel of the remote UE, so as to ensure the reliability of the forwarding link.

In practical applications, as compared to the above second type of the relay UE, such a relay UE that performs the HARQ combine process on the forwarding data needs to allocate a corresponding soft bit storage space to the data channel of the remote UE, which either occupies soft bit storage space of data channel of the relay UE itself, or adds extra soft bit storage space than the normal UE. In general, such a relay UE is more efficient in utilizing system resources due to the layer 2 HARQ combine capability for forwarding data.

DESCRIPTION OF SPECIFIC EMBODIMENTS

Embodiment 1. Relay UE forwarding downlink data and DCI

Figure 15:
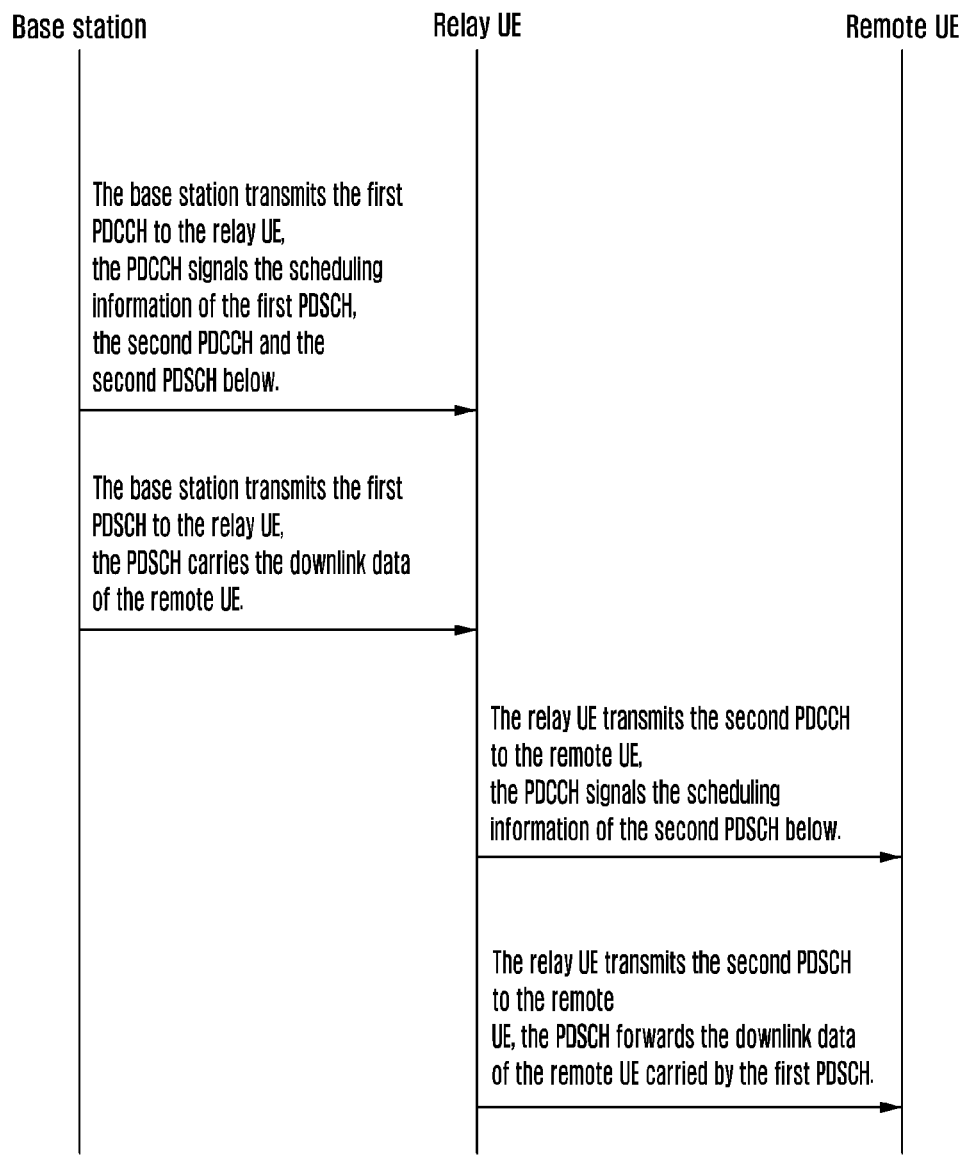
FIG. 15 is a schematic diagram of a communication process according to embodiment 1 of the present invention.

Referring to FIG. 15, it shows a communication process among a base station, a relay UE, and a remote UE in this embodiment.

(1) The base station transmits a first PDCCH to the relay UE, which signals scheduling information of the following first PDSCH, second PDCCH, and second PDSCH.

(2) The base station transmits a first PDSCH to the relay UE, which carries downlink data of the remote UE.

(3) The relay UE transmits a second PDCCH to the remote UE, which signals scheduling information of the second PDSCH below.

(4) The relay UE transmits the second PDSCH to the remote UE, and the PDSCH forwards the downlink data of the remote UE carried by the first PDSCH.

* Multiple Possibilities for the First PDCCH

In this embodiment, the first PDCCH may include one or more of scheduling information of the first PDSCH, the second PDCCH, and the second PDSCH.

In an example, the first PDCCH includes scheduling information of the first PDSCH or the second PDSCH, where the first PDSCH and the second PDSCH use totally the same scheduling information, and their transmitting times are merely different, and the transmitting times of the second PDSCH and the first PDSCH have a predefined relationship, for example, the relay UE transmits a second PDSCH at the $k^{th}$ transmission time interval (TTI) after receiving the first PDSCH, wherein k is a predefined value, for example, k=4, to reserve sufficient time for decoding of the first PDSCH and signal generation of the second PDSCH.

In an example, the first PDCCH includes scheduling information of the first PDSCH and the second PDSCH. Here, the first PDSCH and the second PDSCH are separately scheduled by the base station, and different scheduling information is used. The first PDSCH and the second PDSCH may use completely different scheduling information, or may share partial scheduling information. The transmitting times of the first PDSCH and the second PDSCH may have a predefined relationship or may be indicated separately.

In an example, the first PDCCH does not include scheduling information of the second PDCCH. Here, the scheduling information used by the second PDCCH and the first PDCCH has a predefined relationship, for example, totally the same, or has one-to-one correspondence through a predefined table. The scheduling information includes: an aggregation Level, the occupied CCE location, the used search space, and a time-frequency domain location corresponding to the search space.

In an example, the first PDCCH includes scheduling information of the second PDCCH. Here, the second PDCCH and the first PDCCH use different scheduling information, and may use completely different scheduling information, or may share partial scheduling information. Here, the second PDCCH may be obtained by the transmitting time of the first PDCCH according to a predefined relationship, or may be signaled in the first PDCCH.

In an example, the transmitting time of the second PDCCH and the first PDCCH has a predefined relationship, for example, the relay UE transmits the second PDCCH at the $k^{th}$ TTI after receiving the first PDCCH, wherein k is a predefined value, for example, k=4, to reserve sufficient time for decoding of the first PDCCH and signal generation of the second PDCCH. In another example, the transmitting time of the second PDCCH and the first PDSCH has a predefined relationship, for example, the relay UE transmits the second PDCCH at the 4th TTI after receiving the first PDSCH.

In this embodiment, the first PDCCH may correspond to transmission of one or multiple DCIs.

In an example, the first PDCCH corresponds to one DCI, and the DCI includes scheduling information of the first PDSCH and the second PDSCH, and some information has only one indication field, and which are both used for the first PDSCH and the second PDSCH, for example, an HARQ process number, new data indication (NDI) and redundancy version (RV). Some information includes two independent indication fields, which are separately used for the first PDSCH and the second PDSCH, such as modulation coding scheme (MCS), physical resource allocation (RA), and number of repetitions. Some information includes an independent indication field and a corresponding offset, and the independent indication field is used to indicate scheduling information of the first PDSCH or the second PDSCH, and the offset is combined with the independent indication field to indicate scheduling information of another PDSCH.

In another example, the first PDCCH corresponds to multiple DCIs, for example, one DCI is used to indicate scheduling information of the first PDSCH, and another DCI is used to indicate scheduling information of the second PDSCH, and another yet DCI is used to indicate scheduling information of the second PDCCH. In one example, each DCI can be used to independently indicate scheduling information of the corresponding PDSCH. In another example, one DCI cannot be used to independently indicate the scheduling information of the corresponding PDSCH, and it is used in combination with other DCIs. For example, when determining scheduling information of the first PDSCH, DCI based on scheduling information indicating the second PDSCH is also required.

In this embodiment, the first PDCCH may use the information of PDCCH configuration for the relay UE itself, and may also use the information of PDCCH configuration for the remote UE, the information of configuration includes information such as search space configuration, maximum number of repetitions, and time-frequency domain resource configuration where the search space is located. The second PDCCH can only use the information of PDCCH configuration for the remote UE.

In this embodiment, the first PDCCH may be scrambled using the UE's own RNTI, or may be scrambled using the RNTI of the remote UE. The second PDCCH can only be scrambled using the RNTI of the remote UE.

In this embodiment, the first PDCCH may correspond to one PDCCH, and may also correspond to a set of PDCCHs. This set of PDCCHs may be received at the same time or may be received at different times. The set of PDCCHs may be scrambled using the same RNTI, for example, may be scrambled both using the RNTI of the remote UE, or may be scrambled using different RNTI, for example, one PDCCH of them is scrambled using the RNTI of the relay UE, and another PDCCH among which is scrambled using the RNTI of the remote UE. This set of PDCCHs may be in a same search space, for example, all in the UE-specific Search Space (USS) of the remote UE, or in different search spaces, for example, one of the PDCCHs is in the USS of the relay UE, and another PDCCH is in the USS of the remote UE. This set of PDCCHs may use the same information of PDCCH configuration, for example, the information of PDCCH configuration for the remote UE may be used by all of them, or different information of PDCCH configuration may be used, for example, one PDCCH of them uses the information of PDCCH configuration for the remote UE, and another PDCCH uses information of PDCCH configuration for the relay UE.

In this embodiment, the first PDCCH may be transmitted at the same time as the first PDSCH, that is, the same TTI scheduling; the second PDCCH may also be transmitted at the same time as the second PDSCH, that is, the same TTI scheduling.

* The Scheduling Information of the First PDSCH and the Second PDSCH May be the Same or Different In one example, the modulation coding schemes used by the second PDSCH and the first PDSCH have a predefined relationship, for example, the two modulation coding schemes are identical; in another example, the modulation coding schemes used by the second PDSCH and the first PDSCH have no predefined relationship, and they are configured by the base station to the relay UE. The configuration information of the modulation coding scheme may be included in two separate fields of a same DCI, or may be included in separate DCIs.

In one example, the transport block size (TBS) scheduled by the second PDSCH and the TBS scheduled by the first PDSCH must be identical. The condition of the same TBS can be used to optimize DCI design, wherein the DCI indicates scheduling information of the first PDSCH or the second PDSCH. In another example, the TBS scheduled by the second PDSCH is greater than or equal to the TBS scheduled by the first PDSCH, and when the TBS scheduled by the second PDSCH is greater than the TBS scheduled by the first PDSCH, the relay UE needs to perform bit padding on the received transport data block of the first PDSCH at the MAC layer, until the TBS requirement scheduled by the second PDSCH is met.

In the foregoing embodiment, the first PDSCH is transmitted by the base station to the relay UE at the $(N1)^{th}$ TTI, and the second PDSCH is transmitted by the relay UE to the remote UE at the $(N2)^{th}$ TTI, the first PDSCH and the second PDSCH carry the same downlink data information of the remote UE.

In an example, N2 may be obtained from N1 through a predefined relationship which is related to whether the relay UE performs decoding processing on the first PDSCH. For example, when the relay UE does not have the capability of performing decoding processing on the first PDSCH, N2=N1+1, that is, the relay UE forwards the downlink data at the next TTI after receiving the downlink data of the remote UE; when the relay UE has the capability to perform decoding processing on the first PDSCH, N2=N1+k, k is a predefined value, for example, k=4, so as to reserve sufficient time for decoding of the first PDSCH by the relay UE and signal generation of the second PDSCH.

In another example, N2 and N1 have no necessary relationship except that N2-N1>=k, and they are separately signaled by the base station. Here, k is a predefined value, for example, when the relay UE has no capability to perform decoding processing on the first PDSCH, k=1; when the relay UE has the capability of decoding the first PDSCH, k=4.

In an example, the information of N2 and N1 is separately signaled by the base station to the relay UE, and the signaled information may be included in two separate fields of a same DCI, or may be included in separate DCIs. In another example, the base station signals information of the difference between N2 and N1, and the relay UE may derive N2 according to N1 and the difference information, or the relay UE may derive N1 according to N2 and the difference information, and the difference information may be included in the DCI indicating the scheduling information of the first PDSCH, and may also be included in the DCI indicating the scheduling information of the second PDSCH.

Embodiment 2. The Relay UE Only Forwards Downlink Data and does not Forward DCI (the First PDSCH and the Second PDSCH are Separately Scheduled)

Figure 16:
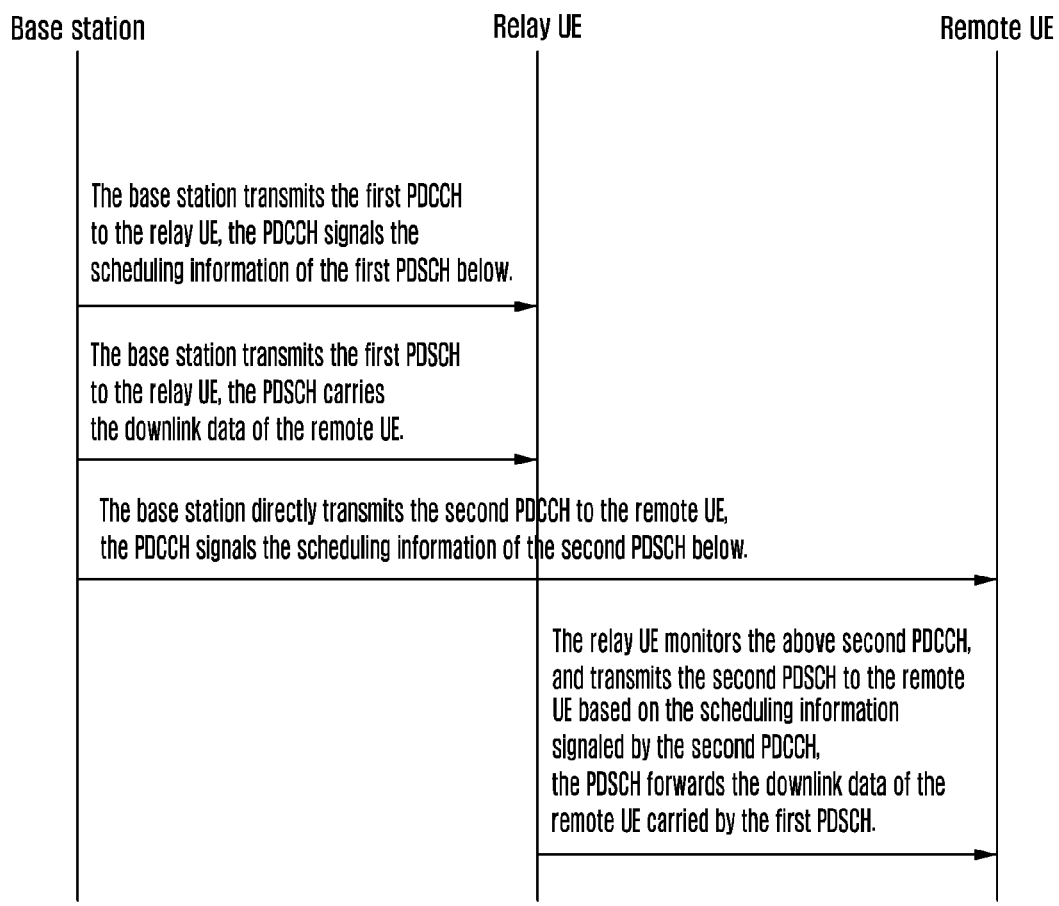
FIG. 16 is a schematic diagram of a communication process according to Embodiment 2 of the present invention.

Referring to FIG. 16, FIG. 16 shows a communication process among a base station, a relay UE, and a remote UE in this embodiment.

(1) The base station transmits a first PDCCH to the relay UE, the PDCCH signaling scheduling information of the first PDSCH below.

(2) The base station transmits a first PDSCH to the relay UE, which carries downlink data of the remote UE.

(3) The base station directly transmits a second PDCCH to the remote UE, which signals scheduling information of the following second PDSCH.

(4) The relay UE monitors the above second PDCCH, and transmits a second PDSCH to the remote UE based on the scheduling information signaled by the second PDCCH, where the second PDSCH forwards the downlink data of the remote UE carried by the first PDSCH.

The difference between embodiment 2 and embodiment 1 lies in that the relay UE only forwards the PDSCH of the remote UE, but does not forward the PDCCH of the remote UE, that is, the PDCCH received by the remote UE is from the base station, and the corresponding PDSCH is from the relay UE.

In this embodiment, the first PDSCH and the second PDSCH are separately scheduled by the base station, that is, the first PDSCH and the second PDSCH use separate scheduling information, i.e., the first PDSCH and the second PDSCH may use completely different scheduling information, or they may share partially identical scheduling information. Here, the relay UE needs to receive the first PDCCH, acquire the scheduling information of the first PDSCH, so as to support the receiving operation of the first PDSCH, and furthermore, it needs to monitor the second PDCCH that is transmitted by the base station to the remote UE, and then acquires scheduling information of the second PDSCH, so as to support the transmitting operation of the second PDSCH. It is necessary for the base station to configure the information of PDCCH configuration of the remote UE and the RNTI information of the remote UE for the relay UE to monitor the second PDCCH transmitted by the base station to the remote UE.

In an example, the second PDCCH may be transmitted before the first PDSCH, and the relay UE needs to jointly determine the scheduling information of the first PDSCH according to the first PDCCH and the monitored second PDCCH of the remote UE, so as to support the receiving operation for the first PDSCH. Here, the second PDCCH may be transmitted before the first PDCCH, or may be transmitted after the first PDCCH.

In another example, the second PDCCH is transmitted after the first PDSCH, and the relay UE can completely determine the scheduling information of the first PDSCH according to the first PDCCH.

Embodiment 3. The Relay UE Only Forwards Downlink Data and does not Forward DCI (the First PDSCH and the Second PDSCH Use the Same Scheduling)

Figure 17:
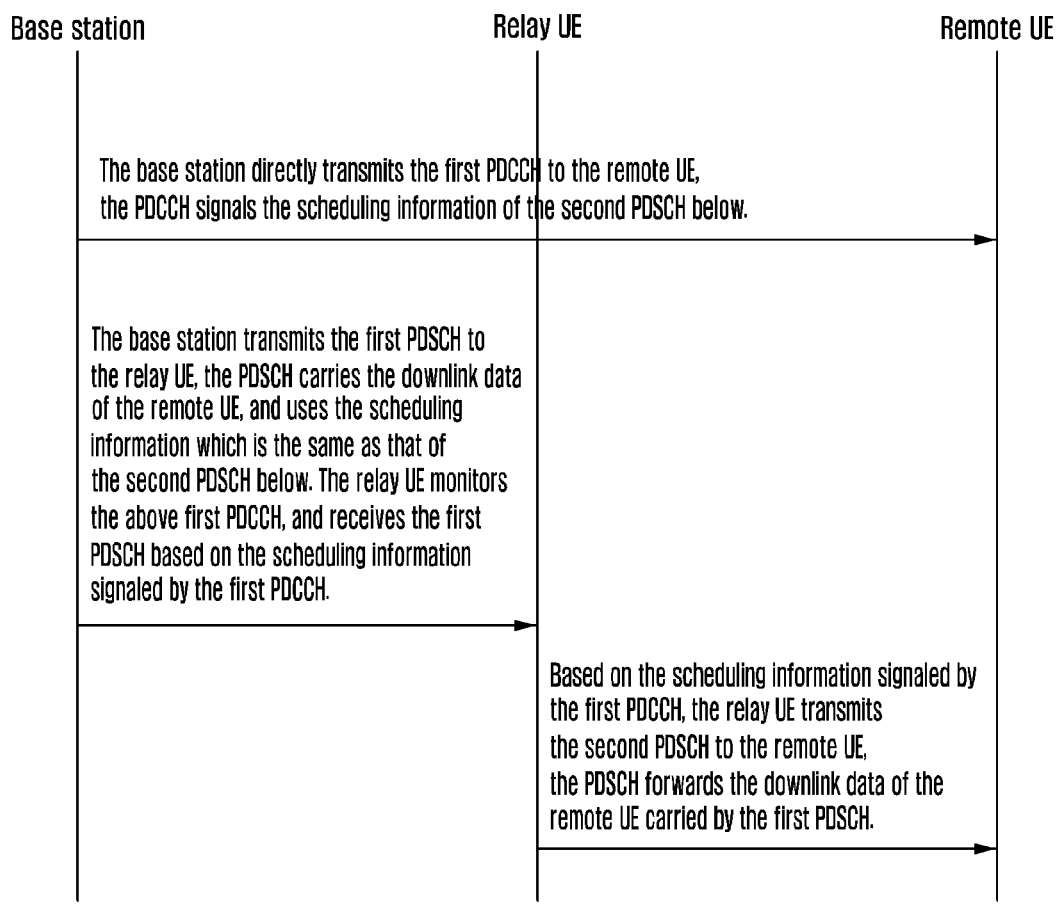
FIG. 17 is a schematic diagram of a communication process according to Embodiment 3 of the present invention.

Referring to FIG. 17, FIG. 17 shows a communication process among a base station, a relay UE, and a remote UE in this embodiment.

(1) The base station directly transmits a first PDCCH to the remote UE, the PDCCH signaling scheduling information of the second PDSCH below.

(2) The base station transmits a first PDSCH to the relay UE, the PDSCH carries data of the remote UE, and uses the same scheduling information as the following second PDSCH. The relay UE monitors the first PDCCH above, and receives the first PDSCH based on the scheduling information signaled by the first PDCCH.

(3) The relay UE transmits the second PDSCH to the remote UE based on the scheduling information signaled by the first PDCCH, the PDSCH forwards the downlink data of the remote UE carried by the first PDSCH.

Embodiment 3 differs from embodiment 2 in that the first PDSCH and the second PDSCH use the same scheduling information, and the base station does not need to transmit additional signaling to the relay UE to signal the scheduling information of the first PDSCH. Here, the relay UE needs to monitor the first PDCCH transmitted by the base station to the remote UE, acquire scheduling information of the second PDSCH, and use the scheduling information for the first PDSCH, either.

In an example, the transmitting time of the first PDSCH and the transmitting time of the first PDCCH of the remote UE monitored by the relay UE have a predefined relationship, for example, at the 4th TTIs after monitoring the first PDCCH of the remote UE, the relay UE receives the first PDSCH.

In another example, the transmitting time of the first PDSCH and the transmitting time of the second PDSCH have a predefined relationship. For example, the transmitting time of the second PDSCH signaled by the PDCCH of the remote UE monitored by the relay UE is the $N^{th}$ TTI after the transmitting time of the first PDCCH, and then, the relay UE receives the first PDSCH at the NO TTI after the transmitting time of the first PDCCH.

Embodiment 4. The Relay UE Forwards DCI and Uplink Data

Figure 18:
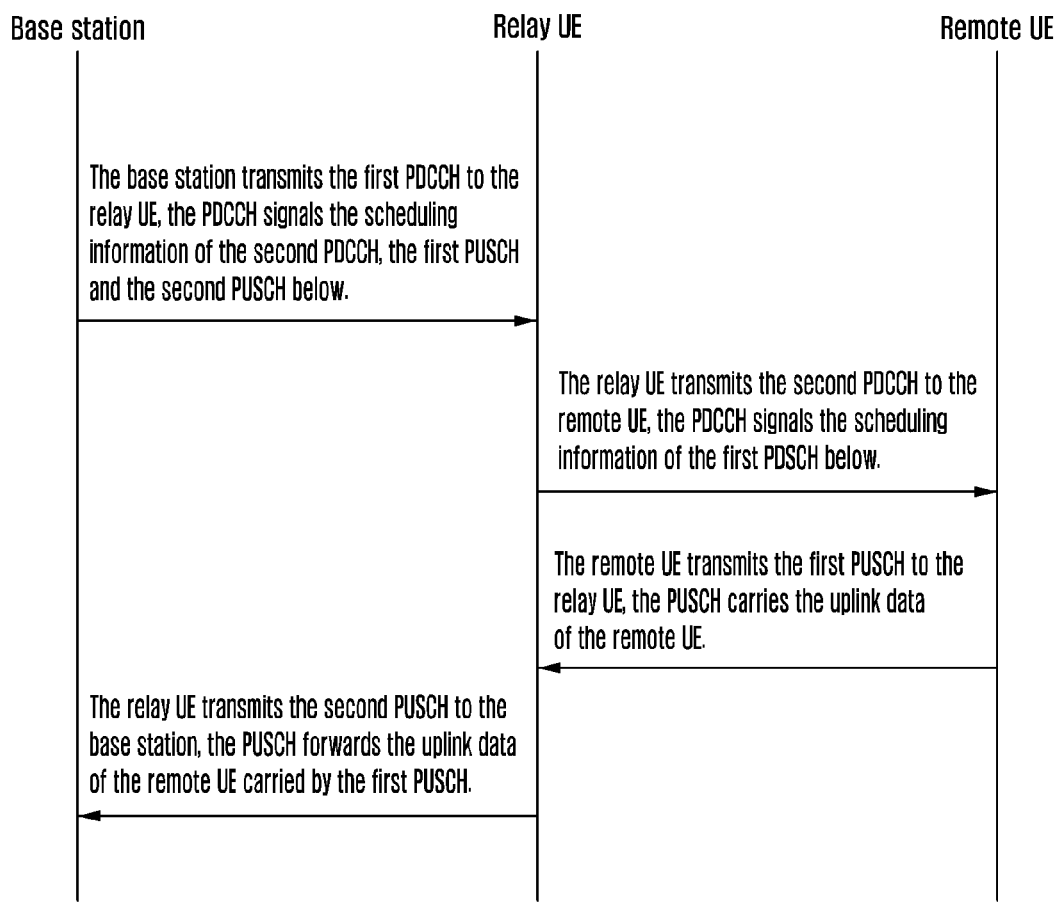
FIG. 18 is a schematic diagram of a communication process according to Embodiment 4 of the present invention.

Referring to FIG. 18, FIG. 18 shows a communication process among a base station, a relay UE, and a remote UE in this embodiment.

(1) The base station transmits a first PDCCH to the relay UE, the PDCCH signals scheduling information of the following second PDCCH, the first PUSCH, and the second PUSCH.

(2) The relay UE transmits a second PDCCH to the remote UE, the PDCCH signals scheduling information of the first PUSCH below.

(3) The remote UE transmits the first PUSCH to the relay UE, the PUSCH carries the uplink data of the remote UE.

(4) The relay UE transmits a second PUSCH to the base station, and the PUSCH forwards the uplink data of the remote UE carried by the first PUSCH.

Embodiment 4 is similar to embodiment 1 except that embodiment 1 is for the forwarding of the PDSCH, and embodiment 4 is for the forwarding of the PUSCH. All the descriptions of embodiment 1 can be similarly used in embodiment 4.

The description of the first PDCCH in embodiment 1 may also be used for the first PDCCH herein, for example, the first PDCCH may include one or more DCIs; the first PDCCH may include one or more of the scheduling information of the second PDCCH, the first PUSCH, and the second PUSCH; the first PDCCH may correspond to one PDCCH or multiple PDCCHs and the like. The relationship description of the scheduling information/the transmitting time of the first PDCCH and the second PDCCH in embodiment 1 may also be similarly applied to the first PDCCH and the second PDCCH herein.

The relationship description of the scheduling information of the first PDSCH and the second PDSCH in embodiment 1 may also be used for the first PUSCH and the second PUSCH herein, for example, the first PUSCH and the second PUSCH use the same scheduling information; the first PUSCH and the second PUSCH use different scheduling information, and they may use completely different scheduling information, or they may share partial scheduling information.

The relationship description of the transmitting times of the first PDSCH and the second PDSCH in embodiment 1 may also be used for the first PUSCH and the second PUSCH herein, for example, the transmitting time of the second PUSCH and the transmitting time of the first PUSCH have a predefined relationship, for example, the relay UE transmits the second PUSCH at the 4th TTI after receiving the first PUSCH; the transmitting time of the second PUSCH and the transmitting time of the first PUSCH have no predefined relationship, and they are signaled by the first PDCCH.

\* The Scheduling Information of the First PUSCH and the Second PUSCH May be the Same or Different In an example, the modulation coding schemes used by the second PUSCH and the first PUSCH have a predefined relationship, for example, the two modulation coding schemes are identical; in another example, the modulation coding schemes used by the second PUSCH and the first PUSCH have no predefined relationship, and they are separately signaled by the base station to the relay UE. The indication information of the modulation coding scheme may be included in two separate fields of the same DCI, or may be included in separate DCIs.

In an example, the frequency domain resources occupied by the second PUSCH and the first PUSCH have a predefined relationship, for example, the two frequency domain resources are identical; in another example, the frequency domain resources occupied by the second PUSCH and the first PUSCH have no predefined relationship, and they are separately signaled by the base station to the relay UE. The indication information of the frequency domain resources may be included in two separate fields of the same DCI, or may be included in separate DCIs.

In the foregoing embodiment, the first PUSCH is transmitted by the remote UE to the relay UE at the $(N1)^{th}$ TTI, and the second PUSCH is transmitted by the relay UE to the base station at the $(N2)^{th}$ TTI, the first PUSCH and the second PUSCH carry the same Uplink data information of the remote UE.

In one example, N2 can be obtained from N1 by a predefined relationship, such as N2=N1+k, k is a predefined value, such as k=4, so as to reserve sufficient time for decoding of the first PDSCH and signal generation of the second PDSCH of the relay UE.

In another example, N2 and N1 have no necessary relationship except that N2-N1>=k, k is a predefined value, such as k=4. In one example, the information of N2 and N1 is separately signaled by the base station to the relay UE, and the indication information may be included in two separate fields of a same DCI, or may be included in separate DCIs. In another example, the base station signals difference information of N2 and N1, and the relay UE may derive N2 according to N1 and the difference information, or derive N1 according to N2 and the difference information, and the difference information may be included in the DCI indicating scheduling information of the first PUSCH, and may also be included in the DCI indicating scheduling information of the second PUSCH.

Embodiment 5. The Relay UE Forwards the Uplink Data and does not Forward the DCI (the First PUSCH and the Second PUSCH are Separately Scheduled)

Figure 19:
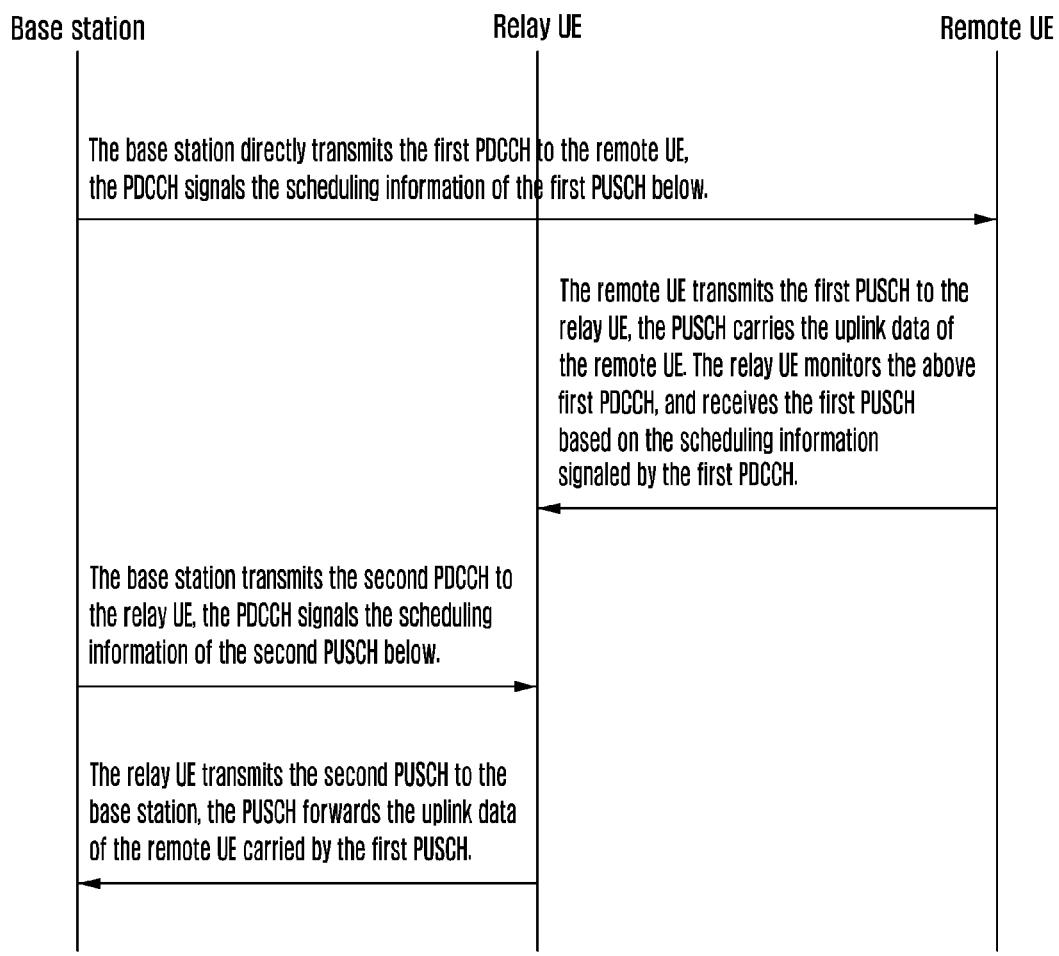
FIG. 19 is a schematic diagram of a communication process according to Embodiment 5 of the present invention.

Referring to FIG. 19, FIG. 19 shows a communication process among a base station, a relay UE, and a remote UE in this embodiment.

(1) The base station directly transmits a first PDCCH to the remote UE, the PDCCH signals scheduling information of the first PUSCH below.

(2) The remote UE transmits the first PUSCH to the relay UE, and the PUSCH carries the uplink data of the remote UE. The relay UE monitors the first PDCCH above and receives the first PUSCH based on the scheduling signaled by the first PDCCH.

(3) The base station transmits a second PDCCH to the relay UE, the PDCCH signals scheduling information of the following second PUSCH.

(4) The relay UE transmits a second PUSCH to the base station, the PUSCH forwards the uplink data of the remote UE carried by the first PUSCH.

Embodiment 5 is similar to embodiment 2. The difference therebetween lies in that embodiment 2 is directed to the forwarding of the PDSCH, while embodiment 5 is directed to the forwarding of the PUSCH, and all the description about embodiment 2 may also be applicable to embodiment 5.

Embodiment 6. The Relay UE Forwards the Uplink Data and does not Forward the DCI (the First PUSCH and the Second PUSCH Adopt the Same Scheduling)

Figure 20:
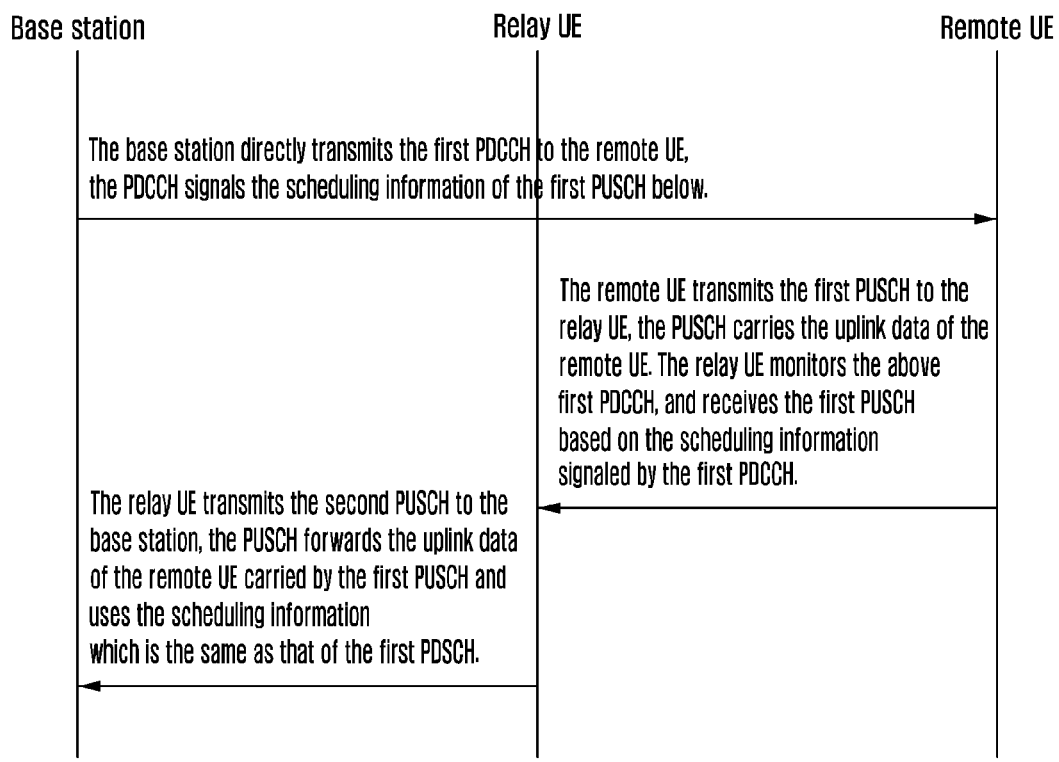
FIG. 20 is a schematic diagram of a communication process according to Embodiment 6 of the present invention.

Referring to FIG. 20, FIG. 20 shows a communication process among a base station, a relay UE, and a remote UE in this embodiment.

(1) The base station directly transmits a first PDCCH to the remote UE, the PDCCH signals scheduling information of the first PUSCH below.

(2) The remote UE transmits the first PUSCH to the relay UE, the PUSCH carries the uplink data of the remote UE. The relay UE monitors the first PDCCH above, and receives the first PUSCH based on the scheduling information signaled by the first PDCCH.

(3) The relay UE transmits the second PUSCH to the base station, and the PUSCH forwards the uplink data of the remote UE carried by the first PUSCH, and uses the same scheduling information as the first PUSCH.

Embodiment 6 is similar to embodiment 3. The difference therebetween lies in that embodiment 3 is directed to the forwarding of the PDSCH, and embodiment 6 is directed to the forwarding of the PUSCH, and all the descriptions of embodiment 3 may be similarly used in embodiment 6.

Embodiment 7. Relay UE Forwards Downlink Data and UCI

Figure 21:
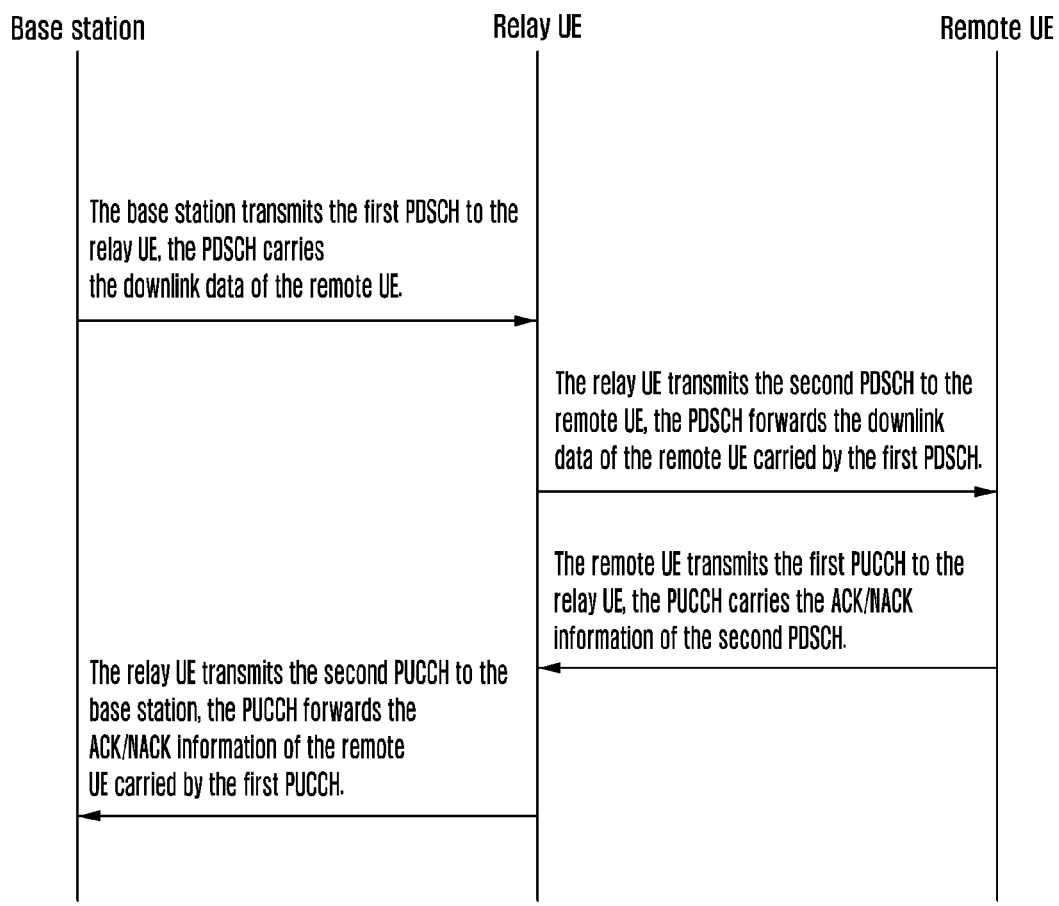
FIG. 21 is a schematic diagram of a communication process according to Embodiment 7 of the present invention.

Referring to FIG. 21, FIG. 21 shows a communication process among a base station, a relay UE, and a remote UE in this embodiment.

(1) The base station transmits a first PDSCH to the relay UE, the PDSCH carries downlink data of the remote UE.

(2) The relay UE transmits the second PDSCH to the remote UE, the PDSCH forwards the downlink data of the remote UE carried by the first PDSCH.

(3) The remote UE transmits a first PUCCH to the relay UE, the PUCCH carries ACK/NACK information of the second PDSCH.

(4) The relay UE transmits a second PUCCH to the base station, the PUCCH forwards the ACK/NACK information of the remote UE carried by the first PUCCH.

In this embodiment, the relay UE forwards the PUCCH of the remote UE, for example, HARQ-ACK information, in addition to forwarding the PDSCH of the remote UE.

\* The Resources of the First PUCCH and the Second PUCCH May be the Same or Different In one example, the resources used by the second PUCCH and the first PUCCH have a predefined relationship, for example, the two resources are identical, the resources include physical resources and logical resources (used for PUCCH signal generation). In another example, the resources used by the second PUCCH and the first PUCCH have no predefined relationship, and are separately signaled by the base station to the relay UE, and the resource indication information of the second PUCCH and the first PUCCH may be included in two separate fields of the same DCI, and may also be included in separate DCIs.

In embodiment 1, the first PUCCH is transmitted by the remote UE to the relay UE at the $(N3)^{th}$ TTI, and the second PUCCH is transmitted by the relay UE to the base station at the $(N4)^{th}$ TTI, and the first PUCCH and the second PUCCH carry the same HARQ-ACK information of the remote UE.

In an example, N4 may be obtained by N3 through a predefined relationship. For example, when the relay UE does not have the capability of performing decoding processing on the first PUCCH, N4=N3+1, that is, the relay UE forwards the UCI of the remote UE at the next TTI after receives the UCI; when the relay UE has the capability of decoding the first PUCCH, N4=N3+k, k is a predefined value, for example, k=2, so as to reserve sufficient time for the decoding of the first PUCCH by the relay UE and the signal generation of the second PUCCH.

In another example, N4 and N3 have no necessary relationship except that N4-N3>=k, and are separately signaled by the base station to the relay UE, k is a predefined value, for example, when the relay UE does not have the capability of performing decoding processing on the first PUCCH, k=1; when the relay UE has the capability of performing decoding processing on the first PUCCH, k=2.

In an example, the information of N4 and N3 is separately signaled by the base station to the relay UE, and the indication information may be included in two separate fields of the same DCI, or may be included in separate DCIs. In another example, the base station signals the difference information of N4 and N3, and the relay UE may derive N4 according to N3 and the difference information, the difference information may be included in a DCI indicating scheduling information of the first PDSCH, or may be included in the DCI indicating the scheduling information of the second PDSCH.

In an example, the resource used by the first PUCCH and/or the TTI where it locates are indicated by the corresponding DCI that schedules the second PDSCH, and the resource used by the second PUCCH and/or the TTIs where it locates are indicated by the corresponding DCI that schedules the first PDSCH. In another example, the resources used by the first PUCCH and the second PUCCH and/or the TTIs where they locate are separately indicated by two separate fields of the corresponding DCI that schedule the first PDSCH or the second PDSCH.

\* The TTI of the Second PUCCH is Determined by the TTI of the First PDSCH

In embodiment 1, the base station transmits the first PDSCH at the $(N1)^{th}$ TTI, the PDSCH carries the downlink data information of the remote UE, and is forwarded to the remote UE through the relay UE, and the base station receives the second PUCCH at the $(N4)^{th}$ TTI, the PUCCH carries the corresponding HARQ-ACK information of the remote UE forwarded via the relay UE.

In an example, N4 can be obtained by N1 through a predefined relationship and is not necessarily related to N3, for example, N4=N1+k, k is a predefined value. In an example, k=8, that is, it is expected to receive the corresponding HARQ-ACK information forwarded via the relay UE, at the eighth TTI after the base station transmits the first PDSCH. Here, the network needs to ensure that the relay UE can receive the first PUCCH before transmitting the second PUCCH, and reserve sufficient time for the decoding of the first PUCCH and the signal generation of the second PUCCH, and if the relay UE receives the first PUCCH in advance, it will be forwarded until the $(N1+8)^{th}$ TTIs.

\* The Second PUCCH Uses the Information of PUCCH Configuration for the Relay UE or the Remote UE In an example, the second PUCCH uses the relevant parameter configuration of the PUCCH of the remote UE and uses the RNTI of the remote UE for scrambling. In another example, the second PUCCH uses the relevant parameter configuration of the PUCCH of the remote UE, but uses the RNTI of the relay UE for scrambling. In another example, the second PUCCH uses the parameter configuration of the PUCCH of the relay UE, but uses the RNTI of the remote UE for scrambling.

In an example, if the relay UE does not receive the first PUCCH, the second PUCCH is still transmitted, and the information carried by the second PUCCH is not an ACK or a NACK, but a message other than ACK or NACK, for example DTX. In another example, the second PUCCH is not needed to be transmitted if it does not receive the first PUCCH.

In an example, the relay UE is transparent to the remote UE, and behaviors and/or related parameter configuration of the remote UE in the relay transmission mode are the same as those in the direct transmission mode. In another example, the relay UE is non-transparent to the remote UE, for example, the base station notifies the remote UE that it has entered the relay transmission mode instead of the direct transmission mode through the RRC message, and the behaviors of the remote UE in the relay transmission mode and/or the relevant parameter configuration are different from those in the direct transfer mode.

In this embodiment, the relay UE forwards the DL HARQ-ACK information of the remote UE. Similarly, the relay UE may also forward other UCI of the remote UE, such as CSI and SR, which also needs the base station configuring related information for the relay UE. In an example, the base station configures the relay UE with the relevant information of the SR transmission of the remote UE, and the relay UE periodically monitors the SR opportunity of the remote UE according to the configured information, and forwards the SR opportunity to the base station. In an example, the relay UE does not forward downlink control/data information between the base station and the remote UE, but forwards uplink control/data information of the base station and the remote UE, including the forwarding of periodic CSI and/or non-periodic CSI of the remote UE.

Embodiment 8. The Relay UE Forwards Downlink Data and UCI (the Relay UE Combines and Transmits the Decoding Information of the First PDSCH and the Information of the Forwarded First PUCCH)

Figure 22:
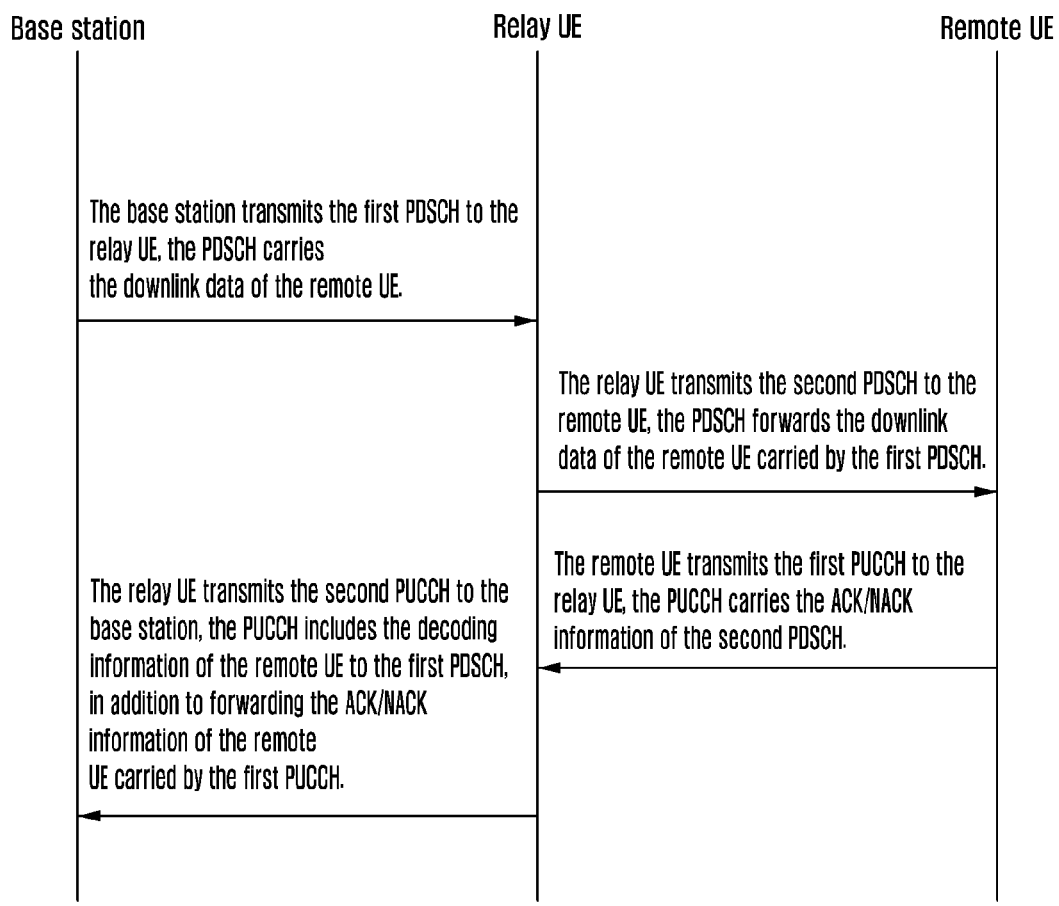
FIG. 22 is a schematic diagram of a communication process according to Embodiment 8 of the present invention.

Referring to FIG. 22, FIG. 22 shows a communication process among a base station, a relay UE, and a remote UE in this embodiment.

(1) The base station transmits a first PDSCH to the relay UE, the PDSCH carries downlink data of the remote UE.

(2) The relay UE transmits the second PDSCH to the remote UE, the PDSCH forwards the downlink data of the remote UE carried by the first PDSCH.

(3) The remote UE transmits a first PUCCH to the relay UE, the PUCCH carries the ACK/NACK information of the second PDSCH.

(4) The relay UE transmits a second PUCCH to the base station, the PUCCH includes the decoding information of the first PDSCH by the relay UE, in addition to forwarding the ACK/NACK information of the remote UE carried by the first PUCCH.

Embodiment 8 is an optimization of embodiment 7, that is, together with the forwarding of the HARQ-ACK information of the remote UE, the relay UE transmits the decoding information of the first PDSCH of its own at once, so that the base station performs optimization processing when it initiates the retransmission scheduling.

* Only Feeding Back the ACK Information of the Relay UE to the First PDSCH

In an example, the relay UE will feed back an ACK to the base station only when the first PDSCH is correctly decoded, and no feedback is needed if the relay UE does not correctly decode the first PDSCH. If the HARQ-ACK information of the remote UE which is forwarded via the relay UE, received by the base station, is ACK, the base station initiates new data scheduling of the remote UE; if the HARQ-ACK information of the remote UE which is forwarded via the relay UE, received by the base station, is NACK and the decoding result of the first PDSCH fed back by the relay UE is ACK, only the retransmission scheduling of the second PDSCH of the relay UE to the remote UE is initiated; if the HARQ-ACK information of the remote UE which is forwarded via the relay UE, received by the base station, is NACK and the feedback of the correct decoding of the first PDSCH by the relay UE is not received, the retransmission scheduling of the first PDSCH between the base station and the relay UE is initiated, and the retransmission scheduling of the second PDSCH between the relay UE and the remote UE.

In another example, the decoding result of the first PDSCH by the relay UE is fed back to the base station via the second PUCCH, regardless of whether it is an ACK or a NACK.

* Multiplexing Transmission of ACK Information of the Relay UE to the First PDSCH and ACK/NACK Information of the Remote UE to the Second PDSCH In embodiment 3, the decoding information of the first PDSCH by the relay UE is transmitted via the second PUCCH, that is, the decoding information of the first PDSCH fed back by the relay UE and the forwarded corresponding HARQ-ACK information of the remote UE are multiplexed and transmitted in a same PUCCH.

In an example, the second PUCCH needs to carry at least the following three state information: when the information carried by the first PUCCH received by the relay UE is ACK, the relay UE transmits an ACK at the second PUCCH regardless of whether the relay UE correctly decodes the first PDSCH, which is the first type of status information; when the information carried by the first PUCCH received by the relay UE is NACK and the relay UE fails to decode the first PDSCH, the relay UE transmits a NACK at the second PUCCH, which is the second type of state information; when the information carried by the first PUCCH received by the relay UE is NACK and the relay UE successfully decodes the first PDSCH, the relay UE transmits an ACK NACK at the second PUCCH, which is the third type of state information.

* The ACK Information of the Relay UE to the First PDSCH is Fed Back in Other Manners In an example, the ACK information of the relay UE to the first PDSCH is not carried in the second PUCCH forwarded by the relay UE, but is transmitted in other manners, for example, transmitted via a dedicated PUCCH, and only when the PUCCH and the second PUCCH forwarded by the relay UE are accidently transmitted at a same time, the ACK information of the relay UE to the first PDSCH and the ACK/NACK information of the remote UE to the second PDSCH, forwarded by the relay UE are multiplexed and transmitted in a same PUCCH.

Example 9. The Relay UE Forwards the UCI and does not Forward the Downlink Data

Figure 23:
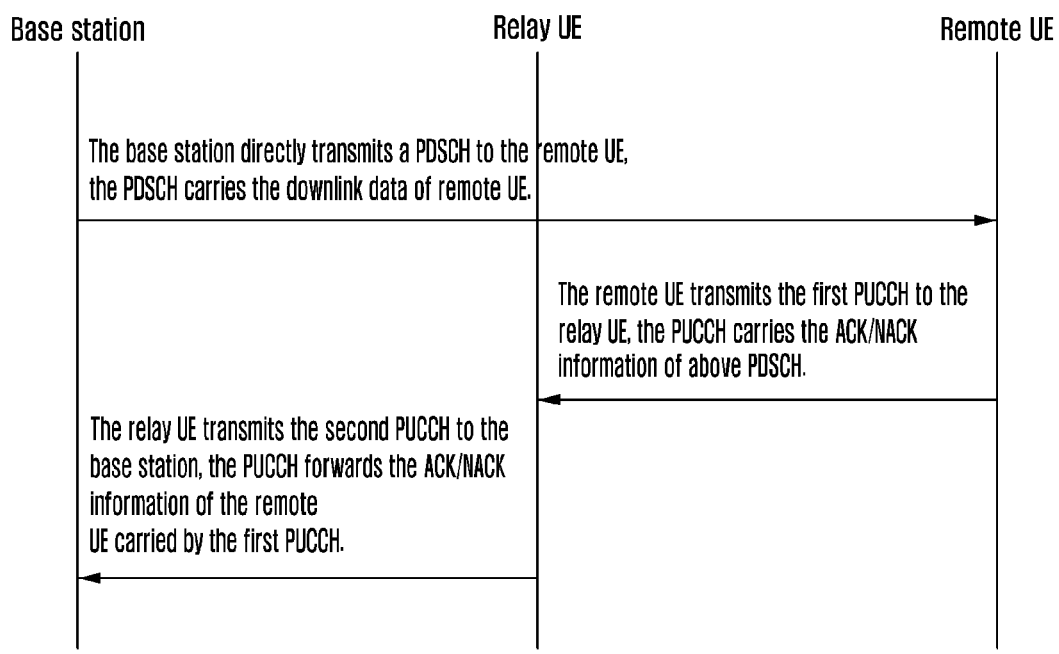
FIG. 23 is a schematic diagram of a communication process according to Embodiment 9 of the present invention.

Referring to FIG. 23, FIG. 23 shows a communication process among a base station, a relay UE, and a remote UE in this embodiment.

(1) The base station directly transmits a PDSCH to the remote UE, the PDSCH carries the downlink data of the remote UE.

(2) The remote UE transmits a first PUCCH to the relay UE, the PUCCH carries the ACK/NACK information of the PDSCH above.

(3) The relay UE transmits a second PUCCH to the base station, the PUCCH forwards the ACK/NACK information of the remote UE carried by the first PUCCH.

Embodiment 9 is similar to embodiment 7. The difference is that in embodiment 7, the relay UE forwards the PDSCH of the remote UE in addition to forwarding the PUCCH of the remote UE, and in embodiment 9, the relay UE only forwards the PUCCH of the remote UE, and does not forward the PDSCH of the remote UE.

* The Relay UE Monitors the DCIs of the Remote UE to Determine the Resources and TTI of the First PUCCH.

In embodiment 2, in order to forward the UCI of the remote UE, the relay UE needs to know the resource used by the first PUCCH and the TTI where it locates, and generally, the resource used by the PUCCH and the TTI where it locates are determined by the DCI scheduling the corresponding PDSCH. Thus, although relay UE does not need to forward the downlink control/data information between the base station and the remote UE, it still needs to obtain the scheduling information of the remote UE by the base station.

In an example, when the base station transmits a first DCI to a remote UE to schedule a PDSCH, the second DCI is transmitted to the relay UE to signal scheduling information of the downlink data of the remote UE by the base station, and the second DCI and the first DCI are not the same one, and the relay UE determines, according to the second DCI, the resource of the PUCCH, corresponding to the first DCI, transmitted by the remote UE, and the TTI where it locates, and then forwards the corresponding PUCCH to the base station after receiving the corresponding PUCCH at the corresponding resource and the TTI where it locates.

In an example, the second DCI and the first DCI have the same indication information, including various scheduling information of the PDSCH, such as a modulation coding scheme, a physical resource allocation, a redundancy version, a New Data Indicator (NDI) indication, and an HARQ process index number etc. In another example, the information contained in the second DCI is far less than the information contained in the first DCI, and only includes information explicitly indicating the resource of the corresponding PUCCH and the TTI where it locates, or information implicitly determining the resource of the corresponding PUCCH and the TTI where it locates.

In an example, both the second DCI and the first DCI are scrambled using the RNTI of the remote UE. In another example, the first DCI is scrambled using the RNTI of the remote UE, and the second DCI is scrambled using the RNTI of the relay UE. In an example, the second DCI scrambled by the RNTI of the relay UE indicates whether the DCI is used for data scheduling of the remote UE or the data scheduling of the relay UE by using a dedicated field, and may also be distinguished by other manners such as DCI format. In another example, the second DCI scrambled by the RNTI of the relay UE also includes the data scheduling information of the relay UE itself, that is, the data scheduling information of the relay UE itself and the data scheduling information of the remote UE are multiplexed in the within the same DCI.

In an example, the relay UE monitors the DCI for scheduling the downlink data, transmitted from the base station to the remote UE, but does not need to forward the DCI, and determines the resource of the corresponding PUCCH and the TTI where it locates, according to the DCI information, and after receiving the corresponding PUCCH at the corresponding resource and the TTI where it locates, the DCI is forwarded to the base station.

Figure 24:
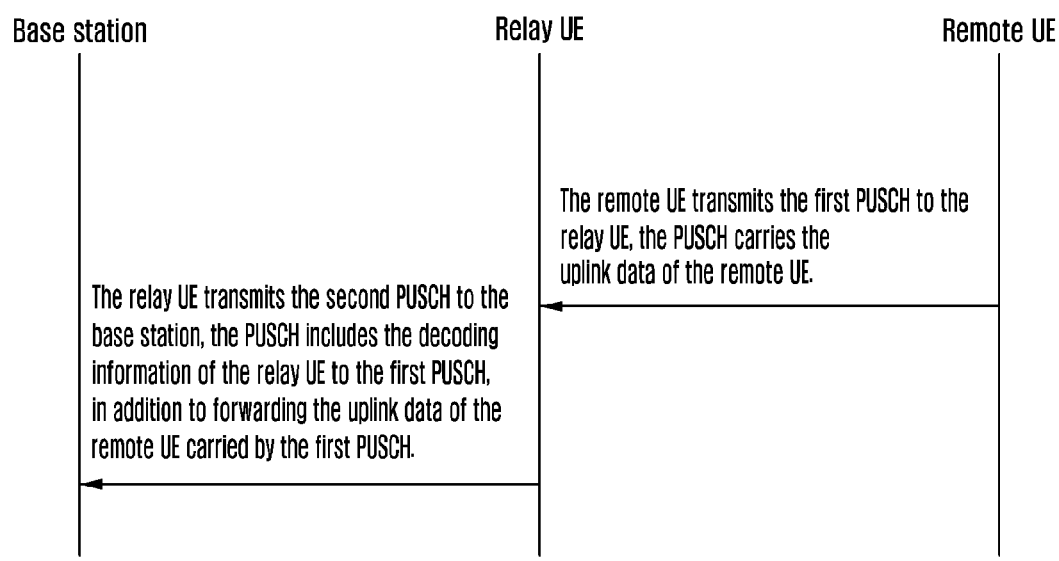
FIG. 24 is a schematic diagram of a communication process according to Embodiment 10 of the present invention.

Embodiment 10. The Decoding Information of the First PUSCH by the Relay UE is Piggybacked when the Relay UE Forwards the First PUSCH Referring to FIG. 24, FIG. 24 shows a communication process among a base station, a relay UE, and a remote UE in this embodiment.

(1) The remote UE transmits the first PUSCH to the relay UE, and the PUSCH carries the uplink data of the remote UE.

(2) the relay UE transmits a second PUSCH to the base station, and the PUSCH includes the decoding information of the relay UE to the first PUSCH in addition to forwarding the uplink data of the remote UE carried by the first PUSCH.

Embodiment 10 is an optimization of embodiments 4 to 6, that is, when the relay UE forwards the PUSCH of the remote UE, it also transmits the decoding information of the received PUSCH of the remote UE to the base station, so that the base station performs optimization processing when it performs retransmission scheduling.

* Only Feed Back RRC Information of the Relay UE to the First PUSCH

In an example, the relay UE will feed back an ACK to the base station only when the first PUSCH is correctly decoded, and no feedback is needed if the relay UE does not correctly decode the first PUSCH. If the base station successfully decodes the second PUSCH, the base station initiates a new data scheduling of the remote UE; if the base station fails to decode the second PUSCH, and the decoding result of the first PUSCH fed back by the relay UE is ACK, only the retransmission scheduling of the second PUSCH of the relay UE to the base station is initiated; if the base station fails to decode the second PUSCH and does not receive the feedback that the relay UE correctly decodes the first PUSCH, retransmission scheduling of the first PUSCH from the remote UE to the relay UE and retransmission scheduling of the second PUSCH from the relay UE to the base station are initiated.

In another example, the decoding result is fed back to the base station regardless of whether the relay UE successfully decodes the first PUSCH.

* The ACK Information of the First PUSCH by the Relay UE is Piggybacked by the Forwarded Second PUSCH In this embodiment, the decoding information of the first PUSCH by the relay UE is piggybacked by the second PUSCH, that is, the decoding information of the first PUSCH fed back by the relay UE and the uplink data information of the remote UE carried by the first PUSCH forwarded by the second PUSCH are transmitted in a same TTI, and occupies a part of the physical resources scheduled by the second PUSCH, wherein the decoding information of the first PUSCH fed back by the relay UE and the uplink data information of the remote UE carried by the first PUSCH forwarded by the second PUSCH are independently encoded.

In an example, rate matching is performed on the transmission of the second PUSCH is according to the remaining resources of the scheduled resources minus the resources occupied by the decoding result of the first PUSCH, that is, the rate-matched encoded data stream is just mapped to the remaining resources.

In another example, the transmission of the second PUSCH performs puncturing processing on the resources occupied by the decoding result of the first PUSCH, that is, the transmission of the second PUSCH is still rate matched according to the scheduled resource, but at the resources occupied by the decoding result of the first PUSCH, the corresponding data symbol of the second PUSCH is discarded, and the corresponding resources are used for transmission of the decoding result of the first PUSCH.

In an example, the decoding result of the first PUSCH is only fed back at the time of the ACK, and the decoding result of the first PUSCH fixedly occupies a part of the resources scheduled by the second PUSCH. When the result of the first PUSCH is ACK, these resources are used for transmission of ACK; when the result of the second PUSCH is NACK, these resources are vacant and cannot be used for transmission of the second PUSCH, and the transmission power on these resources may be used for the second PUSCH, that is, power boosting is made to the second PUSCH.

In another example, the decoding result of the first PUSCH is only fed back at the time of the ACK, and a part of the resources scheduled by the second PUSCH is used only at the time of the ACK. When the result of the first PUSCH is ACK, these resources are used for transmission of the ACK; when the result of the first PUSCH is NACK, the corresponding physical resources are returned to the second PUSCH for transmission of the second PUSCH.

* Retransmission of Only Scheduling the Second PUSCH (Different from Ordinary Retransmission Scheduling)

In this embodiment, when the base station does not receive the decoding result of the first PUSCH fed back by the relay UE which is NACK information, and the base station does not successfully decode the received second PUSCH forwarded by the relay UE, the base station only initiates retransmission scheduling of the second PUSCH between the relay UE and the base station.

In an example, the relay UE also forwards the downlink control/data information of the remote UE, in addition to forwarding the uplink control/data information of the remote UE, that is, the relay UE forwards the DCI of the remote UE in addition to forwarding the PUSCH of the remote UE, and the first transmission and the retransmission of the first/second PUSCH use the same DCI format, and both are scrambled by the RNTI of the remote UE, and the first PDSCH and the second PDSCH are scheduled with the same DCI, and after receiving the DCI, the relay UE needs to forward it to the remote UE, and the relay UE does not need to forward the DCI when the base station only schedules the retransmission of the second PUSCH between the relay UE and the base station; when the base station schedules the retransmission of the first PUSCH between the remote UE and the relay UE and the retransmission of the second PUSCH between the relay UE and the base station, the relay UE needs to forward the DCI. In order to distinguish the above two conditions, the DCI needs to include a field for indicating whether the relay UE needs to forward the DCI, this indication field may be a dedicated field, or may also reuse other fields that fail during retransmission scheduling.

In another example, the relay UE only forwards the uplink control/data information of the remote UE, and does not forward the downlink control/data information of the remote UE, that is, the relay UE only forwards the PUSCH of the remote UE, and does not forward the DCI of the remote UE, and the relay UE needs to monitor the DCI of the remote UE to obtain the data scheduling information of the remote UE. When the base station schedules the retransmission of the first PUSCH between the remote UE and the relay UE and the retransmission of the second PUSCH between the relay UE and the base station, delivery of scheduling information is similar to the initial transmission scheduling, i.e., the base station only transmits a DCI to the remote UE. When the base station only schedules retransmission of the second PUSCH between the relay UE and the base station, the base station only transmits a DCI to the relay UE, and the DCI needs to be distinguished from the DCI of the relay UE itself, for example, the DCI uses a different search space, a DCI format, a scrambled RNTI, or a dedicated indication field within the DCI.

* The ACK information of the relay UE to the first PUSCH is fed back by other means In an example, the ACK information of the first PUSCH by the relay UE is not carried in the second PUSCH forwarded by the relay UE, but is transmitted by other means, for example, through a dedicated PUCCH transmission, only when the PUCCH and the second PUSCH forwarded by the relay UE is transmitted just at the same time, the relay UE transmits part of physical resources forwarded by the relay UE occupied by the ACK information of the first PDSCH.

Embodiment 11. The Relay UE Forwards the Downlink Data and the DCI (the Base Station Schedules the Transmission of the Forwarding Link Only after Determining that the Relay UE Successfully Decodes the Forwarded Data)

Figure 25:
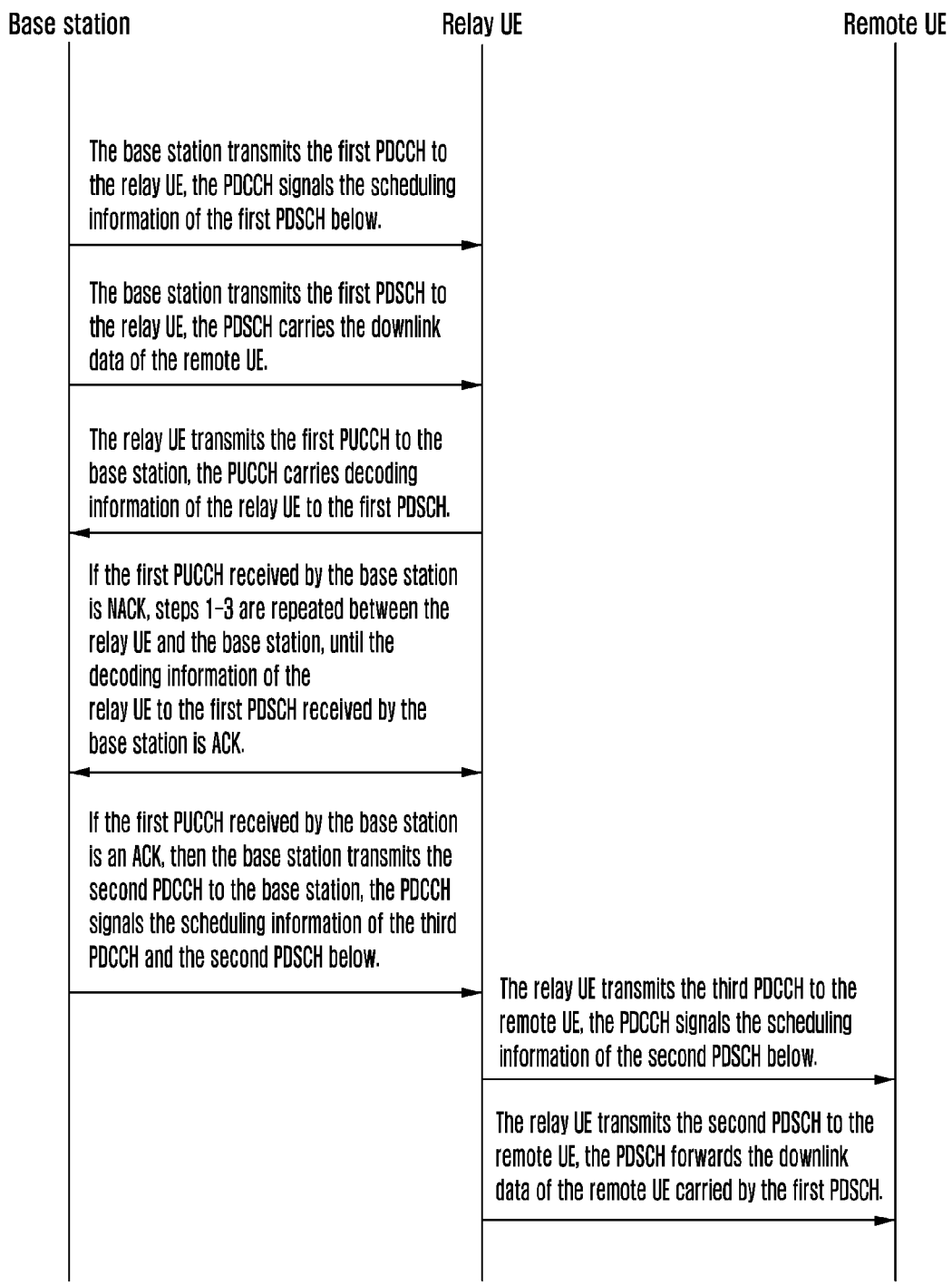
FIG. 25 is a schematic diagram of a communication process according to Embodiment 11 of the present invention.

Referring to FIG. 25, FIG. 25 shows a communication process among a base station, a relay UE, and a remote UE in this embodiment.

(1) The base station transmits a first PDCCH to the relay UE, the PDCCH signaling scheduling information of the first PDSCH below.

(2) The base station transmits a first PDSCH to the relay UE, the PDSCH carries downlink data of the remote UE.

(3) The relay UE transmits a first PUCCH to the base station, the PUCCH carries the decoding information of the relay UE to the first PDSCH.

(4) If the first PUCCH received by the base station is a NACK, the steps 1 to 3 are repeated between the relay UE and the base station until the decoding information of the relay UE, received by the base station, to the first PDSCH is ACK.

(5) If the first PUCCH received by the base station is an ACK, the base station transmits a second PDCCH to the relay UE, the PDCCH signals scheduling information of the following third PDCCH and the second PDSCH.

(6) The relay UE transmits a third PDCCH to the remote UE, the PDCCH signals scheduling information of the second PDSCH below.

(7) The relay UE transmits the second PDSCH to the remote UE, and the PDSCH forwards the downlink data of the remote UE carried by the first PDSCH.

Embodiment 11 is similar to embodiment 1, that is, the relay UE also forwards the PDCCH of the remote UE in addition to forwarding the PDSCH of the remote UE. The difference between embodiment 11 and embodiment 1 is that, herein, the base station must confirm that after the relay UE successfully decodes the forwarded data, the transmission of the forwarding link is scheduled, that is, the second PDSCH is scheduled.

In this embodiment, the relay UE needs to feed back the decoding information of the PDSCH of the remote UE to the base station. In an example, the first PUCCH uses the information of PUCCH configuration for the remote UE; in another example, the first PUCCH uses the relay UE's own information of PUCCH configuration. The information of PUCCH configuration herein includes: a transmission format of the PUCCH, a repetition number of the PUCCH, an PUCCH resource configuration, and other necessary parameters of the PUCCH. In an example, the first PUCCH is scrambled using the RNTI of the remote UE, and in another example, the second PUCCH is scrambled using the RNTI of the relay UE.

In this embodiment, the relationship between the second PDCCH and the third PDCCH is similar to the relationship between the first PDCCH and the second PDCCH in embodiment 1. The relationship between the second PDSCH and the first PDSCH is similar to the relationship between the second PDSCH and the first PDSCH in embodiment 1.

Embodiment 12. The Relay UE Forwards the Downlink Data and does not Forward the DCI (the Base Station Schedules the Transmission of the Forwarding Link Only after Determining that the Relay UE Successfully Decodes the Forwarded Data)

Figure 26:
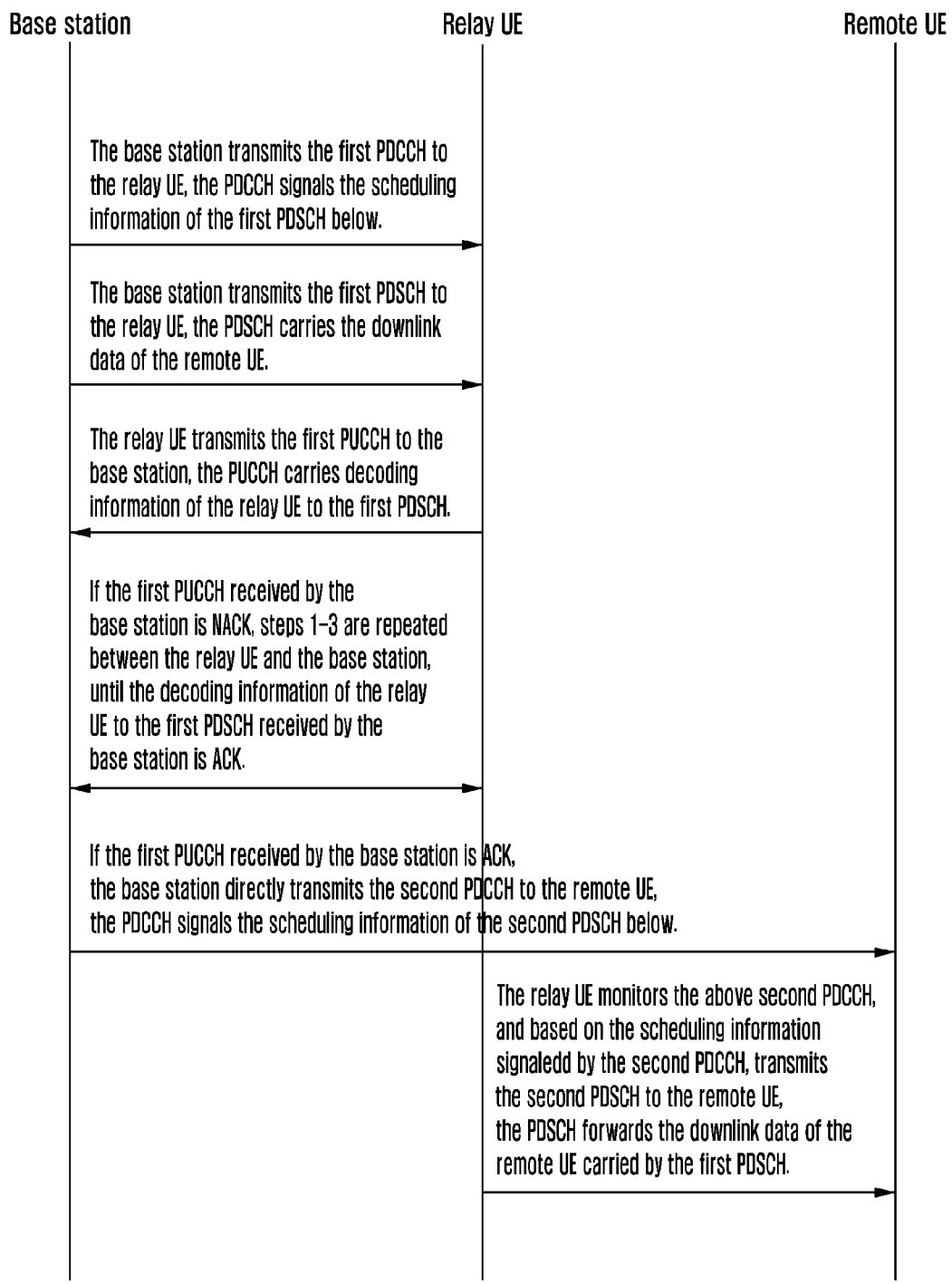
FIG. 26 is a schematic diagram of a communication process according to Embodiment 12 of the present invention.

Referring to FIG. 26, FIG. 26 shows a communication process among a base station, a relay UE, and a remote UE in this embodiment.

(1) The base station transmits a first PDCCH to the relay UE, the PDCCH signaling scheduling information of the first PDSCH below.

(2) The base station transmits a first PDSCH to the relay UE, the PDSCH carries downlink data of the remote UE.

(3) The relay UE transmits a first PUCCH to the base station, the PUCCH carries the decoding information of the relay UE to the first PDSCH.

(4) If the first PUCCH received by the base station is a NACK, the steps 1 to 3 are repeated between the relay UE and the base station until the decoding information of the relay UE, received by the base station, for the first PDSCH is ACK.

(5) If the first PUCCH received by the base station is an ACK, the base station directly transmits a second PDCCH to the remote UE, the PDCCH signals scheduling information of the second PDSCH below.

(6) The relay UE monitors the above second PDCCH, and transmits a second PDSCH to the remote UE based on the scheduling information signaled by the second PDCCH, the PDSCH forwards the downlink data of the remote UE carried by the first PDSCH.

Embodiment 12 is similar to embodiment 11. The difference is that, in embodiment 11, the relay UE forwards the PDCCH in addition to forwarding the PDSCH, while in embodiment 12, the relay UE only forwards the PDSCH, and does not forward the PDCCH.

The descriptions in Embodiment 11 and Embodiment 2 may be similarly applied to Embodiment 12.

Embodiment 13. The Relay UE Forwards the Uplink Data and the DCI (the Base Station Schedules the Transmission of the Forwarding Link Only after Determining that the Relay UE Successfully Decodes the Forwarded Data)

Figure 27:
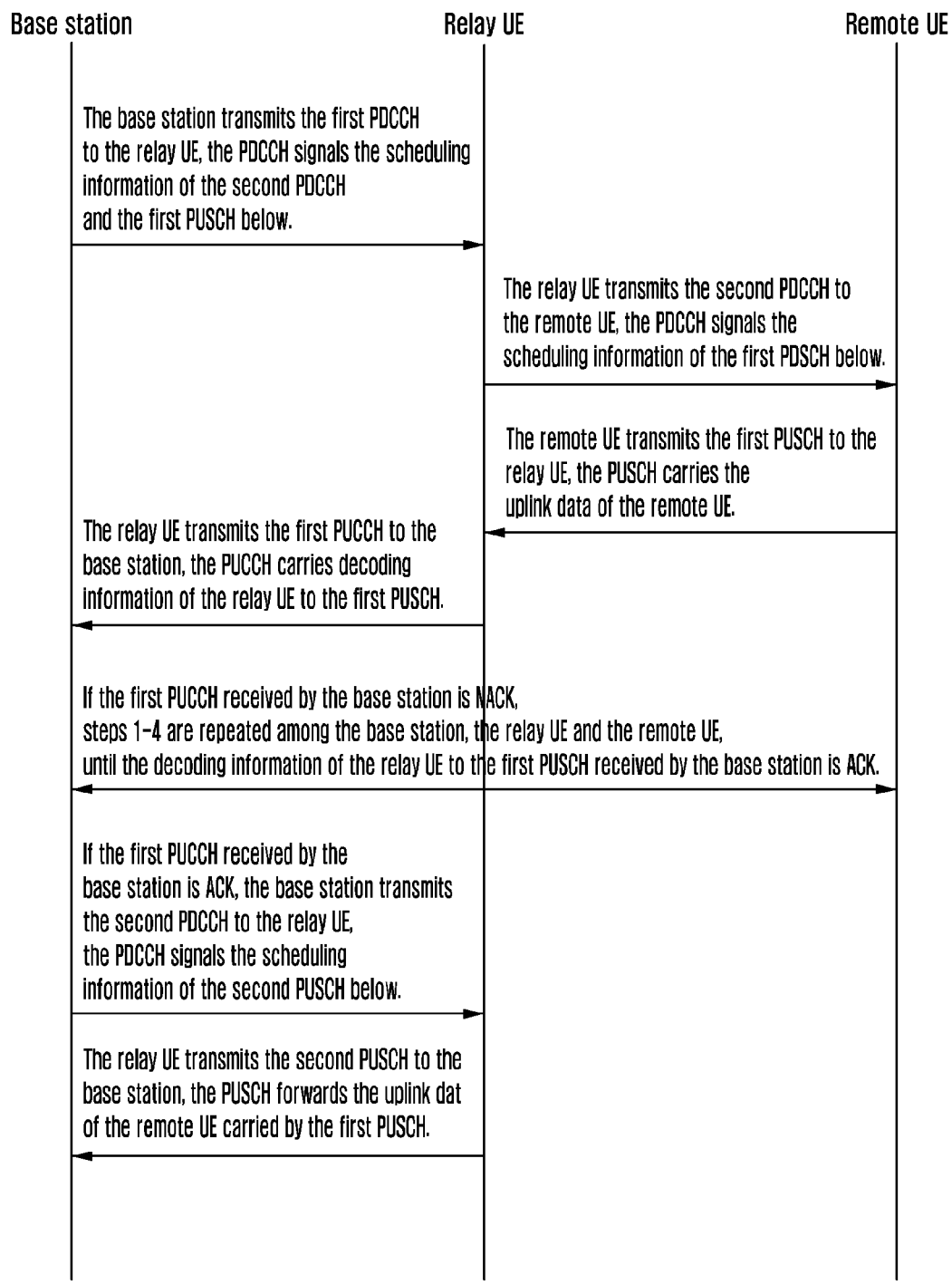
FIG. 27 is a schematic diagram of a communication process according to Embodiment 13 of the present invention.

Referring to FIG. 27, FIG. 27 shows a communication process among a base station, a relay UE, and a remote UE in this embodiment.

(1) The base station transmits a first PDCCH to the relay UE, the PDCCH signals scheduling information of the following second PDCCH and the first PUSCH.

(2) The relay UE transmits a second PDCCH to the remote UE, the PDCCH signals scheduling information of the first PUSCH below.

(3) The remote UE transmits the first PUSCH to the relay UE, the PUSCH carries the uplink data of the remote UE.

(4) The relay UE transmits a first PUCCH to the base station, the PUCCH carries the decoding information of the relay UE to the first PUSCH.

(5) If the first PUCCH received by the base station is a NACK, the steps 1 to 4 are repeated among the base station, the relay UE, and the remote UE, until the decoding information of the relay UE received by the base station to the first PUSCH is ACK.

(6) If the first PUCCH received by the base station is an ACK, the base station transmits a second PDCCH to the relay UE, the PDCCH signals scheduling information of the following second PUSCH.

(7) The relay UE transmits a second PUSCH to the base station, and the PUSCH forwards the uplink data of the remote UE carried by the first PDSCH.

Embodiment 13 is similar to embodiment 11, that is, the relay UE needs to feed back the decoding information for the data channel of the remote UE to the base station, and the forwarding link of the relay UE is scheduled only after the base station confirms that the relay UE successfully decodes the data channel of the remote UE. Embodiment 13 is different from embodiment 11 in that embodiment 11 is directed to forwarding of a PDCCH; and embodiment 13 is directed to forwarding of an PUSCH.

Embodiment 14. The Relay UE Forwards the Uplink Data and does not Forward the DCI (the Base Station Schedules the Transmission of the Forwarding Link Only after Determining that the Relay UE Successfully Decodes the Forwarded Data)

Figure 28:
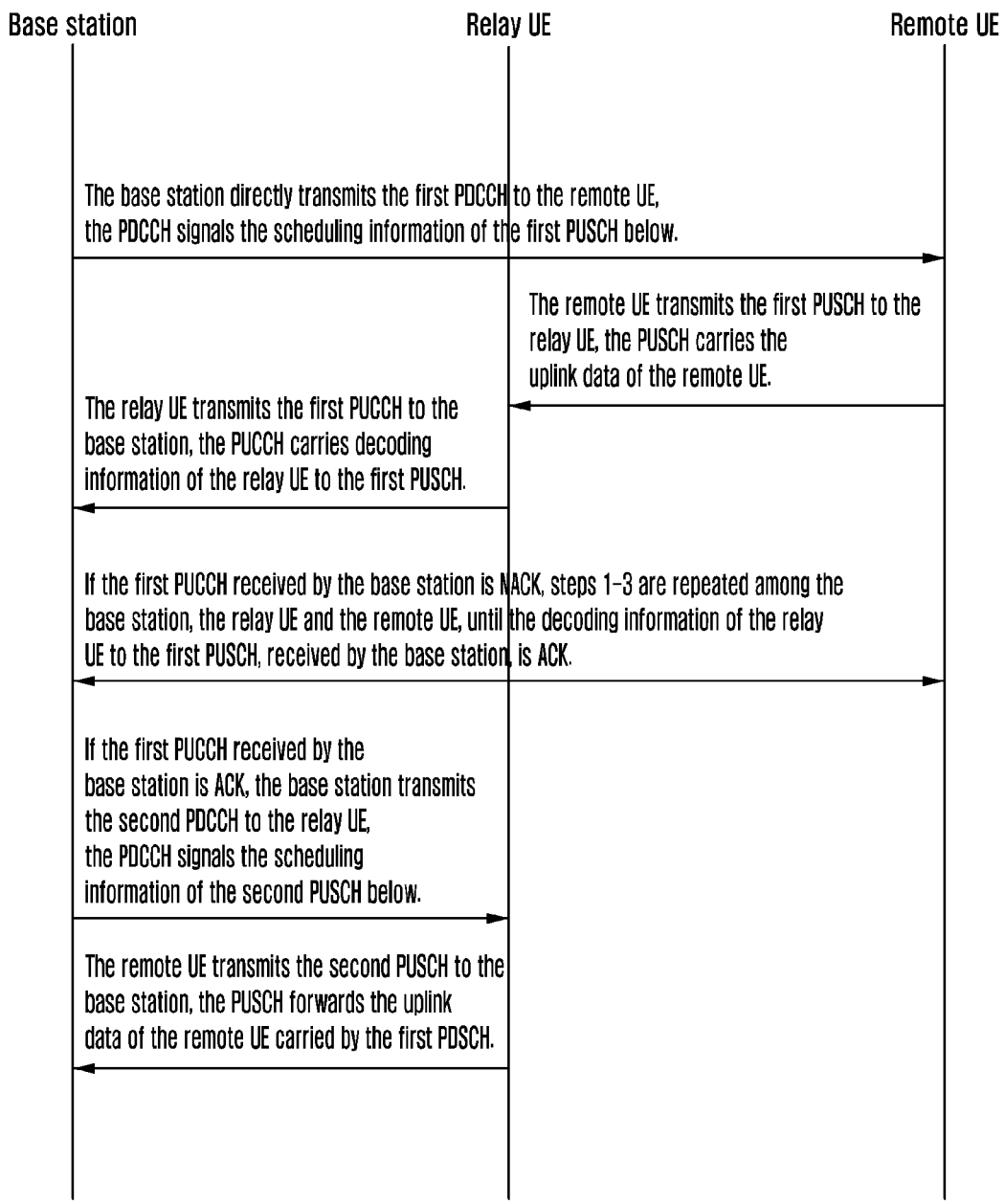
FIG. 28 is a schematic diagram of a communication process according to Embodiment 14 of the present invention.

Referring to FIG. 28, FIG. 28 shows a communication process among a base station, a relay UE, and a remote UE in this embodiment.

(1) The base station directly transmits a first PDCCH to the remote UE, the PDCCH signals scheduling information of the first PUSCH below.

(2) The remote UE transmits the first PUSCH to the relay UE, the PUSCH carries the uplink data of the remote UE.

(3) The relay UE transmits a first PUCCH to the base station, the PUCCH carries the decoding information of the relay UE to the first PUSCH.

(4) If the first PUCCH received by the base station is a NACK, the steps 1 to 3 are repeated among the base station, the relay UE, and the remote UE, until the decoding information of the relay UE received by the base station, for the first PUSCH is ACK.

(5) If the first PUCCH received by the base station is an ACK, the base station transmits a second PDCCH to the relay UE, the PDCCH signals scheduling information of the following second PUSCH.

(6) The relay UE transmits a second PUSCH to the base station, the PUSCH forwards the uplink data of the remote UE carried by the first PUSCH.

Embodiment 14 is similar to embodiment 13, that is, the relay UE needs to feed back the decoding result for the first PDSCH to the base station, and the base station schedules the transmission of the second PDSCH only after confirming that the relay UE successfully decodes the first PDSCH. The description of embodiment 13 can be similarly applied to embodiment 14.

Embodiment 14 differs from embodiment 13 in that, in embodiment 13, the relay UE also forwards the PDCCH in addition to forwarding the PDSCH; in embodiment 14, the relay UE only forwards the PDSCH, and does not forward the PDCCH.

Embodiment Fifteen. The Relay UE Forwards the Downlink Data, the DCI, and the UCI (the Base Station Schedules the Transmission of the Forwarding Link Only after Determining that the Relay UE Successfully Decodes the Forwarded Data, and the Retransmission Resource of the Forwarding Link is Different from the Initial Transmission Resource)

Figure 29:
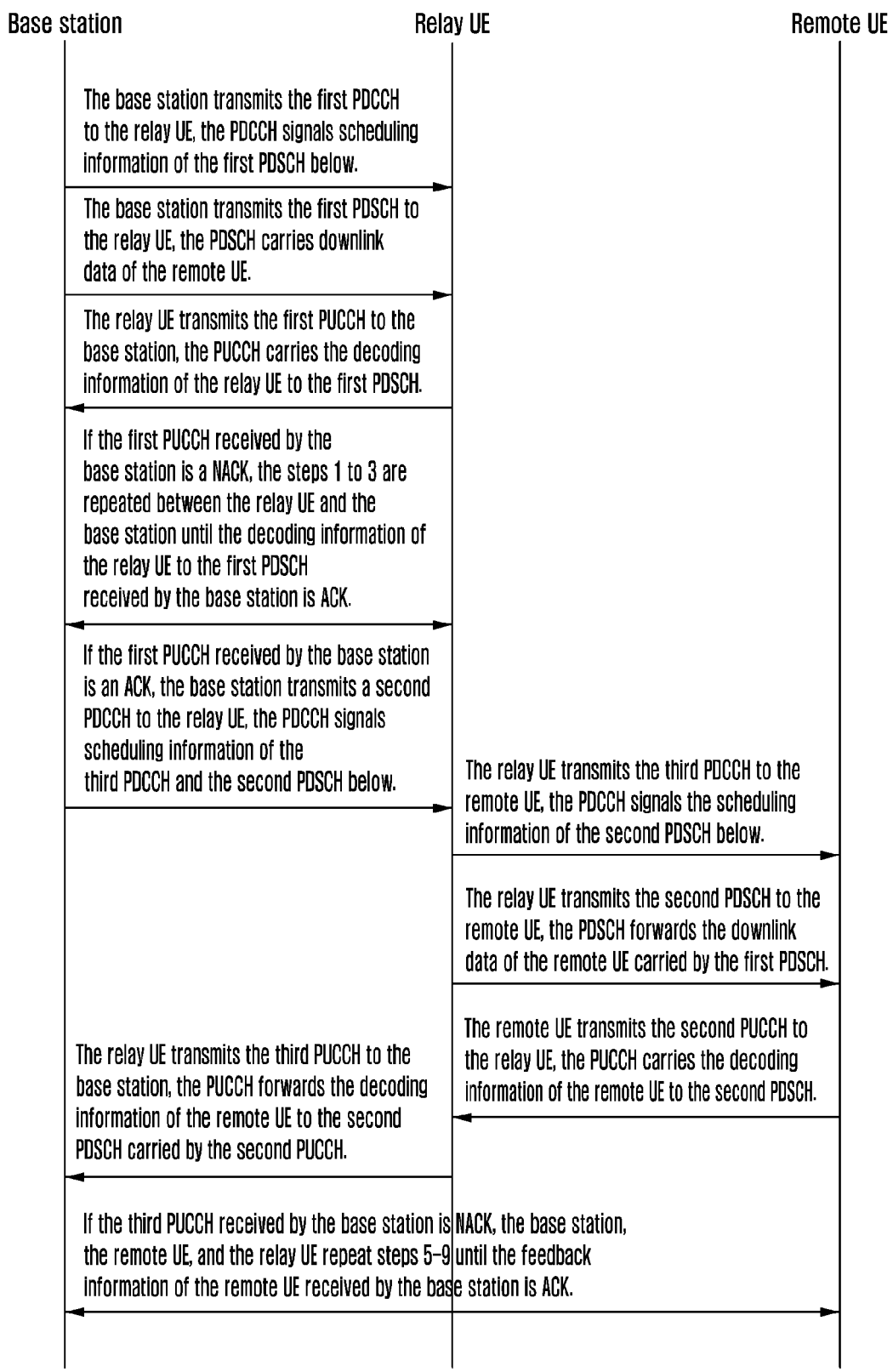
FIG. 29 is a schematic diagram of a communication process according to Embodiment 15 of the present invention.

Referring to FIG. 29, FIG. 29 shows a communication process among a base station, a relay UE, and a remote UE in this embodiment.

(1) The base station transmits a first PDCCH to the relay UE, the PDCCH signaling scheduling information of the first PDSCH below.

(2) The base station transmits a first PDSCH to the relay UE, the PDSCH carries downlink data of the remote UE.

(3) The relay UE transmits a first PUCCH to the base station, the PUCCH carries the decoding information of the relay UE to the first PDSCH.

(4) If the first PUCCH received by the base station is a NACK, the steps 1 to 3 are repeated between the relay UE and the base station until the decoding information of the relay UE received by the base station for the first PDSCH is ACK.

(5) If the first PUCCH received by the base station is an ACK, the base station transmits a second PDCCH to the relay UE, the PDCCH signals scheduling information of the following third PDCCH and the second PDSCH.

(6) The relay UE transmits a third PDCCH to the remote UE, the PDCCH signals scheduling information of the second PDSCH below.

(7) The relay UE transmits the second PDSCH to the remote UE, the PDSCH forwards the downlink data of the remote UE carried by the first PDSCH.

(8) The remote UE transmits a second PUCCH to the relay UE, the PUCCH carries the decoding information of the remote UE to the second PDSCH.

(9) The relay UE transmits a third PUCCH to the base station, the PUCCH forwards the decoding information of the remote UE to the second PDSCH carried by the second PUCCH.

(10) If the third PUCCH received by the base station is a NACK, the base station, the remote UE, and the relay UE repeat steps 5-9 until the base station receives the information fed back by the remote UE which is an ACK.

In this embodiment, the base station schedules the transmission of the forwarding link between the relay UE and the remote UE only after determining that the relay UE successfully decodes the forwarded data, and the scheduling information used by retransmission and initial transmission of the forwarding link between the relay UE and the remote UE is separately scheduled by the base station, that is, the retransmission of the forwarding link is dynamically scheduled.

Here, between the retransmission of the forwarding link and the initial transmission of the forwarding link, forwarding of the PDCCH carrying the scheduling information needs to be performed, and also the forwarding of the PUCCH carrying the HARQ-ACK information needs to be performed, and thus, the overall delay is high, and many system resources are consumed.

Embodiment 16. The Relay UE Forwards the Downlink Data, the DCI, and the UCI (the Base Station Schedules the Transmission of the Forwarding Link Only after Determining that the Relay UE Successfully Decodes the Forwarded Data, and the Retransmission Resources of the Forwarding Link are the Same as the Initial Transmission Resources Thereof)

Figure 30:
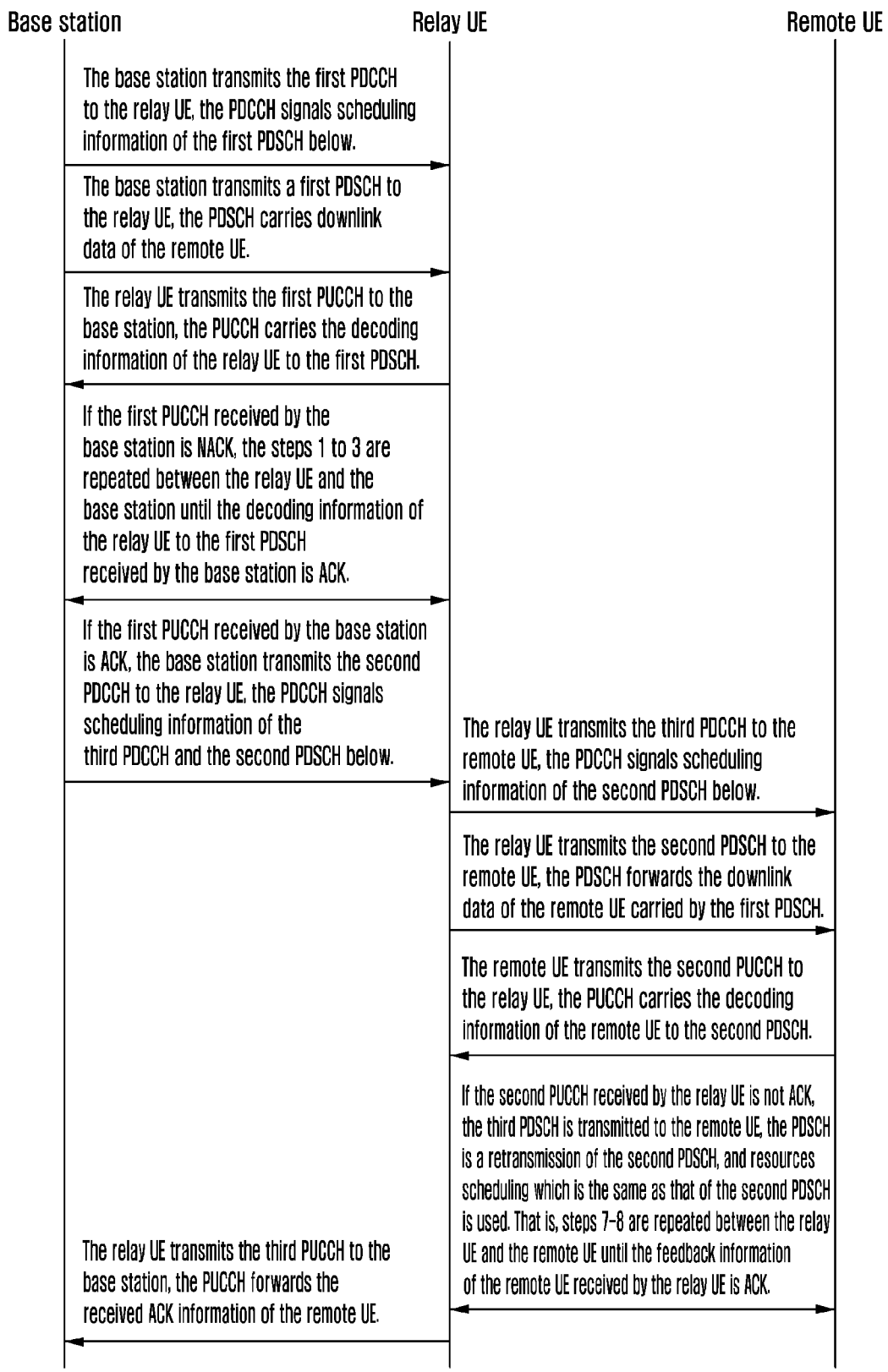
FIG. 30 is a schematic diagram of a communication process according to Embodiment 16 of the present invention.

Referring to FIG. 30, FIG. 30 shows a communication process among a base station, a relay UE, and a remote UE in this embodiment.

(1) The base station transmits a first PDCCH to the relay UE, the PDCCH signaling scheduling information of the first PDSCH below.

(2) The base station transmits a first PDSCH to the relay UE, the PDSCH carries downlink data of the remote UE.

(3) The relay UE transmits a first PUCCH to the base station, where the PUCCH carries the decoding information of the relay UE to the first PDSCH.

(4) If the first PUCCH received by the base station is a NACK, the steps 1 to 3 are repeated between the relay UE and the base station until the relay UE successfully decodes the PDSCH of the remote UE.

(5) If the first PUCCH received by the base station is an ACK, the base station transmits a second PDCCH to the relay UE, the PDCCH signals scheduling information of the following third PDCCH and the second PDSCH.

(6) The relay UE transmits a third PDCCH to the remote UE, the PDCCH signals scheduling information of the second PDSCH below.

(7) The relay UE transmits a second PDSCH to the remote UE, the PDSCH forwards the data carried by the first PDSCH.

(8) The remote UE transmits a second PUCCH to the relay UE, the PUCCH carries the decoding information of the remote UE to the second PDSCH.

(9) If the second PUCCH received by the relay UE is not an ACK, the third PDSCH is transmitted to the remote UE, the PDSCH is a retransmission of the second PDSCH, and scheduling information which is the same as that of the second PDSCH is used. That is, steps 7-8 are repeated between the relay UE and the remote UE until the relay UE receives the feedback of the remote UE which is an ACK.

(10) The relay UE transmits a third PUCCH to the base station, the PUCCH forwards the received ACK information of the remote UE.

Embodiment 16 is an optimization of embodiment 15, that is, the retransmission and the initial transmission of the forwarding link between the relay UE and the remote UE use the same scheduling information, and the base station does not need to re-schedule through signaling, as compared to embodiment 15, between the retransmission of the second PDSCH and the initial transmission of the second PDSCH, forwarding of the PDCCH carrying the scheduling information does not need to be performed, and also the forwarding of the PUCCH carrying the HARQ-ACK information does not need to be performed, and thus the overall delay is lower, and the system resources consumed are also less.

In an example, regardless of whether the remote UE successfully decodes the second PDSCH, the decoding result of the remote UE to the second PDSCH is fed back to the relay UE, as shown in FIG. 30 corresponding to this embodiment. In another example, the remote UE feeds back the ACK information of the remote UE to the second PDSCH, to the relay UE, only after the second PDSCH is successfully decoded, that is, the second PUCCH in FIG. 30 is transmitted only after the remote UE successfully decodes the second PDSCH, and before receiving the ACK information by the relay UE, step 7 is repeated, that is, continuously transmitting the retransmission of the second PDSCH.

In an example, the second PUCCH is transmitted just at the time of ACK, that is, only when the remote UE successfully decodes the second PDSCH. If the remote UE fails to decode the second PDSCH, it is unnecessary to feed back the NACK, and the retransmission of the second PDSCH is received on the next predefined time and predefined resource, and HARQ combine is performed on the retransmission of the second PDSCH, which is repeated until the decoding of the second PDSCH by the remote UE is successful.

In this embodiment, there is a limitation to the maximum number of retransmissions of the forwarding link. In an example, the maximum number of retransmissions of the forwarding link is RRC signaling pre-configuration. In another example, the maximum number of retransmissions of the forwarding link is indicated by the DCI, such as by the third PDCCH. After the retransmission of the second PDSCH exceeds the maximum number of retransmissions, regardless of whether the remote UE successfully decodes the second PDSCH and its retransmission combine, the scheduling resources reserved for retransmission of the forwarding link should be released, so as to be used for scheduling of other UEs.

In this embodiment, the third PUCCH can only be an ACK. After receiving the ACK, the base station may release the scheduling resource allocated to the retransmission link and use it for scheduling of other UEs. Before receiving the ACK, the base station should reserve the scheduling resource of the retransmission of the forwarding link which cannot be used for scheduling of other UEs.

In an example, both scheduling of initial transmission and that of retransmission, of the forwarding link, are semi-statically configured, that is, pre-configured by RRC signaling, and the third PDCCH in this embodiment is not used to signal scheduling information of the second PDSCH, just used to activate semi-static scheduling. In another example, the initial transmission of the forwarding link is signaled by the third PDCCH, but the retransmission of the forwarding link uses a semi-statically configured scheduling, and the two pieces of the scheduling information may be different.

Embodiment 17. The Relay UE Forwards the Downlink Data and the UCI, and does not Forward the DCI (the Base Station Schedules the Transmission of the Forwarding Link Only after Determining that the Relay UE Successfully Decodes the Forwarded Data, and the Retransmission Resource of the Forwarding Link and the Initial Transmission Resource of that are Different)

Figure 31:
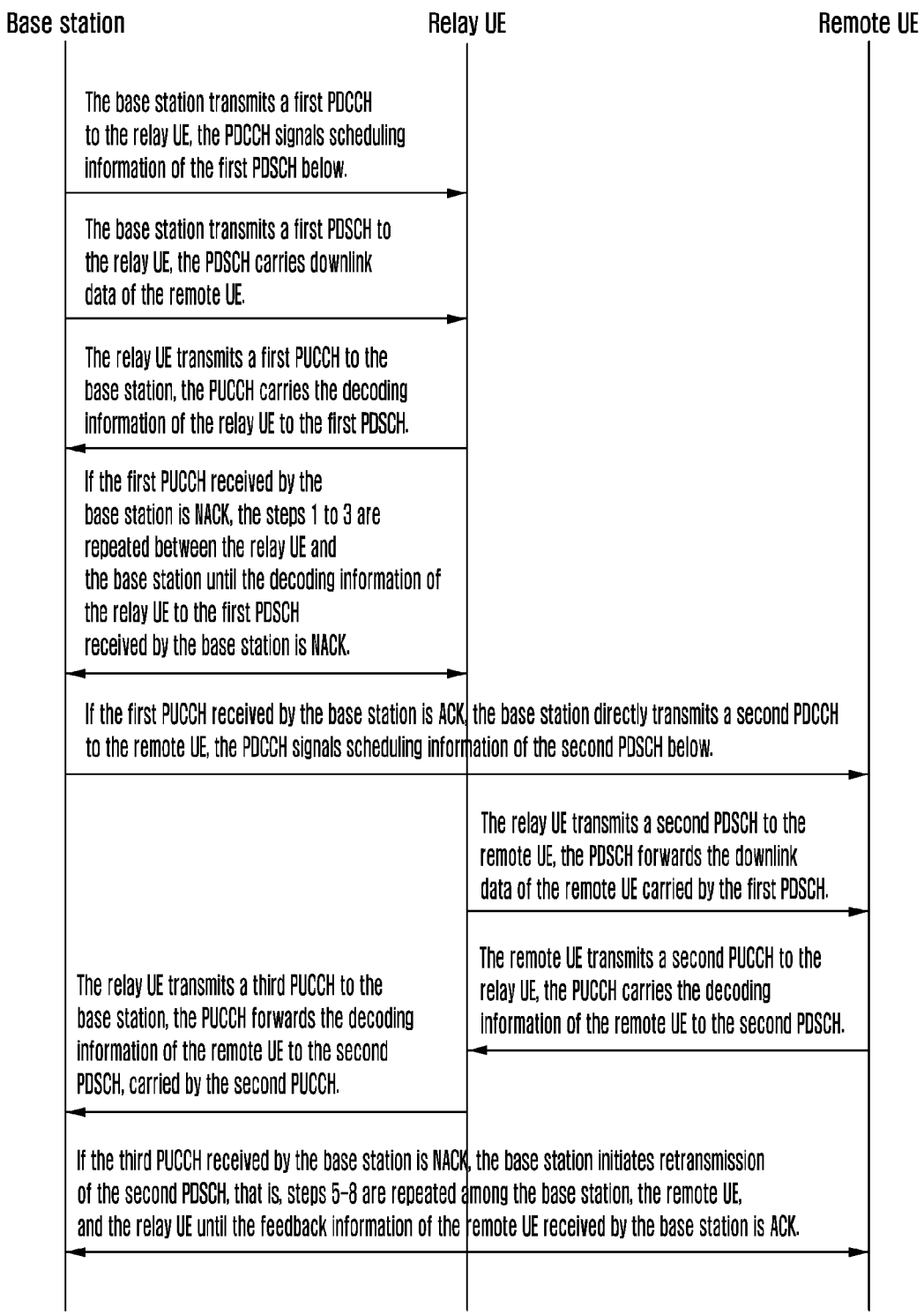
FIG. 31 is a schematic diagram of a communication process according to Embodiment 17 of the present invention.

Referring to FIG. 31, FIG. 31 shows a communication process among a base station, a relay UE, and a remote UE in this embodiment.

(1) The base station transmits a first PDCCH to the relay UE, the PDCCH signaling scheduling information of the first PDSCH below.

(2) The base station transmits a first PDSCH to the relay UE, the PDSCH carries downlink data of the remote UE.

(3) The relay UE transmits a first PUCCH to the base station, the PUCCH carries the decoding information of the relay UE to the first PDSCH.

(4) If the first PUCCH received by the base station is a NACK, the steps 1 to 3 are repeated between the relay UE and the base station until the relay UE successfully decodes the PDSCH of the remote UE.

(5) If the first PUCCH received by the base station is an ACK, the base station directly transmits a second PDCCH to the remote UE, the PDCCH signals scheduling information of the second PDSCH below.

(6) The relay UE monitors the above second PDCCH, and transmits a second PDSCH to the remote UE based on the scheduling information signaled by the second PDCCH, the PDSCH forwards the downlink data of the remote UE carried by the first PDSCH.

(7) The remote UE transmits a second PUCCH to the relay UE, the PUCCH carries the decoding information of the remote UE to the second PDSCH.

(8) The relay UE transmits a third PUCCH to the base station, the PUCCH forwards the decoding information of the remote UE carried by the second PUCCH to the second PDSCH.

(9) If the third PUCCH received by the base station is a NACK, the base station initiates retransmission of the second PDSCH, that is, steps 5-8 are repeated among the base station, the remote UE until the feedback information of the remote UE received by the base station is ACK.

Embodiment 17 is similar to embodiment 15, that is, the initial transmission and the retransmission of the link between the relay UE and the remote UE are both dynamic scheduling, and different scheduling information is used for retransmission and initial transmission, separately, and the description of embodiment 15 can be similarly applied to the embodiment 17.

Embodiment 17 differs from embodiment 15 in that, in embodiment 15, the relay UE also forwards the PDCCH in addition to forwarding the PDSCH; in embodiment 17, the relay UE only forwards the PDSCH, and does not forward the PDCCH.

Embodiment 18. The Relay UE Forwards the Downlink Data and the UCI, and does not Forward the DCI (the Base Station Schedules the Transmission of the Forwarding Link Only after Determining that the Relay UE Successfully Decodes the Forwarded Data, and the Retransmission Resource of the Forwarding Link is the Same as the Initial Transmission Resources Thereof)

Figure 32:
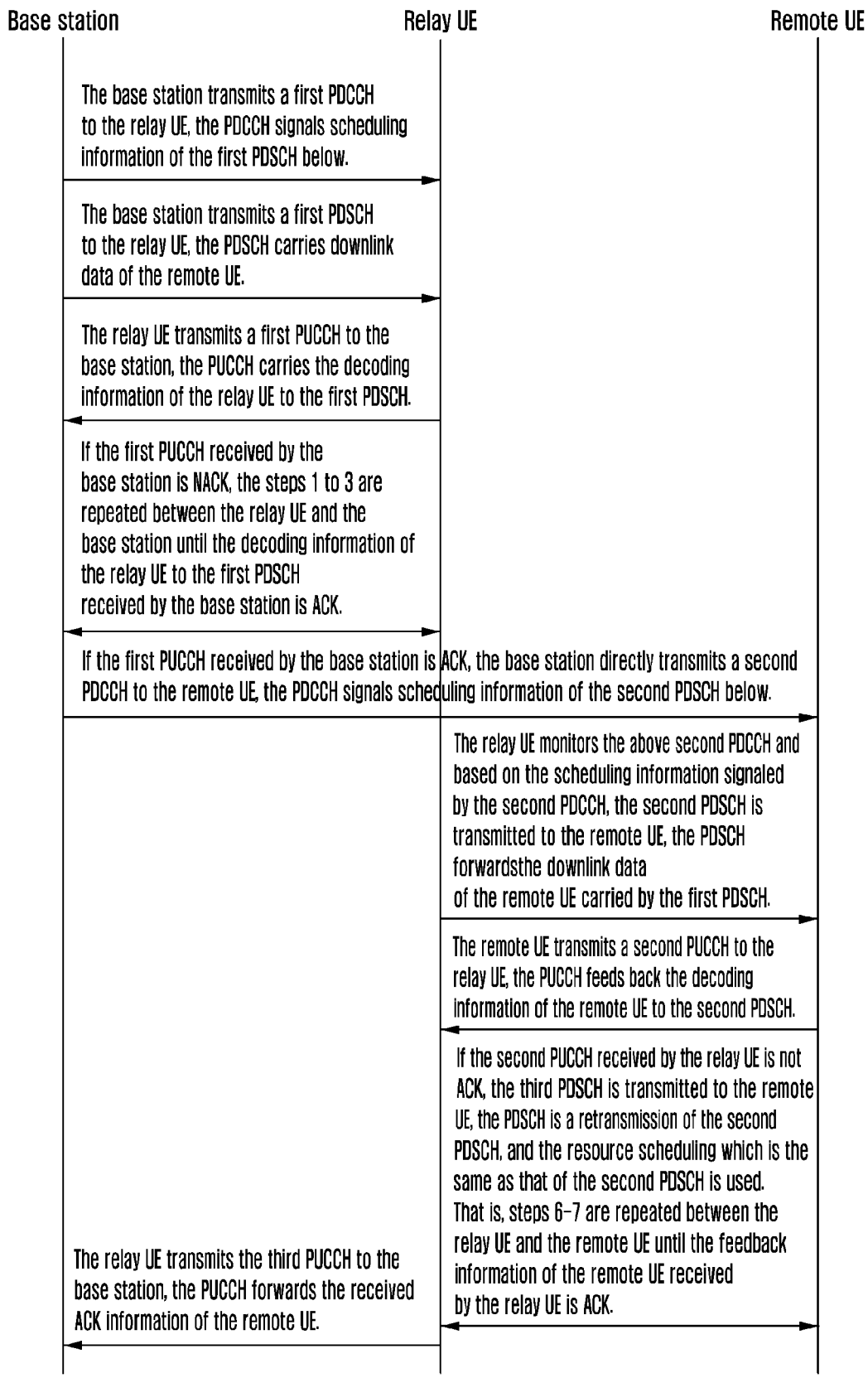
FIG. 32 is a schematic diagram of a communication process according to Embodiment 18 of the present invention.

Referring to FIG. 32, FIG. 32 shows a communication process among a base station, a relay UE, and a remote UE in this embodiment.

(1) The base station transmits a first PDCCH to the relay UE, the PDCCH signaling scheduling information of the first PDSCH below.

(2) The base station transmits a first PDSCH to the relay UE, the PDSCH carries downlink data of the remote UE.

(3) The relay UE transmits a first PUCCH to the base station, the PUCCH carries the decoding information of the relay UE to the first PDSCH.

(4) If the first PUCCH received by the base station is a NACK, the steps 1 to 3 are repeated between the relay UE until the decoding information of the relay UE received by the base station, for the first PDSCH is ACK.

(5) If the first PUCCH received by the base station is an ACK, the base station directly transmits a second PDCCH to the remote UE, the PDCCH signals scheduling information of the second PDSCH below.

(6) The relay UE monitors the above second PDCCH, transmits the second PDSCH to the remote UE based on the scheduling information signaled by the second PDCCH, the PDSCH forwards the downlink data of the remote UE carried by the first PDSCH.

(7) The remote UE transmits a second PUCCH to the relay UE, the PUCCH carries the decoding information of the remote UE to the second PDSCH.

(8) If the second PUCCH received by the relay UE is not an ACK, the third PDSCH is transmitted to the remote UE, the PDSCH is a retransmission of the second PDSCH, and the scheduling information which is the same as that of the second PDSCH is used. That is, steps 6-7 are repeated between the relay UE and the remote UE until the relay UE receives the ACK information of the remote UE to the second PDSCH or its retransmission.

(9) After receiving the ACK information fed back by the remote UE by the relay UE, the relay UE transmits a third PUCCH to the base station, the PUCCH forwards the received ACK information of the remote UE.

Embodiment 18 is similar to embodiment 16, that is, the retransmission and initial transmission of the link between the relay UE and the remote UE use the same scheduling information to save signaling overhead, and the description of Embodiment 16 can be similarly applied to the embodiment 18.

Embodiment 18 differs from embodiment 16 in that, in embodiment 16, the relay UE also forwards the PDCCH in addition to forwarding the PDSCH; in embodiment 18, the relay UE only forwards the PDSCH, and does not forward the PDCCH.

In an example, regardless of whether the remote UE successfully decodes the second PDSCH, the decoding result of the remote UE to the second PDSCH is fed back to the relay UE, as shown in FIG. 32 corresponding to this embodiment. In another example, the remote UE feeds back the ACK information of the remote UE to the second PDSCH to the relay UE only after the second PDSCH is successfully decoded, that is, the second PUCCH in FIG. 32 is transmitted only after the remote UE successfully decodes the second PDSCH, and the relay UE repeats the step 6 until the ACK information is received, that is, the retransmission of the second PDSCH is continuously transmitted.

Embodiment 19. The Relay UE Forwards the Uplink Data, the DCI, and the UCI (the Retransmission Resource Between the Relay UE and the Remote UE is the Same as the Initial Transmission Resources Thereof)

Figure 33:
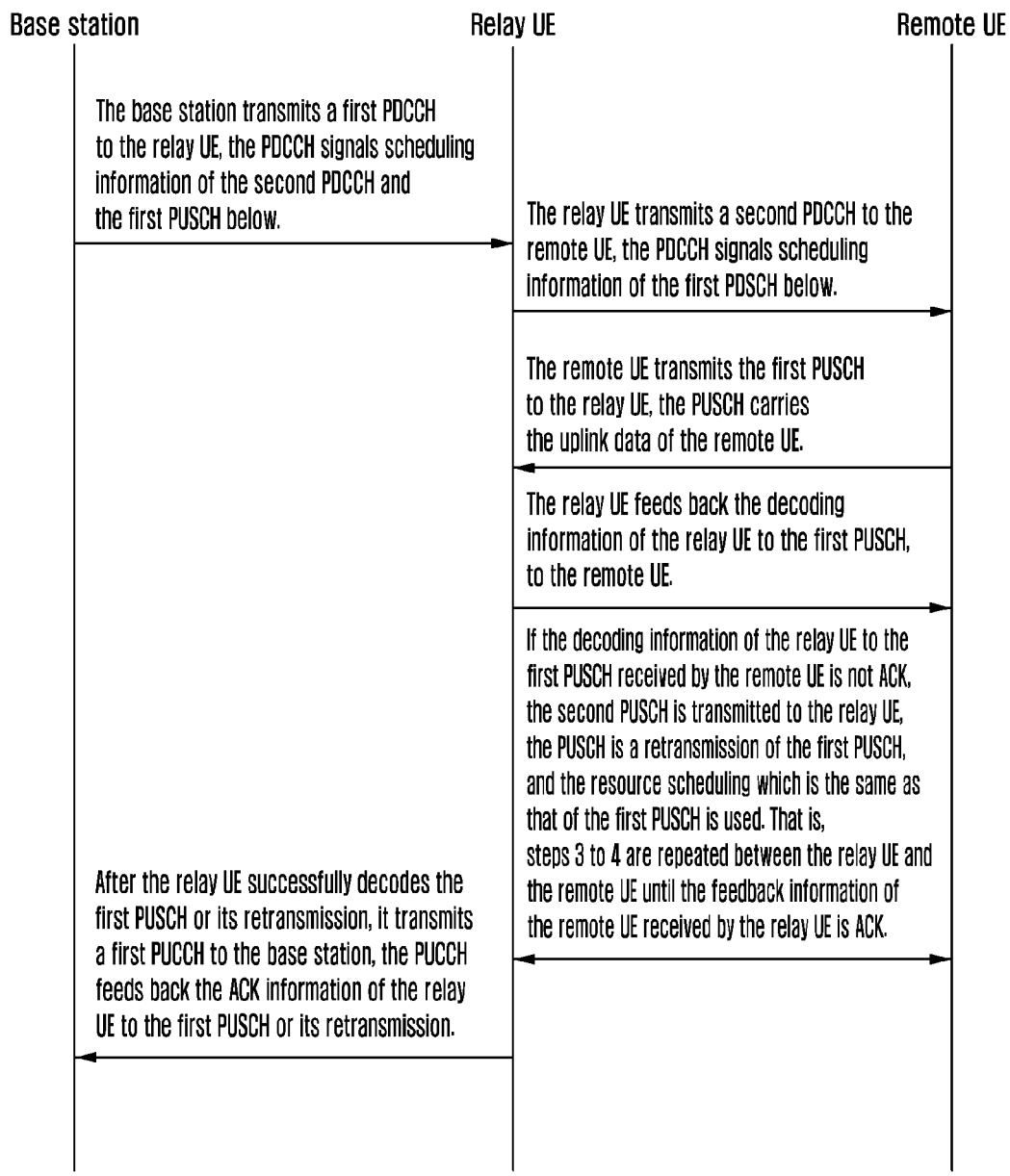
FIG. 33 is a schematic diagram of a communication process according to Embodiment 19 of the present invention.

Referring to FIG. 33, FIG. 33 shows a communication process among a base station, a relay UE, and a remote UE in this embodiment.

(1) The base station transmits a first PDCCH to the relay UE, the PDCCH signals scheduling information of the following second PDCCH and the first PUSCH.

(2) The relay UE transmits a second PDCCH to the remote UE, the PDCCH signals scheduling information of the first PUSCH below.

(3) The remote UE transmits the first PUSCH to the relay UE, the PUSCH carries the uplink data of the remote UE.

(4) The relay UE feeds back the decoding information of the relay UE to the first PUSCH, to the remote UE.

(5) If the decoding information of the relay UE to the first PUSCH received by the remote UE is not ACK, the second PUSCH is transmitted to the relay UE, the PUSCH is a retransmission of the first PUSCH, and uses the same scheduling information as that of the first PUSCH. That is, steps 3 to 4 are repeated between the relay UE and the remote UE until the feedback information of the relay UE received by the remote UE is ACK.

(6) After the relay UE successfully decodes the first PUSCH or its retransmission, it transmits a first PUCCH to the base station, the PUCCH carries the ACK information of the relay UE to the first PUSCH or its retransmission.

In the step 4 of this embodiment, the decoding information, fed back from the relay UE to the remote UE, for the first PUSCH, may be carried by the PUCCH or by the PDCCH.

Embodiment 19 is similar to embodiment 16, that is, the retransmission and initial transmission of the link between the relay UE and the remote UE use the same scheduling information to save signaling overhead, and the description of Embodiment 16 can be similarly applied to Embodiment 19.

Embodiment 19 differs from embodiment 16 in that: embodiment 19 is directed to forwarding of an PUSCH; embodiment 16 is directed to forwarding of a PDSCH.

In an example, the decoding result of the relay UE to the first PUSCH is fed back to the remote UE, regardless of whether the relay UE successfully decodes the first PUSCH, as shown in FIG. 33 corresponding to the embodiment. In another example, the ACK information of the relay UE to the first PUSCH is fed back to the remote UE only after the first PUSCH is successfully decoded by the relay UE, that is, the first PUCCH in FIG. 33 is transmitted only after the relay UE successfully decodes the first PUSCH, the remote UE continuously repeats the step 3 before receiving the ACK information, that is, the retransmission of the first PUSCH is continuously transmitted.

Figure 34:
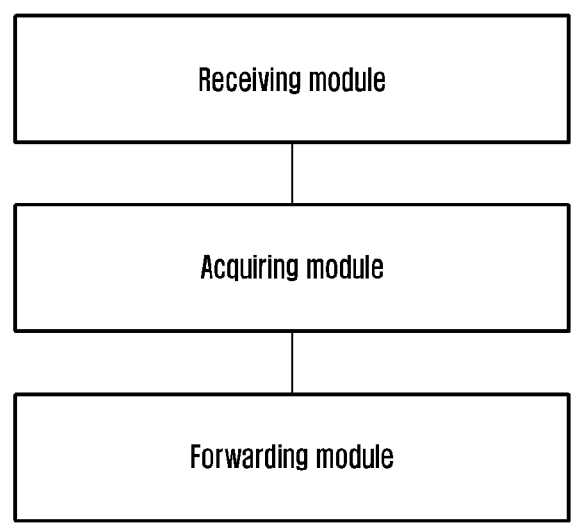
FIG. 34 is a block diagram of a first user equipment according to the present invention.

Referring to FIG. 34, the first user equipment of the disclosure includes:
   a receiving module, configured to receive a physical downlink control channel (PDCCH);
   an acquiring module, configured to acquire, according to the PDCCH, scheduling information of a first data channel and scheduling information of a second data channel, the first data channel is a physical channel that is received by the first UE and carries data of the second UE, and the second data channel is a physical channel that is forwarded by the first UE and carries data of the second UE;
   a forwarding module, configured to forward data between the base station and the second UE according to the scheduling information of the first data channel and the scheduling information of the second data channel.

The operation processes of the receiving module, the acquiring module, and the forwarding module separately correspond to the steps 101, 102, and 103 of the method for transmitting the synchronization signal of the present disclosure, and details will not be described any more.

The first user equipment of the disclosure includes:
   processor;
   a memory configured to store machine readable instructions that, when executed by the processor, cause the processor to perform the steps of the method for relay transmission of the present disclosure.

As can be seen from the above detailed description of the disclosure, the present disclosure has at least the following beneficial technical effects compared to the prior art.

First, through a relay node providing a relay transmission service at layer 1/layer 2 for the remote node of the mobile communication network, the service continuity of the remote node is ensured when a remote node switches the relay path or performs handover, and good compatibility is provided with the existing network deployments, which greatly improves success rate of remote node data transmission.

Second, the method provided by the present invention can be applied to three different application scenarios, and the system can configure an appropriate relay transmission scheme for a UE according to different environments in which the UE is located, so as to reduce waste of system physical resources and power consumption of the remote UE, and at the same time, the efficiency of the network side and the user side is improved.

Third, the base station is allowed to schedule the receiving link and the forwarding link of the relay UE in two ways, that is, the receiving link and the forwarding link are scheduled together, and the receiving link is first scheduled, and the forwarding link is scheduled only when confirming that the relay UE correctly receives the data of the remote UE, which reduces the system signaling overhead and improves the transmission efficiency.

It should be understood by those skilled in the art that the present invention involves apparatuses for performing one or more of operations as described in the present invention.

Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

The foregoing descriptions are merely preferred embodiments of the present invention. It should be noted that, for a person of ordinary skill in the art, various modifications and embellishments may be made without departing from the principle of the present invention. Such modifications and embellishments shall be regarded as falling into the protection scope of the present invention.

The invention claimed is:

1. A method performed by a terminal in a wireless communication system, the method comprising:
receiving, from a base station, downlink control information (DCI) comprising resource allocation information, first information on a modulation scheme for an uplink data, and second information for indicating whether to use all subcarriers within an allocated resource according to the resource allocation information;
identifying the allocated resource according to the resource allocation information;
identifying subcarriers within the allocated resource for transmitting the uplink data; and
transmitting, to the base station, the uplink data using the identified subcarriers,
wherein the subcarriers are identified as all subcarriers within the allocated resource, in case that the second information indicates a predetermined value, and
wherein the subcarriers are identified based on the first information and a value of a cell identity mod 2, in case that the second information does not indicate the predetermined value.

2. The method of claim 1, wherein the terminal is configured to a coverage enhancement (CE).

3. The method of claim 1, wherein the modulation scheme for the uplink data is a binary phase shift keying (BPSK).

4. A method performed by a base station in a wireless communication system, the method comprising:
transmitting, to a terminal, downlink control information (DCI) comprising resource allocation information, first information on a modulation scheme for an uplink data, and second information for indicating whether to use all subcarriers within an allocated resource according to the resource allocation information; and
receiving, from the terminal, the uplink data using subcarriers within an allocated resource according to the resource allocation information,
wherein the subcarriers are identified as all subcarriers within the allocated resource, in case that the second information indicates a predetermined value, and
wherein the subcarriers are identified based on the first information and a value of a cell identity mod 2, in case that the second information does not indicate the predetermined value.

5. The method of claim 4, wherein the terminal is configured to a coverage enhancement (CE).

6. The method of claim 4, wherein the modulation scheme for the uplink data is a binary phase shift keying (BPSK).

7. A terminal in a wireless communication system, the terminal comprising: a transceiver; and
a controller coupled with the transceiver and configured to:
receive, from a base station, downlink control information (DCI) comprising resource allocation information, first information on a modulation scheme for an uplink data, and second information for indicating whether to use all subcarriers within an allocated resource according to the resource allocation information;
identify the allocated resource according to the resource allocation information;
identify subcarriers within the allocated resource for transmitting the uplink data; and transmit, to the base station, the uplink data using the identified subcarriers,
wherein the subcarriers are identified as all subcarriers within the allocated resource, in case that the second information indicates a predetermined value, and
wherein the subcarriers are identified based on the first information and a value of a cell identity mod 2, in case that the second information does not indicate the predetermined value.

8. The terminal of claim 7, wherein the terminal is configured to a coverage enhancement (CE).

9. The terminal of claim 7, wherein the modulation scheme for the uplink data is a binary phase shift keying (BPSK).

10. A base station in a wireless communication system, the base station comprising:
a transceiver; and
a controller coupled with the transceiver and configured to:
transmit, to a terminal, downlink control information (DCI) comprising resource allocation information, first information on a modulation scheme for an uplink data, and second information for indicating whether to use all subcarriers within an allocated resource according to the resource allocation information; and receive, from the terminal, the uplink data using subcarriers within an allocated resource according to the resource allocation information, wherein the subcarriers are identified as all subcarriers within the allocated resource, in case that the second information indicates a predetermined value, and wherein the subcarriers are identified based on the first information and a value of a cell identity mod 2, in case that the second information does not indicate the predetermined value.

11. The base station of claim 10, wherein the terminal is configured to a coverage enhancement (CE).

12. The base station of claim 10, wherein the modulation scheme for the uplink data is a binary phase shift keying (BPSK).

* * * * *

UNITED STATES PATENT AND TRADEMARK OFFICE
CERTIFICATE OF CORRECTION

| | | |
|---|---|---|
| PATENT NO. | : 11,785,624 B2 | Page 1 of 1 |
| APPLICATION NO. | : 15/733481 | |
| DATED | : October 10, 2023 | |
| INVENTOR(S) | : Su et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 16 days.

Signed and Sealed this
Twelfth Day of November, 2024

Katherine Kelly Vidal
*Director of the United States Patent and Trademark Office*